(12) United States Patent
Yamashita et al.

(10) Patent No.: US 8,311,357 B2
(45) Date of Patent: *Nov. 13, 2012

(54) VISUAL PROCESSING DEVICE, DISPLAY DEVICE, VISUAL PROCESSING METHOD, PROGRAM, AND INTEGRATED CIRCUIT

(75) Inventors: Haruo Yamashita, Osaka (JP); Takeshi Ito, Osaka (JP); Yusuke Monobe, Kyoto (JP)

(73) Assignee: Panasonic Corporation, Osaka (JP)

( * ) Notice: Subject to any disclaimer, the term of this patent is extended or adjusted under 35 U.S.C. 154(b) by 0 days.

This patent is subject to a terminal disclaimer.

(21) Appl. No.: 12/972,769

(22) Filed: Dec. 20, 2010

(65) Prior Publication Data

US 2011/0085085 A1    Apr. 14, 2011

Related U.S. Application Data

(62) Division of application No. 12/090,222, filed as application No. PCT/JP2006/320074 on Oct. 6, 2006, now Pat. No. 7,881,549.

(30) Foreign Application Priority Data

Oct. 12, 2005    (JP) ................................ 2005-297464

(51) Int. Cl.
  *G06K 9/40*    (2006.01)
  *H04N 9/64*    (2006.01)
  *H04N 9/00*    (2006.01)

(52) U.S. Cl. ........ 382/254; 382/266; 382/264; 348/622; 348/625

(58) Field of Classification Search .................. 382/165, 382/167, 190, 199, 219, 220, 250, 251–252, 382/255–256, 260–266; 348/607, 610, 615, 348/622, 625, 627

See application file for complete search history.

(56) References Cited

U.S. PATENT DOCUMENTS 4,667,304 A     5/1987  Hier et al.
5,012,333 A *   4/1991  Lee et al. ................. 358/520

(Continued)

FOREIGN PATENT DOCUMENTS

EP        0 377 386        8/1995

(Continued)

OTHER PUBLICATIONS

International Search Report issued Nov. 21, 2006 in International (PCT) Application No. PCT/JP2006/320074.

(Continued)

*Primary Examiner* — Andrae S Allison
(74) *Attorney, Agent, or Firm* — Wenderoth, Lind & Ponack, L.L.P.

(57) ABSTRACT

A visual processing device, display device, visual processing method, program, and integrated circuit that change a strength of visual processing of an image in real-time. A spatial processing portion (2) creates an unsharp signal US from an input signal IS. A target level setting portion (4) sets a predetermined target level value L for setting a range according to which the strength of the visual processing is adjusted. An effect adjustment portion (5) creates a synthesized signal MUS by synthesizing the predetermined target level value L and the unsharp signal US in accordance with an effect adjustment signal MOD that has been set externally. A visual processing portion (3) outputs an output signal OS in accordance with the input signal IS and the synthesized signal MUS, making it possible to change the strength of the visual processing.

2 Claims, 44 Drawing Sheets

U.S. PATENT DOCUMENTS

| | | | |
|---|---|---|---|
| 5,038,388 | A | 8/1991 | Song |
| 5,050,223 | A | 9/1991 | Sumi |
| 5,454,044 | A | 9/1995 | Nakajima |
| 5,485,534 | A | 1/1996 | Takemoto |
| 5,555,031 | A | 9/1996 | Van Rooij |
| 5,602,942 | A | 2/1997 | Takemoto |
| 5,880,767 | A * | 3/1999 | Liu .................. 347/251 |
| 6,055,340 | A | 4/2000 | Nagao |
| 6,169,823 | B1 | 1/2001 | Takeo et al. |
| 6,285,798 | B1 | 9/2001 | Lee |
| 6,323,855 | B1 | 11/2001 | Hamilton, Jr. et al. |
| 6,373,992 | B1 | 4/2002 | Nagao |
| 6,611,627 | B1 | 8/2003 | LaRossa et al. |
| 6,628,842 | B1 | 9/2003 | Nagao |
| 6,633,683 | B1 | 10/2003 | Dinh |
| 6,731,400 | B1 | 5/2004 | Nakamura et al. |
| 6,735,330 | B1 | 5/2004 | Van Metter et al. |
| 6,847,377 | B2 | 1/2005 | Kitahara et al. |
| 6,965,416 | B2 | 11/2005 | Tsuchiya et al. |
| 7,127,122 | B2 | 10/2006 | Ogata et al. |
| 7,130,483 | B2 * | 10/2006 | Kim .................. 382/266 |
| 7,136,538 | B2 | 11/2006 | Kitagawa |
| 7,248,743 | B2 | 7/2007 | Murakami |
| 7,283,680 | B2 | 10/2007 | Cheng |
| 7,333,673 | B2 | 2/2008 | Wang |
| 7,426,300 | B2 | 9/2008 | Ohkawa |
| 7,433,536 | B2 * | 10/2008 | Kim .................. 382/266 |
| 7,602,447 | B2 * | 10/2009 | Arici et al. ........... 348/687 |
| 7,689,055 | B2 | 3/2010 | Zhang et al. |
| 7,881,549 | B2 | 2/2011 | Yamashita et al. |
| 7,881,550 | B2 * | 2/2011 | Ito et al. ............. 382/254 |
| 7,894,684 | B2 * | 2/2011 | Monobe et al. ........ 382/254 |
| 7,903,898 | B2 * | 3/2011 | Ito et al. ............. 382/254 |
| 2002/0047911 | A1 * | 4/2002 | Tsuchiya et al. ........ 348/252 |
| 2002/0067862 | A1 * | 6/2002 | Kim .................. 382/266 |
| 2002/0181024 | A1 | 12/2002 | Morimoto et al. |
| 2004/0051789 | A1 | 3/2004 | Horita |
| 2004/0051794 | A1 | 3/2004 | Horita |
| 2004/0066980 | A1 | 4/2004 | Gindele |
| 2004/0096103 | A1 | 5/2004 | Gallagher et al. |
| 2004/0175054 | A1 | 9/2004 | Ogata et al. |
| 2004/0202377 | A1 | 10/2004 | Murakami |
| 2004/0246537 | A1 | 12/2004 | Ohyama et al. |
| 2005/0013484 | A1 | 1/2005 | Ohkawa |
| 2005/0058365 | A1 | 3/2005 | Wang |
| 2005/0089239 | A1 | 4/2005 | Brajovic |
| 2005/0094890 | A1 * | 5/2005 | Wang .................. 382/266 |
| 2005/0104974 | A1 | 5/2005 | Watanabe et al. |
| 2005/0207629 | A1 | 9/2005 | Toyoda |
| 2007/0188623 | A1 | 8/2007 | Yamashita et al. |
| 2010/0014773 | A1 | 1/2010 | Ito |

FOREIGN PATENT DOCUMENTS

| | | |
|---|---|---|
| EP | 1 404 120 | 3/2004 |
| EP | 1 480 166 | 11/2004 |
| EP | 1 515 537 | 3/2005 |
| GB | 2 170 373 | 7/1986 |
| JP | 62-143567 | 6/1987 |
| JP | 63-177662 | 7/1988 |
| JP | 63-182785 | 7/1988 |
| JP | 02-226375 | 9/1990 |
| JP | 3-48980 | 3/1991 |
| JP | 4-152788 | 5/1992 |
| JP | 6-46295 | 2/1994 |
| JP | 7-135667 | 5/1995 |
| JP | 7-177530 | 7/1995 |
| JP | 10-191054 | 7/1998 |
| JP | 10-208034 | 8/1998 |
| JP | 2000-149014 | 5/2000 |
| JP | 2001-5960 | 1/2001 |
| JP | 2001-275015 | 10/2001 |
| JP | 2002-83294 | 3/2002 |
| JP | 2002-281313 | 9/2002 |
| JP | 2002-314814 | 10/2002 |
| JP | 2003-008935 | 1/2003 |
| JP | 2003-60913 | 2/2003 |
| JP | 2003-110956 | 4/2003 |
| JP | 2003-296728 | 10/2003 |
| JP | 2003-309763 | 10/2003 |
| JP | 2003-333331 | 11/2003 |
| JP | 2003-337942 | 11/2003 |
| JP | 2004-38842 | 2/2004 |
| JP | 2004-78652 | 3/2004 |
| JP | 2004-102903 | 4/2004 |
| JP | 2004-310475 | 11/2004 |
| JP | 2004-312387 | 11/2004 |
| JP | 2004-320632 | 11/2004 |
| JP | 2005-39324 | 2/2005 |
| JP | 2005-108208 | 4/2005 |
| JP | 2005-130484 | 5/2005 |
| JP | 2005-269145 | 9/2005 |
| JP | 2005-295131 | 10/2005 |
| JP | 2006-24176 | 1/2006 |
| JP | 4157592 | 10/2008 |
| JP | 4437150 | 3/2010 |
| WO | 2005/004040 | 1/2005 |
| WO | 2005/027043 | 3/2005 |
| WO | 2005/038713 | 4/2005 |

OTHER PUBLICATIONS

International Search Report issued Jun. 5, 2007 in International (PCT) Application No. PCT/JP2007/057468.

Richard G. Hier et al., "Image Content Based Improvements to Locally Adaptive Video Enhancement," 1994 IEEE ICIP-94, pp. 621-624, vol. 3.

Suguru Saito et al., "Automatic Production of Hand-Painted Images," The Institute of Television Engineers of Japan, pp. 1528-1535, vol. 50, No. 10, Oct. 20, 1996.

Extended European Search Report issued Apr. 9, 2010 in International (PCT) Application No. PCT/JP2006/320074.

Scognamiglio et al., "A Rational Unsharp Masking Method for TV Applications," Oct. 24-28, 1999, IEEE Image Processing, 1999. ICIP 99. Proceedings, pp. 247-251, vol. 4.

Carrato et al., "A Gradient-Directed Unsharp Masking Algorithm for Synchrotron Radiation Angiography," 1989, Electrotechnical Conference, 1989. Proceedings. INSPEC.

Ramponi et al., "Nonlinear Unsharp Masking Methods for Image Contrast Enhancement," Journal of Electronic Imaging 5(3), pp. 353-366 (Jul. 1996).

Cheikh et al., "Directional-Rational Approach for Color Image Enhancement," 2000, Circuits and Systems, 2000, Proceedings, ISCAS 2000 Geneva. The 2000 IEEE International Symposium.

Kim et al., "Optimal Unsharp Mask for Image Sharpening and Noise Removal," J. Electron. Imag., vol. 15, p. 0230071, 2005.

Extended European Search Report dated Feb. 22, 2012 in corresponding European Application No. 11153448.3.

Office Action mailed May 24, 2012 in corresponding U.S. Appl. No. 13/017,380.

Supplementary European Search Report mailed Apr. 20, 2012 in corresponding European Application No. 07 73 9886.

Ogata et al., "Dynamic Range Compression Based on Illumination Compensation", *IEEE Transactions on Consumer Electronics*, vol. 47, No. 3, Aug. 1, 2001, pp. 548-558.

Narendra et al., "Real-Time Adaptive Contrast Enhancement", *IEEE Transactions on Pattern Analysis and Machine Intelligence*, vol. PAMI-03, No. 6, Nov. 1, 1981, pp. 655-661.

Office Action mailed Feb. 2, 2012 in corresponding U.S. Appl. No. 13/005,797.

\* cited by examiner (a)
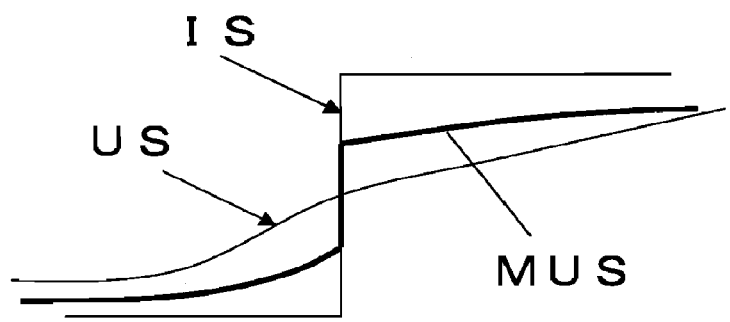
(b)
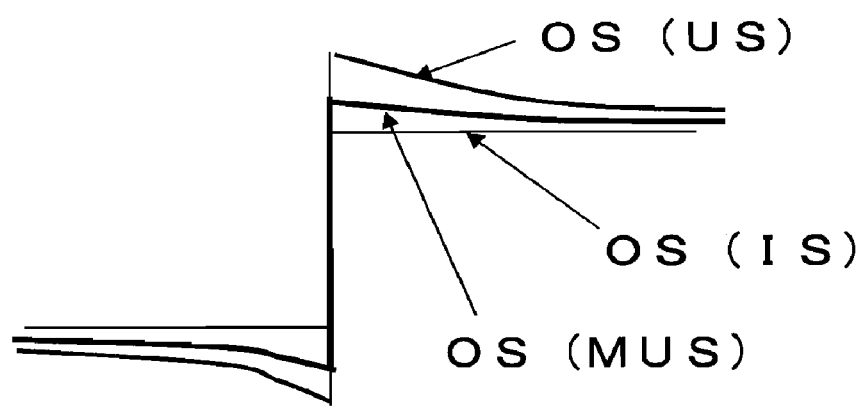
Fig. 3

(a)
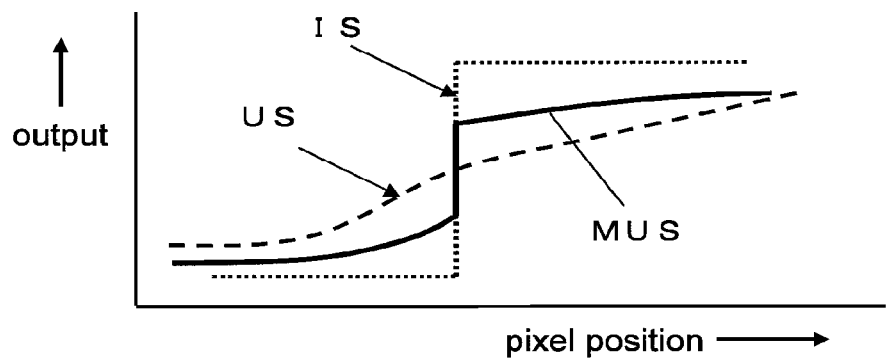
(b)
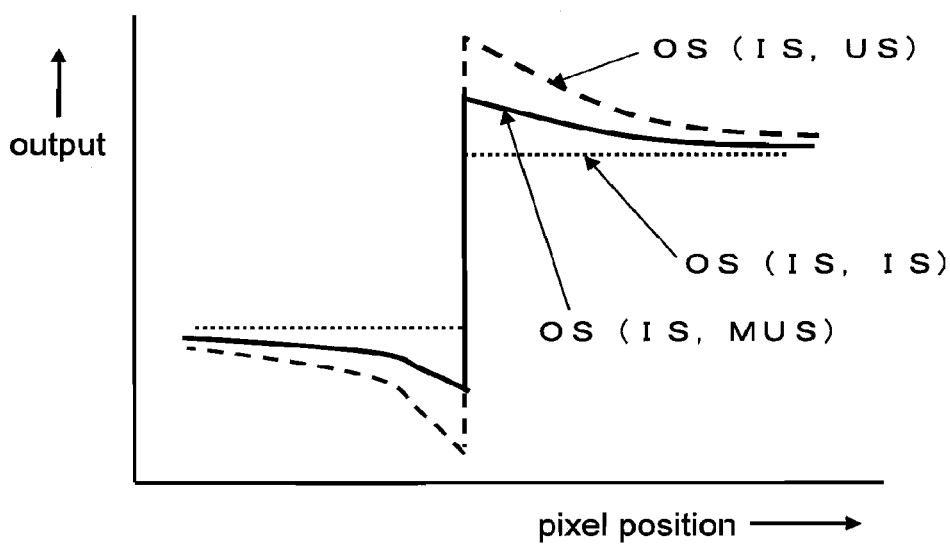
Fig. 11

(a)
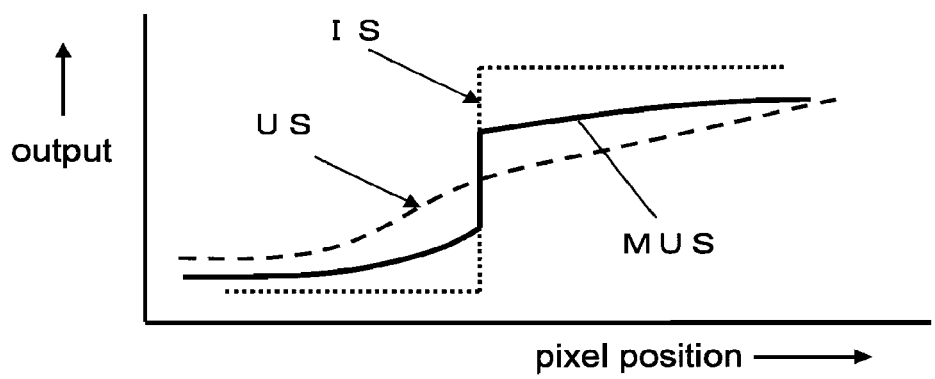
(b)
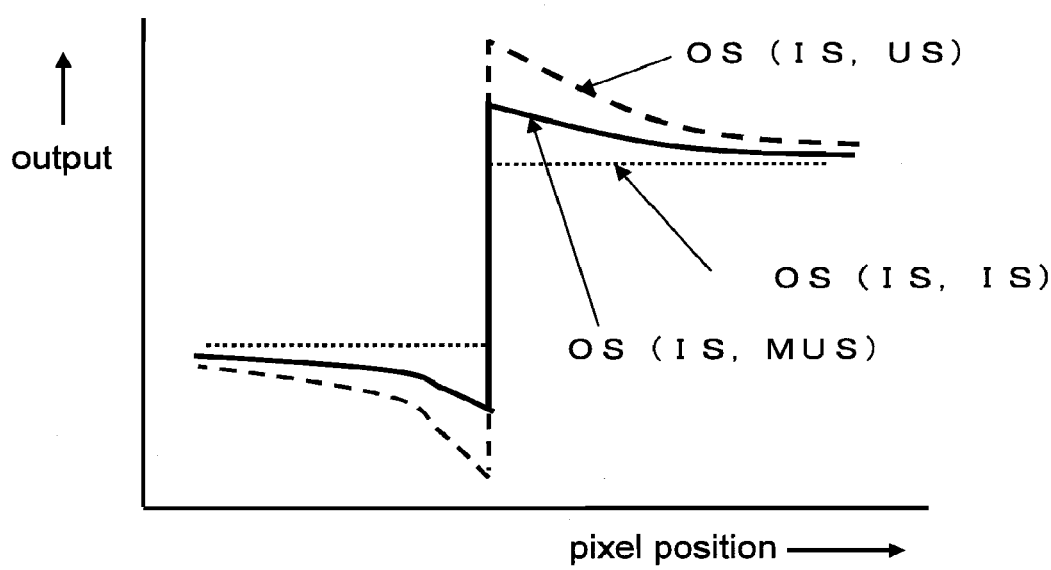
Fig. 23

VISUAL PROCESSING DEVICE, DISPLAY DEVICE, VISUAL PROCESSING METHOD, PROGRAM, AND INTEGRATED CIRCUIT

The present application is a divisional of application Ser. No. 12/090,222 now U.S. Pat. No. 7,881,549, filed Apr. 14, 2008 which is a national stage application of International Application No. PCT/JP2006/320074, filed Oct. 6, 2006.

BACKGROUND OF THE INVENTION

1. Field of Invention

The present invention relates to visual processing devices, display devices, image-capturing devices, portable information devices, and integrated circuits, and in particular relates to visual processing devices, display devices, image-capturing devices, portable information devices, and integrated circuits in which the strength of visual processing of an image is changed.

2. Description of the Related Art

Spatial processing and tone processing (tone mapping processing) are known as methods for visually processing an image signal of an original image.

In spatial processing, a target pixel to be filtered is processed using the pixels surrounding the target pixel. Another method that is known is to use an image signal that has been spatially processed in order to perform contrast enhancement or dynamic range (hereinafter, abbreviated as "DR") compression, for example, of the original image (for example, see Patent Document 1).

Tone processing is processing in which a lookup table (hereinafter, abbreviated as "LUT") is used to effect pixel value conversion for each target pixel, regardless of the pixels surrounding that target pixel, and is also known as gamma correction. For example, to enhance the contrast, pixel value conversion is performed using a LUT for assigning a wide range of tone to frequently appearing tone levels (that cover a large area) in the original image. Some examples of tone processing in which a LUT is employed include tone processing in which a single LUT is selected and used for an entire original image (histogram equalization), and tone processing in which a LUT is selected and used for each of a plural number of image regions obtained by partitioning the original image (local histogram equalization).

Conventional visual processing devices have been provided with a plurality of profile data with different conversion characteristics, and achieved the different visual processing modes discussed above by switching the profile data (for example, see Patent Document 2).

FIG. 47 illustrates a conventional visual processing device 900. In FIG. 47, the visual processing device 900 is made of a spatial processing portion 901 that executes spatial processing on the luminance value of each pixel of an original image that has been obtained as an input signal IS and outputs an unsharp signal US, and a visual processing portion 902 that uses the input signal IS and the unsharp signal US for the same pixel to perform visual processing of the original image, and outputs an output signal OS. The unsharp signal US is the brightness signal of a local region in which the luminance signal has been processed by a low-pass filter, and is a blur signal. The visual processing portion 902 is constituted by a two-dimensional LUT.

The visual processing portion 902 executes gamma correction with the tone conversion characteristics shown in FIG. 48, and selects a tone conversion curve that corresponds to the unsharp signal US of a target region in the image in order to increase or decrease the contrast. For example, it selects the curve of unsharp signal USo to brighten dark regions in the image, whereas it selects the unsharp signal USn curve to inhibit brightness in bright regions and strengthen the contrast. This group of curves is called a profile.

A profile data registration device 903 is provided with profile groups for different types of visual processing, and in the visual processing portion 902 registers the most appropriate profile for a target visual processing.

The profile data registration device 903 also updates to required profile data according to the strength of the visual processing.

For example, when it was desirable to change the strength of contrast enhancement in dark regions between when a face is extremely dark and when it is slightly dark even in a backlit image, then the brightness was adjusted by updating to profile data that have the most appropriate tone conversion characteristics.

Patent Document 1: U.S. Pat. No. 4,667,304.

Patent Document 2: International Disclosure Pamphlet No. 2005/027043.

BRIEF SUMMARY OF THE INVENTION

Problem to be Solved by the Invention

However, with this conventional configuration, there was the problem that because it is necessary to prepare profile data according to the strength of the effect of visual processing, the amount of data becomes large. A large amount of data requires the memory capacity for storing the profile data to also be large (normally about several 100 bytes to several 10 K bytes).

There also was the issue that it is necessary to update the profile data based on the strength of the effect of visual processing. Because a large update time is required to update the profile data, there was the issue that the effect of visual processing could not be changed in real time for each local region in the image. In particular, if the image processing portion is constituted by a two-dimensional LUT, then the data amount becomes large and an even greater update time is required.

One example of processing, for improving the image quality, which resembles human vision, is visual processing in which the value of a target pixel is converted based on the contrast between the value of the target pixel and the values of the pixels in the surrounding region. In such visual processing, to further enhance the processing effect, the brightness information is extracted from a wide region around the position of the target pixel.

However, since the value of the target pixel is determined from the contrast between the value of the target pixel and the values of the surrounding pixels, if there is a steep edge region in the surrounding region, then the impact of the values of the surrounding pixels results in a visual processing output that changes gently near the edge, even in flat regions in which pixel values fluctuate little. When a large change in luminance occurs in a flat region, a shadow-like border occurs in the region adjacent to the edge and results in an unnatural image. Also, when visual processing is performed on, for example, images with few edge regions, images with few tone levels (luminance levels), images in which there is little difference in the luminance between adjacent pixels and many continuous analogous values occur, and block images that have been partitioned into a plurality of blocks in which few blocks include high-frequency components (hereinafter, such images will be referred to as "special images") in the same manner as on natural images, the change in luminance of the flat regions easily stands out and shadow-like borders occur in regions adjacent to edges, producing an unnatural image.

The issue to be solved by the invention is to achieve a visual processing device, a display device, a visual processing method, a program, and an integrated circuit that are capable of suppressing artifacts even if an image with sharp edge regions or a special image has been input, and that with a simple configuration can change the strength of the visual processing of the image in real time.

Means for Solving Problem

A 1st aspect of the invention is a visual processing device that visually processes and outputs an image signal that has been input, and that is provided with an effect adjustment portion that performs processing for setting an effect of visual processing according to an effect adjustment signal, and a visual processing portion that performs visual processing on an image signal.

Thus, with a simple configuration it is possible to set the effect of visual processing with an effect adjustment signal. Consequently, the effect of visual processing can be adjusted in real time.

A 2nd aspect of the invention is the 1st aspect of the invention, further including a target level setting portion that sets a predetermined target level, and a spatial processing portion that performs predetermined spatial processing on an image signal and outputs a processed signal. The effect adjustment portion outputs a synthesized signal that is obtained from synthesizing the predetermined target level and the processed signal according to the effect adjustment signal for setting the effect of visual processing. The visual processing portion converts an image signal based on the synthesized signal and the image signal.

With this configuration, the strength of the visual processing is changed by creating different synthesized signals with the effect adjustment signal, and thus it is not necessary to change a predetermined tone conversion function to match the degree of the strength. If the predetermined tone conversion function is achieved by a hardware circuit, then it is possible to reduce the circuit scale because it is not necessary to have a plurality of circuits that correspond to the strength of the visual processing. If the predetermined tone conversion characteristics are achieved by profile data stored in a 2D LUT, then it is possible to reduce the memory capacity because it is not necessary to have a plurality of profile data corresponding to the strength of the visual processing. Because it is no longer necessary to update the profile data according to the strength of the visual processing, it is possible to change the strength of visual processing even when the visual processing portion is constituted by a 2D LUT. By setting a target level with the target level setting portion, it is possible to set the tone conversion characteristics to which to change the visual processing effect by the visual processing that is achieved by the visual processing device.

A 3rd aspect of the invention is the 1st aspect of the invention, further including a target level setting portion that sets a predetermined target level, a spatial processing portion that performs predetermined spatial processing on an image signal and outputs a processed signal, and a correction portion that corrects an image signal. The effect adjustment portion outputs a synthesized signal obtained by synthesizing the predetermined target level and the processed signal according to the effect adjustment signal for setting the effect of visual processing. The visual processing portion outputs a gain signal based on the synthesized signal and the image signal. The correction portion corrects an image signal based on the gain signal.

With this configuration, the strength of the visual processing can be changed by creating different synthesized signals with the effect adjustment signal, and thus a predetermined gain function can be fixed. If the predetermined gain function is achieved by a hardware circuit, then it is possible to reduce the circuit scale because it is not necessary to have a plurality of circuits that correspond to the strength of the visual processing. If the predetermined gain function is achieved by profile data stored in a 2D LUT, then it is possible to reduce the memory capacity because it is not necessary to have a plurality of profile data that correspond to the strength of the visual processing. Also, because it is not necessary to update the profile data in correspondence with the strength of the visual processing, it is possible to change the strength of the visual processing in real time even if the visual processing portion is constituted by a 2D LUT.

A 4th aspect of the invention is the 1st aspect of the invention, further including a spatial processing portion that performs predetermined spatial processing on the image signal and outputs a processed signal. The effect adjustment portion outputs a synthesized signal that is obtained by synthesizing the image signal and the processed signal according to the effect adjustment signal for setting the effect of visual processing. The visual processing portion converts the image signal based on the synthesized signal and the image signal.

With this configuration, the effect adjustment portion creates a synthesized signal by interpolating the image signal and the processed signal with the effect adjustment signal. Thus, it is possible to change the effect of visual processing from the characteristics of only gamma conversion for converting a predetermined brightness, to the characteristics of converting the local contrast. It is also possible to fix a predetermined tone conversion function even though the effect of visual processing is to be changed.

A 5th aspect of the invention is the 1st aspect of the invention, further including a spatial processing portion that performs predetermined spatial processing on the image signal and outputs a processed signal, and a correction portion that corrects an image signal. The effect adjustment portion outputs a synthesized signal that is obtained by synthesizing the image signal and the processed signal according to the effect adjustment signal for setting the effect of visual processing. The visual processing portion outputs a gain signal based on the synthesized signal that has been synthesized and the image signal. The correction portion corrects an image signal based on the gain signal.

With this configuration, the effect adjustment portion creates a synthesized signal by interpolating the image signal and the processed signal with the effect adjustment signal. Thus, it is possible to change the effect of visual processing from the characteristics of only gamma conversion for converting a predetermined brightness, to the characteristics of converting the local contrast. It is also possible to fix a predetermined gain function even if the effect of visual processing is to be changed.

A 6th aspect of the invention is any one of the 1st through 5th aspects of the invention, in which the visual processing portion includes a two-dimensional lookup table.

With this configuration, it is possible to register profiles for different visual effects, such as DR compression processing, local contrast processing, and tone processing. Further, by storing data based on the gain characteristics in a 2D LUT, it is possible to reduce the memory capacity more than if the gain conversion values are stored as data as they are.

A 7th aspect of the invention is the 1st aspect of the invention, further including a surrounding image information extraction portion that extracts surrounding image information of the image signal that has been input, and an effect adjustment signal generation portion that outputs an effect adjustment signal for setting the effect of the visual processing. The visual processing portion visually processes an image signal based on the image signal and the surrounding image information. The effect adjustment portion sets the effect of the visual processing according to the effect adjustment signal.

With this configuration, it becomes possible to set (vary) the effect of visual processing according to the effect adjustment signal, and by adjusting the effect in regions where artifacts occur, it is possible to suppress artifacts.

An 8th aspect of the invention is the 7th aspect of the invention, wherein the effect adjustment signal generation portion detects a region that is adjacent to an edge region from the image signal, and outputs the effect adjustment signal.

Thus, it is also possible to inhibit artifacts near a edge region even when an image that has a sharp edge region is input.

A 9th aspect of the invention is the 8th aspect of the invention, wherein the effect adjustment signal generation portion detects a flat region that is adjacent to the edge region from the image signal, and outputs the effect adjustment signal.

Thus, it is also possible to suppress artifacts in a flat region that is near an edge region, in which artifacts stand out easily.

A 10th aspect of the invention is the 8th or 9th aspects of the invention, wherein the effect adjustment signal generation portion outputs the effect adjustment signal according to an amount of change of the surrounding image information.

Thus, it is also possible to inhibit artifacts that occur along with changes in the surrounding image information.

An 11th aspect of the invention is the 8th or 9th aspects of the invention, wherein the effect adjustment signal generation portion includes a flatness detection portion that detects a degree of flatness of the flat region whose difference in luminance with an adjacent region is less than or equal to a predetermined value from the image signal, and an edge detection portion that detects an edge amount of an edge region whose difference in luminance with an adjacent region is less than or equal to a predetermined value from the image signal. The effect adjustment signal generation portion outputs the effect adjustment signal based on the outputs from the flatness detection portion and the edge detection portion.

Thus, additionally, even when an image that has sharp edge regions is input, it is possible to suppress artifacts in flat regions that are near edge regions.

A 12th aspect of the invention is any one of the 7th through 11th aspects of the invention, wherein the effect adjustment portion outputs a first synthesized signal that is obtained from synthesizing the image signal and the surrounding image information according to the effect adjustment signal. The visual processing portion visually processes the image signal based on the first synthesized signal and the image signal.

Thus, additionally, it is possible for the visual processing portion to select different tone conversion processing based on the first synthesized signal, and can visually process the image signal based on the selected tone conversion processing, and thus can vary the effect of visual processing.

A 13th aspect of the invention is any one of the 7th through 11th aspects of the invention, wherein the effect adjustment portion outputs a second synthesized signal that is obtained by synthesizing the image signal and the output that has been visually processed by the visual processing portion according to the effect adjustment signal.

Thus, additionally, it is possible to perform the output changing the ratio of the image signal and the processed signal in accordance with the effect adjustment signal, and this allows the effect of visual processing to be differed.

A 14th aspect of the invention is the 1st aspect of the invention, further including a surrounding image information extraction portion that extracts surrounding image information of the image signal that has been input, and a special image detection portion that obtains a degree indicating a degree of a special image by detecting statistical bias existing in an image and outputs the degree as the effect adjustment signal. The visual processing portion outputs a processed signal that is obtained by visually processing an image signal based on the image signal and the surrounding image information. The effect adjustment portion controls the effect of the visual processing in accordance with the effect adjustment signal.

With this configuration, the visual processing effect can be maintained even if a normal image that is not a special image has been input, and artifacts can be inhibited if a special image has been input.

A 15th aspect of the invention is the 14th aspect of the invention, wherein the special image detection portion detects the statistical bias based on a ratio of the number of regions in which the gradation is judged to be in changes to the total number of regions in the image, or a ratio of the number of regions in which the gradation is judged to be in constant to the total number of regions in the image, in the image formed by the image signal.

Thus, additionally, it is possible to detect a statistical bias from the proportion of regions in which the gradation changes, or from the proportion of regions in which the gradation does not change, in the image of the image signal.

A 16th aspect of the invention is the 15th aspect of the invention, wherein the special image detection portion increases the degree to which the ratio of regions in which the gradation is judged to be in change to the total number of regions in the image is low, or when the ratio of the number of regions in which the gradation is judged to be in constant to the total number of regions in the image is high.

Thus, additionally it is possible to detect the degree to which an image is a special image, and it is possible to output an effect adjustment signal that is suited for processing the special image.

A 17th aspect of the invention is the 16th aspect of the invention, wherein the special image detection portion detects the ratio of regions in which the gradation is judged to be in change by detecting an edge component in the regions of the image.

Thus, additionally it is possible to detect the ratio of regions in which the gradation changes from the edge component of the image.

An 18th aspect of the invention is the 16th aspect of the invention, wherein the special image detection portion detects the ratio of regions in which the gradation does not change by detecting a degree of flatness in the image.

Thus, it is also possible to detect the ratio of regions in which the gradation does not change from the degree of flatness in the image.

A 19th aspect of the invention is the 18th aspect of the invention, wherein the special image detection portion detects the degree of flatness based on the total of number of continuous pixels analogous to each other in pixel value (tone level) or the number of tone levels.

Thus, additionally it is possible to detect the degree of flatness from the number of tone levels or the continuous length of analogous pixels in the image.

A 20th aspect of the invention is the 17th aspect of the invention, wherein the special image detection portion has an edge detection portion that detects edge amount for each pixel in an image formed by the image signal, an edge density calculation portion that detects edge pixels whose edge amount is equal to or greater than a predetermined value and calculates a ratio of the number of edge pixels to the total number of pixels in the image signal, and a first effect adjustment signal generation portion that outputs the effect adjustment signal according to that ratio.

Thus, additionally it is possible to detect a special image from the edges in the image, and it is possible to create an effect adjustment signal that corresponds to the bias of the proportion of edge pixels in the special image.

A 21st aspect of the invention is the 17th aspect of the invention, wherein the special image detection portion has a high-frequency block detection portion that detects a high-frequency block including high-frequency component, from an image formed by the image signal, which has been partitioned into a plurality of blocks, a high-frequency block density detection portion that detects a ratio of the number of the high-frequency blocks to the number of the plurality of blocks, and a second effect adjustment signal generation portion that outputs the effect adjustment signal according to the ratio.

Thus, additionally, it is possible to detect a special image by detecting high-frequency blocks within the image, and it is possible to create an effect adjustment signal that corresponds to the bias of the proportion of high-frequency blocks in the special image.

A 22nd aspect of the invention is the 19th aspect of the invention, wherein the special image detection portion has a classifier (a frequency detection portion) that classifies the pixel in the image formed by the image signal into a class based on a tone level of the pixel and counts the number of the pixels belonging to each class, a frequency determination portion (determination portion) that compares the number of pixels belonging to each class with a predetermined threshold value to detect a class with the number of pixels larger than the predetermined threshold value, a tone level number detection portion that counts the number of classes detected by the determination portion, and a third effect adjustment signal generation portion that outputs the effect adjustment signal according to the number of the counted classes.

Thus, additionally, it is possible to detect a special image from the number of tone levels in the image, and it is possible to create an effect adjustment signal that corresponds to the bias in the number of tone levels in the special image.

A 23rd aspect of the invention is the 19th aspect of the invention, wherein the special image detection portion has an analogous pixel detection portion, a continuous length detection portion, a mean continuous length calculation portion, and a fourth effect adjustment signal generation portion. The analogous pixel detection portion detects analogous pixels whose difference in luminance with adjacent pixels is less than or equal to a predetermined value from the image signal. The continuous length detection portion detects a continuous length in which the analogous pixels are continuous. The mean continuous length calculation portion calculates a mean continuous length by averaging a plurality of the continuous lengths that have been detected by the continuous length detection portion. The fourth effect adjustment signal generation portion outputs the effect adjustment signal according to the mean continuous length.

Thus, additionally, it is possible to detect a special image from the mean continuous length of analogous pixels in the image, and it is possible to create an effect adjustment signal that corresponds to the bias of the mean continuous length in the special image.

A 24th aspect of the invention is any one of the 14th through 23rd aspects of the invention, wherein the effect adjustment portion outputs a first synthesized signal that is synthesized by changing the ratio of the image signal and the surrounding image information according to the effect adjustment signal, and wherein the visual processing portion visually processes the image signal based on the first synthesized signal and the image signal.

Thus, additionally, it is possible for the visual processing portion to select different tone conversion processing based on the first synthesized signal, so that it can differ the effect of the visual processing.

A 25th aspect of the invention is any one of the 14th through 23rd aspects of the invention, wherein the effect adjustment portion outputs a second synthesized signal that is synthesized by changing the ratio of the image signal and the processed signal according to the effect adjustment signal.

Thus, additionally, it is possible to perform the output changing the ratio of the image signal and the processed signal according to the effect adjustment signal, and this allows the visual processing effect to be differed.

A 26th aspect of the invention is any one of the 14th through 23rd aspects of the invention, wherein the visual processing portion includes a two-dimensional lookup table, and performs visual processing based on characteristic data that have been set in the two-dimensional lookup table. The effect adjustment portion sets, in the visual processing portion, characteristic data that are synthesized by changing the ratio of a plurality of the characteristic data with different visual processing effects according to the effect adjustment signal.

Thus, additionally, it is possible to perform visual processing using characteristic data that are synthesized by changing the ratio of a plurality of characteristic data with different visual processing effects in accordance with the effect adjustment signal, and this allows the effect of visual processing to be differed.

A 27th aspect of the invention is any one of the 14th through 26th aspects of the invention, wherein the special image detection portion inputs a reduced image, in which the image signal has been reduced, and detects special images, which have the statistical bias, from the reduced image and outputs the effect adjustment signal based on the statistical bias.

Thus, additionally, the impact of noise when detecting a special image is suppressed. It is also possible to reduce the number of computations of the processing.

A 28th aspect of the invention is any one of the 14th through 27th aspects of the invention, wherein the special image detection portion detects the statistical bias from a frame image one or more frame images prior when the image signal is a frame image, or from a field image one or more field images prior when the image signal is a field image.

Thus, additionally, it is possible to detect a special image from the frame immediately prior, and it is possible to use an effect adjustment signal that corresponds to the bias of the information of the special image from the head of the frames. It is also possible to detect a special image from the field immediately prior, and it is possible to use an effect adjustment signal that corresponds to the bias of the information of the special image from the head of the fields.

A 29th aspect of the invention is the 28th aspect of the invention, further including a continuous changing portion for continuously changing the effect adjustment signal. The continuous changing portion continuously changes the effect adjustment signal between frames when the effect adjustment signal is output in frame units, or between fields when the effect adjustment signal is output in field units.

Thus, additionally, it is possible to suppress sudden changes in the effect adjustment signal between frames, and thereby suppress flickering of the image between frames. It is also possible to suppress sudden changes in the effect adjustment signal between fields, and thereby suppress flickering of the image between fields.

A 30th aspect of the invention is a display device that is provided with a data reception portion that receives image data that have been transmitted or broadcast, a decoding portion that decodes the image data that have been received into video data, the visual processing device according to any one of the first through 29th aspects of the invention for visually processing the decoded video data and outputting an output signal, and a display portion that performs a display of the output signal that has been visually processed by the visual processing device.

With this configuration, it is possible to change the strength of visual processing in real time through brightness adjustment of the image and display this with a display device. It should be noted that in addition to a display device, it is also possible to achieve an image-capturing device and a portable information terminal device that are provided with the visual processing device.

The image-capturing device can have a configuration in which it is provided with an image-capturing portion that performs an image capture of an image, and a visual processing device that receives the image that has been captured by the image-capturing portion as an input signal and performs visual processing.

With this configuration, with an image-capturing device as well it is possible to obtain the same effect as the visual processing devices.

The portable information device can have a configuration in which it is provided with a data reception portion that receives image data that have been communicated or broadcast, a visual processing device that visually processes the image data that have been received and outputs an output signal, and display means for performing a display of the output signal that has been visually processed.

With this configuration, with a portable information device as well it is possible to obtain the same effect as the visual processing devices.

The portable information device can have a configuration in which it is provided with an image-capturing portion that performs an image capture of an image, a visual processing device that receives the image that has been captured by the image-capturing portion as an input signal and performs visual processing and outputs an output signal, and a data transmission portion for transmitting the output signal that has been visually processed.

With this configuration, with a portable information device it is possible to obtain the same effect as the visual processing devices.

A 31st aspect of the invention is a visual processing method of visually processing and outputting an image signal that has been input, and includes an effect adjustment step of performing processing for setting an effect of visual processing according to an effect adjustment signal, and a visual processing step of performing visual processing on an image signal.

Thus, the effect of visual processing can be easily set with an effect adjustment signal. Consequently, it is possible to adjust the effect of visual processing in real time.

A 32nd aspect of the invention is the 31st aspect of the invention, further including a target level setting step of setting a predetermined target level, and a spatial processing step of performing predetermined spatial processing on an image signal and outputting a processed signal. In the effect adjustment step, a synthesized signal obtained from synthesizing the predetermined target level and the processed signal according to the effect adjustment signal is output. In the visual processing step, tone conversion of an image signal is performed based on the synthesized signal that has been synthesized and the image signal.

Thus, the strength of the visual processing is changed by creating different synthesized signals with the effect adjustment signal, and thus it is not necessary to change a predetermined tone conversion function to match the degree of the strength. Also, by setting a target level in the target level setting step, it is possible to set the tone conversion characteristics to which to change the visual processing effect that is achieved by the visual processing method.

A 33rd aspect of the invention is the 31st aspect of the invention, further including a surrounding image information extraction step of extracting the surrounding image information of an image signal that has been input, and an effect adjustment signal generation step of outputting an effect adjustment signal for setting an effect of the visual processing. In the visual processing step, an image signal is visually processed based on the image signal and the surrounding image information. In the effect adjustment step, the effect of visual processing is set according to the effect adjustment signal.

With this method, it is possible to differ the visual processing effect according to the effect adjustment signal.

A 34th aspect of the invention is the 33rd aspect of the invention, in which, in the effect adjustment signal generation step, a region that is adjacent to an edge region is detected from the image signal, and the effect adjustment signal is output.

Thus, additionally, even when an image that has a sharp edge region is input, it is possible to suppress artifacts in a flat region that is near the edge region.

A 35th aspect of the invention is the 31st aspect of the invention, further including a surrounding image information extraction step of extracting the surrounding image information of an image signal that has been input, and a special image detection step of obtaining a degree indicating a degree of a special images by detecting statistical bias existing in an image and outputting the degree as the effect adjustment signal. In the visual processing step, an image signal is visually processed based on the image signal and the surrounding image information. In the effect adjustment step, the effect of the visual processing is set according to the effect adjustment signal.

With this method, the visual processing effect can be maintained even in a case where a normal image that is not a special image has been input, and artifacts can be inhibited in a case where a special image has been input.

A 36th aspect of the invention is a program for causing a computer to execute an effect adjustment step outputting a control signal for setting an effect of visual processing according to an effect adjustment signal, and a visual processing step of performing visual processing on an image signal based on the control signal and the image signal, in order to perform visual processing by visually processing and outputting an image signal that has been input.

Thus, the effect of visual processing can be easily set through an effect adjustment signal. Consequently, it is possible to adjust the effect of visual processing in real time.

A 37th aspect of the invention is the 36th aspect of the invention, in which the program is for causing a computer to further execute a target level setting step of setting a predetermined target level, and a spatial processing step of performing predetermined spatial processing on an image signal and outputting a processed signal. In the effect adjustment step, a synthesized signal obtained by synthesizing the predetermined target level and the processed signal according to the effect adjustment signal for setting the effect of visual processing is output. In the visual processing step, tone conversion of an image signal is performed based on the synthesized signal that has been synthesized and the image signal.

Thus, the strength of the visual processing is changed by creating different synthesized signals with the effect adjustment signal, and thus it is not necessary to change a predetermined tone conversion function to match the degree of the strength. Also, by setting a target level in the target level setting step, it is possible to set the tone conversion characteristics to which to change the visual processing effect that is achieved by the visual processing method.

A 38th aspect of the invention is the 36th aspect of the invention, in which the program is for causing a computer to further execute a surrounding image information extraction step of extracting surrounding image information of an image signal that has been input, and an effect adjustment signal generation step of outputting the effect adjustment signal for setting an effect of the visual processing. In the visual processing step, an image signal is visually processed based on the image signal and the surrounding image information. In the effect adjustment step, adjustment is performed to vary the effect of the visual processing in accordance with the effect adjustment signal.

With this program, it is possible to differ the visual processing effect according to the effect adjustment signal.

A 39th aspect of the invention is the 38th aspect of the invention, wherein in the effect adjustment signal generation step, a flat region that is adjacent to an edge region is detected from the image signal and the effect adjustment signal is output.

Thus, additionally, even when an image that has sharp edge regions is input, it is possible to suppress artifacts in flat regions that are near edge regions.

A 40th aspect of the invention is the 38th aspect of the invention, wherein the program is for causing a computer to further execute a surrounding image information extraction step of extracting surrounding image information of an image signal that has been input, and a special image detection step of obtaining a degree indicating a degree of a special images by detecting statistical bias existing in an image and outputting the degree as the effect adjustment signal. In the visual processing step, an image signal is visually processed based on the image signal and the surrounding image information. In the effect adjustment step, the effect of the visual processing is set according to the effect adjustment signal.

With this program, the visual processing effect can be maintained even in a case where a normal image that is not a special image has been input, and artifacts can be inhibited in a case where a special image has been input.

A 41st aspect of the invention is an integrated circuit that includes the visual processing device according to any one of the 1st through 29th aspects of the invention.

With this configuration, with an integrated circuit as well it is possible to obtain the same effect as the visual processing devices.

Effects of the Invention

With the invention, it is possible to achieve a visual processing device, a display device, a visual processing method, a program, and an integrated circuit that can inhibit artifacts even in a case where an image that has sharp edge regions or a special image has been input, and with a simple configuration can change the strength of the visual processing of the image in real time.

BRIEF DESCRIPTION OF DRAWINGS

FIG. 3 is an explanatory diagram of the unsharp signal US and the output signal OS in the first embodiment.

FIG. 11 is an explanatory diagram for describing the output of the processed signal OS of the same.

FIG. 23 is an explanatory diagram for describing the output of the processed signal of the same.

Figure 1:
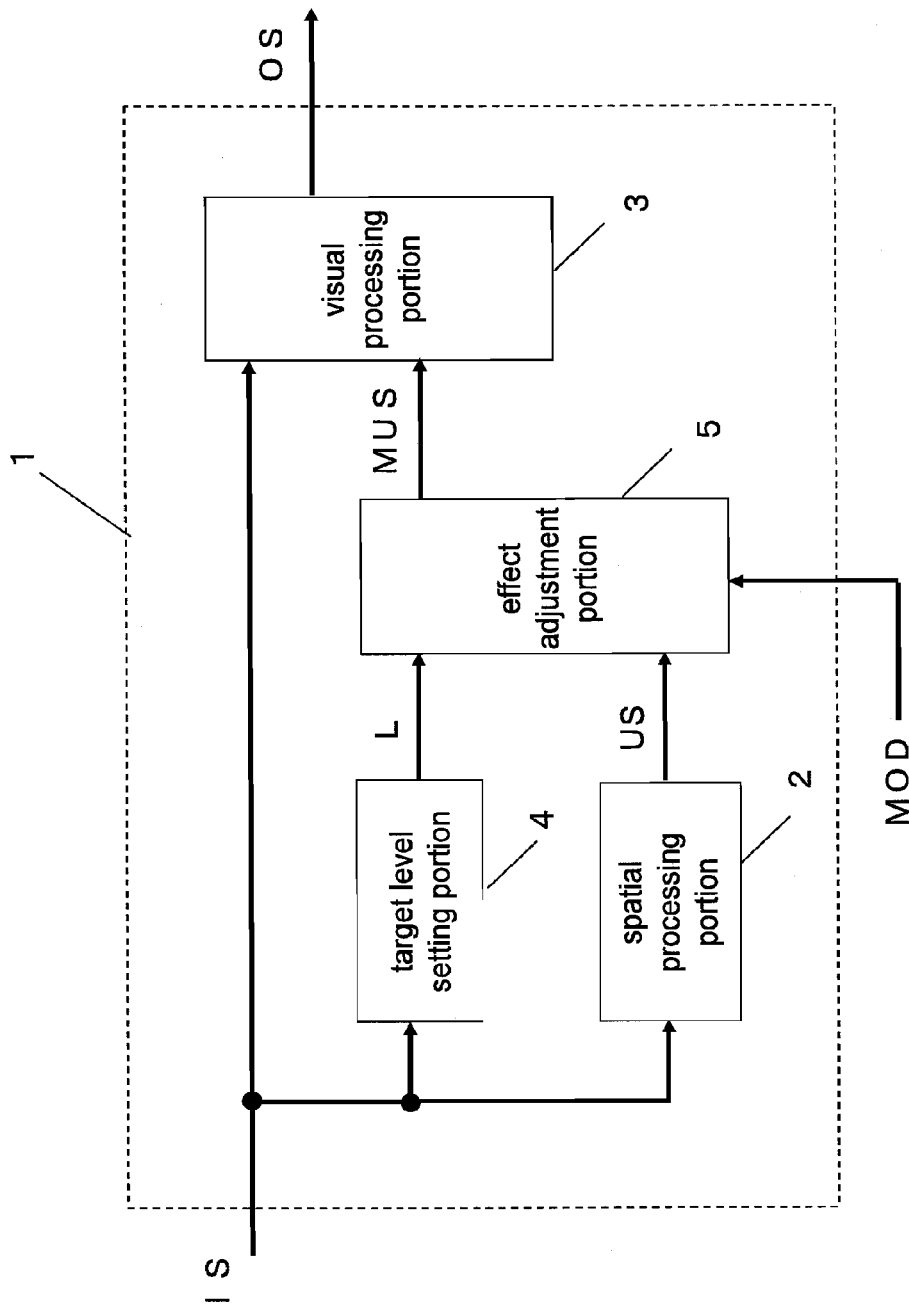
FIG. 1 is a block diagram of a visual processing device according to the first embodiment of the invention.

DESCRIPTION OF THE REFERENCE NUMERALS 1, 20, 101, 102, 103, 104, 1001, 1002, 1003, 1004 visual processing device
2, 10 spatial processing portion
3, 21, 30, 31, 32 visual processing portion
4 target level setting portion
5, 1020, 1021, 1022, 2021, 2022 effect adjustment portion
22 multiplication portion
40 control signal generation portion
41 edge detection portion
42 edge proximity detection portion
43 flatness detection portion
44, 2144, 704, 84, 93 effect adjustment signal generation portion
2140, 700, 80, 90 special image detection portion
50 continuous changing portion
2141 edge detection portion
2142 edge amount determination portion
2143 edge density calculation portion
2144 effect adjustment signal generation portion
701 frequency detection portion (classifier)
702 frequency determination portion
703 tone level number detection portion
81 analogous luminance detection portion
82 continuous length detection portion
83 mean continuous length calculation portion
91 high-frequency block detection portion
92 high-frequency block density detection portion
1905, 4005 gain-type visual processing device

DETAILED DESCRIPTION OF THE INVENTION

Below, visual processing devices according to embodiments of the invention are described with reference to the drawings.

First Embodiment

First, the visual processing device according to a first embodiment is described. The visual processing performed here is processing for giving characteristics that are close to human vision, and is for determining an output signal based on the contrast between the value of a target pixel of an image signal that has been input and the values of the pixels around that target pixel. Examples of processing that may be adopted include backlight correction, knee processing, DR compression, and brightness adjustment (including tone processing and contrast adjustment).

FIG. 1 is a block diagram of a visual processing device 1 according to the first embodiment.

The visual processing device 1 performs visual processing on an image signal IS and outputs an output signal OS that has been visually processed.

A spatial processing portion 2 obtains the values of pixels targeted for spatial processing, and the values of pixels in the region around the target pixels (hereinafter, referred to as "surrounding pixels"), from the input signal IS. The spatial processing portion 2 performs spatial processing on the input value for each pixel of the original image that has been obtained and outputs an unsharp signal US. The unsharp signal US is a blur signal that is obtained by processing the input signal IS with a low-pass filter.

From the unsharp signal US it is possible to detect the brightness, including the region surrounding the target pixel.

A target level setting portion 4 is for setting a target level for the desired effect of visual processing. For example, it sets a target for the tone conversion characteristics up to which to change the effect of the local contrast and the desired visual processing effect of DR compression. The target level setting portion 4 sets a function for determining the target level value that has been set according to the tone conversion characteristics to be adjusted, and converts the input signal IS based on the predetermined function.

Figure 2:
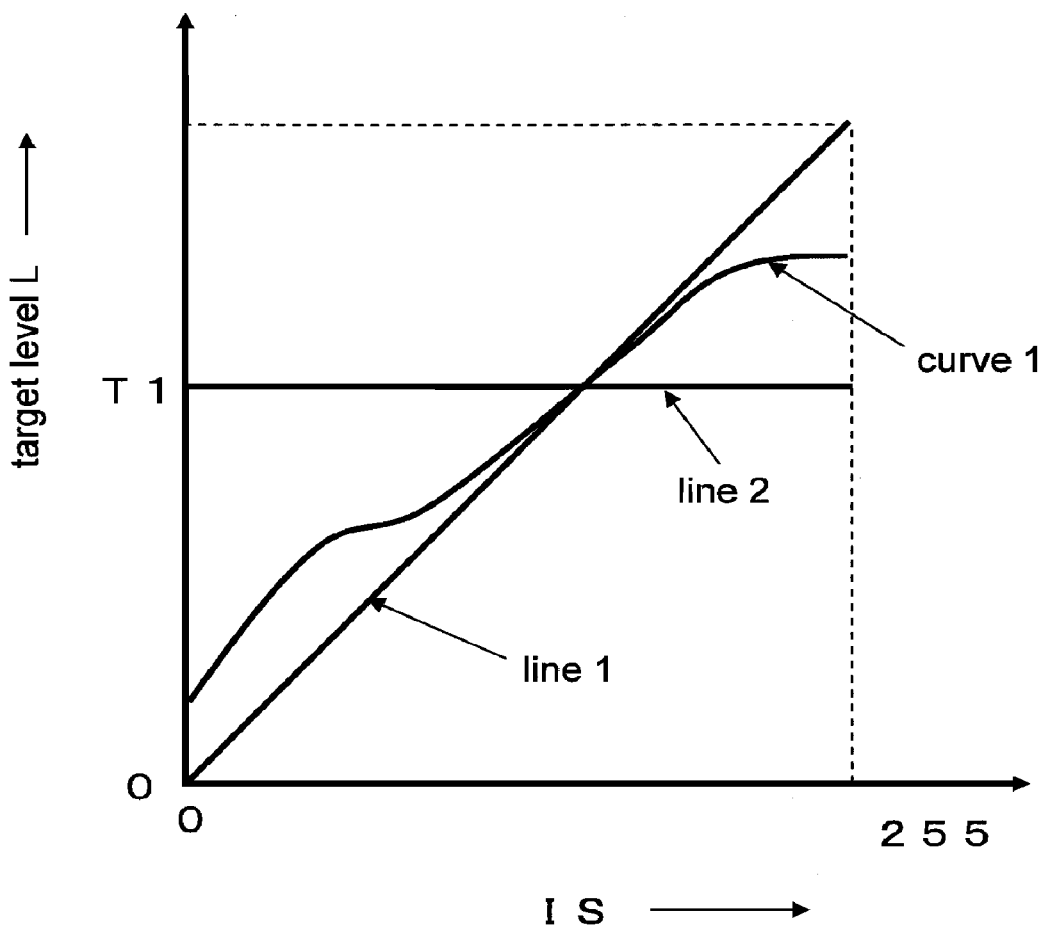
FIG. 2 is a diagram of the characteristics of the target level setting portion of the first embodiment.

Specifically, for local contrast processing, it outputs a target level value L in accordance with the conversion characteristics of line 1 shown in FIG. 2. Here, line 1 changes the target level in accordance with the input signal IS. For example, the target level L may be set equal to the input signal IS. It should be noted that in this case, the target level setting portion 4 is not necessary.

Similarly, for DR compression processing it outputs a target level value L in accordance with the conversion characteristics of line 2 shown in FIG. 2. Line 2 does not change the target level in accordance with the input signal IS. In other words, the target level L=a predetermined value T1 (fixed). It should be noted that in this case, the target level setting portion 4 is not necessary.

It should be noted that it is also possible to output a target level value L based on conversion characteristics that are intermediate to line 1 and line 2. For example, it is possible for the target level L=(input signal IS+a predetermined value T1)÷2. Alternatively, it is also possible to output a target level value L based on a curve 1 that is set between line 1 and line 2.

An effect adjustment portion 5 synthesizes the target level L and the unsharp signal US by an interpolation computation ("interpolation computation" means the calculation of a single physical value from two physical values through interpolation) in accordance with an outside signal (effect adjustment signal) MOD, and outputs a synthesized signal (or "a modified unsharp signal") MUS. The effect adjustment portion 5 for example executes an interpolation computation in which MUS=(US−L)×MOD+L. The value of the outside signal (effect adjustment signal) MOD is set within a range from 0 to 1, where a MOD of 0 is no effect and a MOD of 1 is a maximum effect. A modified form of the equation is MUS=US×MOD+L×(1−MOD).

The visual processing portion 3 outputs an output signal OS for the input signal IS and the synthesized signal MUS based on the two-dimensional tone conversion characteristics that have been set. Various visual effects can be achieved by the tone conversion characteristics.

Next, the visual processing device 1 of the first embodiment of the invention is described in further detail.

First, the control in the case of enhancing or weakening the local contrast as the effect of visual processing is described. Control is performed by setting an effect adjustment signal from the outside.

Figure 4:
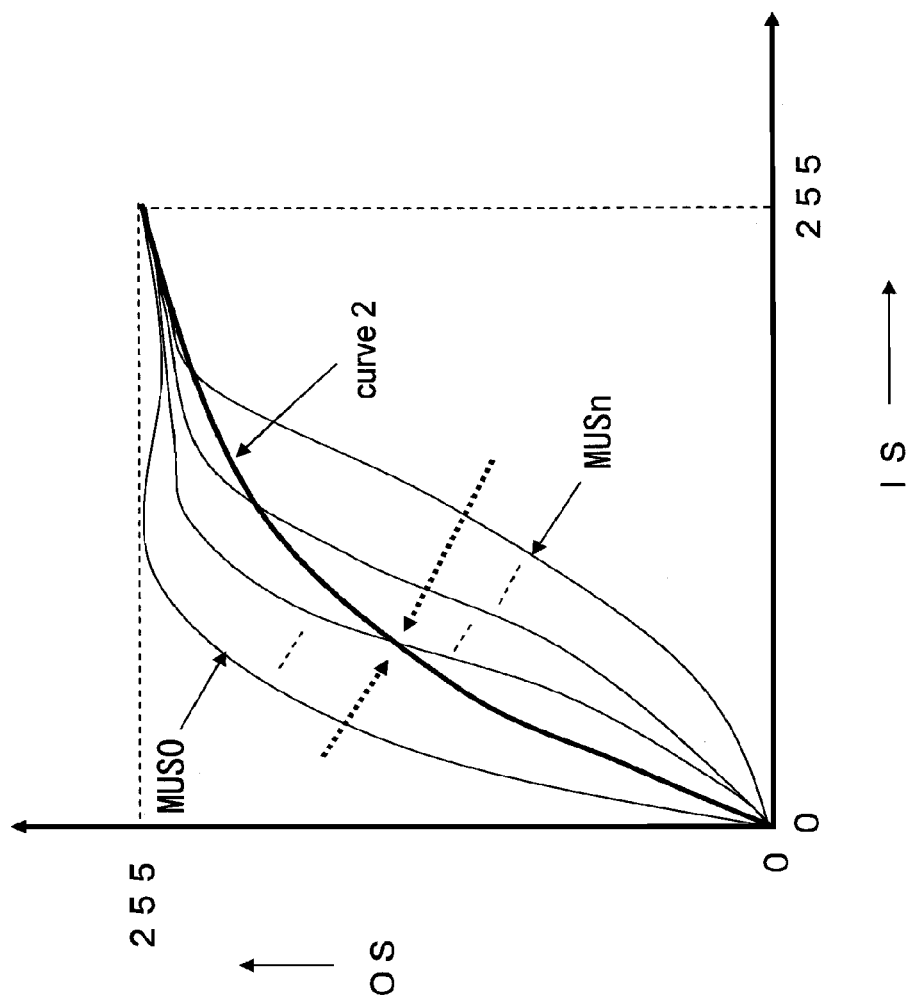
FIG. 4 is an explanatory diagram of the local contrast characteristics in the first embodiment.

The visual processing device 1 is set so that it has the two-dimensional tone conversion characteristics shown in FIG. 4. Here, the horizontal axis is the input signal IS that has been input, and the vertical axis is the converted output signal OS.

The two-dimensional tone conversion characteristics are the input/output characteristics of tone conversion for determining an output with respect to the synthesized signal MUS and the input signal IS. For example, it has predetermined tone conversion characteristics according to the signal levels from the synthesized signals MUS0 to MUSn in FIG. 4. Thus, when the pixel value of the input signal IS is an 8-bit value, the pixel value of the output signal OS corresponding to the value of the input signal IS separated into 256 levels is determined based on the predetermined two-dimensional tone conversion characteristics. The tone conversion characteristics are tone conversion curves that have predetermined gamma conversion characteristics, and the relationship is such that the output monotonically decreases along with the subscript of the synthesized signal MUS. It should be noted that even if there are ranges where the output partially does not monotonically decrease along with the subscript of the synthesized signal MUS, it is sufficient for it to be substantially monotonically decreasing. As shown in FIG. 4, in the two-dimensional tone conversion characteristics, the relationship where (the output value when MUS=MUS0)≧(the output value when MUS=MUS1)≧ . . . ≧(the output value when MUS=MUSn) is satisfied for the brightness value of the pixels of all input signals IS. With these tone conversion characteristics, the contrast of the local region is enhanced.

Next, the spatial processing portion 2 obtains an unsharp signal US by performing a low-pass spatial filter computation, which passes only the low spatial frequencies, on target pixels in the input signal IS. In this filter computation, the pixel values of the target pixels and the surrounding pixels are calculated based on US=(Σ[Wij]×[Aij])/(Σ[Wij]), for example. Here, [Wij] is the weight coefficient of the pixel of the target pixel and surrounding pixels that is located in the i-th row j-th column, and [Aij] is the pixel value of the pixel of the target pixel and surrounding pixels that is located in the i-th row j-th column. The symbol Σ means to take the sum for each of the target pixels and the surrounding pixels.

More specifically, a case in which the weight coefficient [Wij] is 1 and the pixel value [Aij] is expressed as A(i,j) is described. As for the pixel values of the target pixels, A(1,1) is 128, A(0,0) is 110, A(0,1) is 115, A(0,2) is 117, A(1,0) is 123, A(1,2) is 120, A(2,0) is 120, A(2,1) is 127, and A(2,2) is 125. At this time, to obtain an unsharp signal US from a region of 3 pixels×3 pixels, the unsharp signal US is obtained by performing the calculation US=(128+110+115+117+123+120+120+127+125)/9.

It should be noted that it is possible to assign a weight coefficient with a smaller value the larger the absolute value of the difference between the pixel values, and it is also possible to assign a smaller weight coefficient the larger the distance from the target pixels.

The region of the surrounding pixels is a size that is set in advance depending on the effect. The surrounding pixel region is preferably set to a relatively large region in order to obtain a visual effect. For example, when the size of the target image is XGA (1024×768), the surrounding pixel region is set to a region of at least 80 pixels×80 pixels.

As the low-pass spatial filter it is possible to use a FIR (Finite Impulse Response)-type low-pass spatial filter or an IIR (Infinite Impulse Response)-type low-pass spatial filter, which are normally used to create unsharp signals.

In local contrast processing, the target level setting portion 4 sets the conversion characteristics of line 1 shown in FIG. 2, setting the target level L=input signal IS. Consequently, when the effect adjustment signal MOD=0, the visual processing has "no effect" and thus the synthesized signal MUS=the input signal IS.

(for example, if the synthesized signal MUS is found by MUS=US×MOD+IS×(1.0−MOD), then by substituting MOD=0 into this equation, the synthesized signal MUS=the input signal IS.

It should be noted that if the target level L is set equal to the input signal IS, then it is not necessary to have the target level setting portion 4. In this case, the input signal IS can be input directly to the effect adjustment portion 5.

As for the visual processing portion 3, when the synthesized signal MUS=the input signal IS, the two signals that are input to the visual processing portion 3, that is, the input signal IS and the synthesized signal MUS, are the same value, so that in the visual processing device 1, tone conversion based on the tone conversion characteristics of curve 2 shown in FIG. 4 is executed. The tone conversion characteristics of curve 2 have the characteristics of brightness adjustment only (gamma conversion), and do not have the effect of increasing the local contrast.

The effect adjustment portion 5 adjusts the effect of the required visual processing based on the setting of the effect adjustment signal MOD. For example, if MOD=0.5, then the synthesized signal MUS is set to MUS=(US−L)×MOD+L, and when L=IS, the synthesized signal MUS=0.5×US+0.5× IS.

As shown in FIG. 3(a), at this time the synthesized signal MUS is an output that is intermediate between the input signal IS and the unsharp signal US. The output signal OS(MUS) that has been visually processed with the synthesized signal MUS is, as shown in FIG. 3(b), an intermediate output between the output signal OS(IS) that has been visually processed based on only the input signal IS and the output signal OS(US) that has been visually processed based on only the unsharp signal US. Thus, the visual processing device 1 outputs an output signal OS(US) with a MOD of 1 whose visual processing is the "maximum effect" and an output signal OS(IS) with a MOD of 0 whose visual processing is "no effect."

Thus, the visual processing effect of the local contrast can be strengthened or weakened in accordance with the value of the effect adjustment signal MOD.

The effect adjustment portion 5 also creates a synthesized signal MUS by interpolating the input signal IS and the unsharp signal US with the effect adjustment signal MOD. Thus, it can change the effect of the visual processing from the characteristics of only gamma conversion for converting a predetermined brightness, to the characteristics for converting the local contrast.

DR compression processing is described next using FIG. 5. In an image-capturing device such as a camera, DR compression processing is for keeping the input range of the CCD to which the image is input to within a recording range for recording by the image-capturing device. Normally, in order to capture an image while adjusting the brightness in reference to a person's face, brightness setting is performed such that the brightness of the face becomes about 80% of the DR of the output. Thus, for example, it is necessary for the bright sky region in the background of the face, etc., to fit into the remaining 20% of the DR of the output. For this reason, generally "knee processing" for compressing and converting the DR of the output is performed from the point that the input range is equal to or greater than a fixed level, as illustrated by curve 4 shown in FIG. 5.

However, when the signal of bright regions such as sky is compressed to fit into the range of 20% of the DR of the output, insufficient gradations may lead to the loss of shaded areas (gradation areas) such as clouds.

Figure 5:
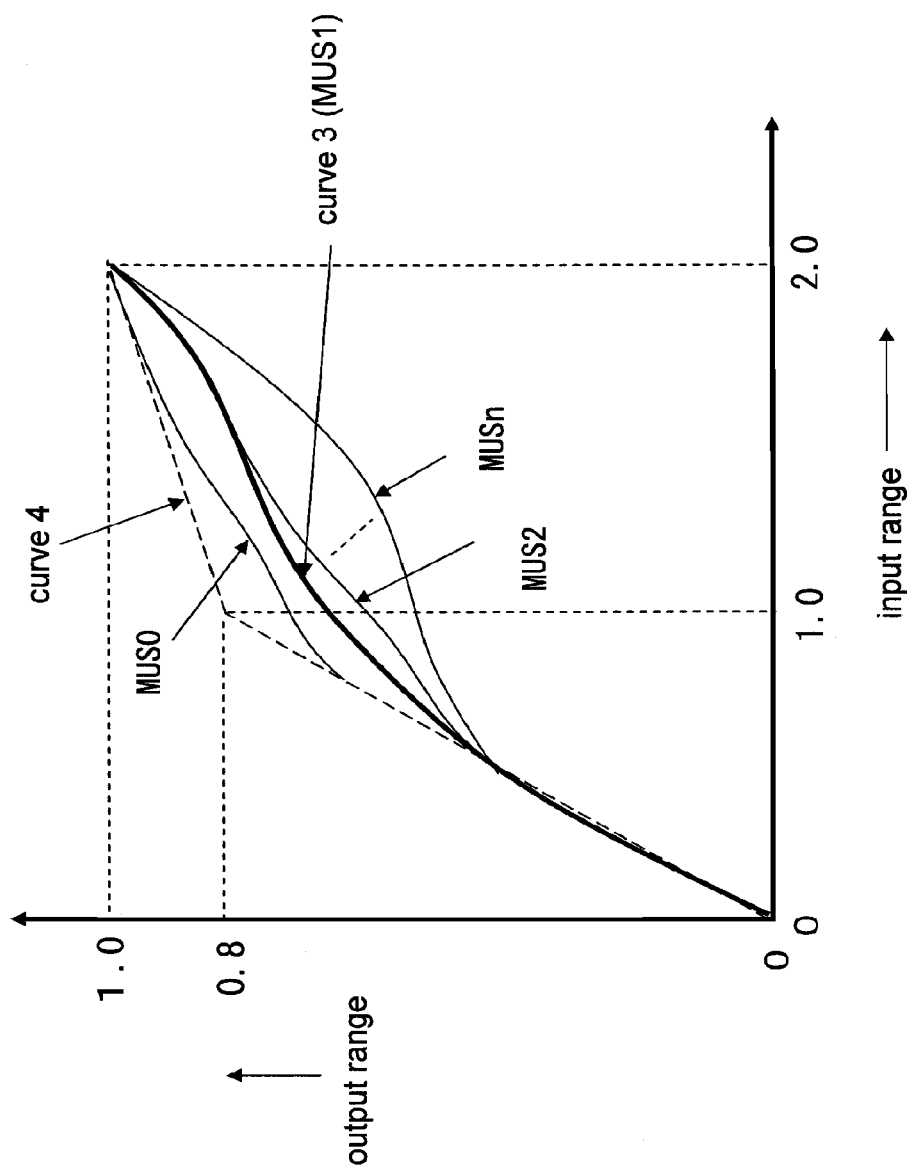
FIG. 5 is an explanatory diagram of the DR compression characteristics in the first embodiment.

Accordingly, as shown in FIG. 5, the visual processing device 1 has tone mapping curves MUS0 to MUSn for converting bright regions whose input range has a greater value than approximately 1.0, and based on these tone mapping curves, controls the degree of compression according to the synthesized signal MUS. Thus, even if the signal of a bright region is input to the visual processing device 1, it is possible to prevent a lack of gradations in the output signal from occurring.

The conversion characteristics of line 2 in FIG. 2 also may be set in the target level setting portion 4 so that the target level L=a predetermined value T1 (fixed).

In this case, when the effect adjustment signal MOD is 0 and the synthesized signal MUS=US×MOD+L×(1.0−MOD), then the synthesized signal MUS becomes T1, and when the effect adjustment signal MOD is 1, the synthesized signal MUS is equal to the unsharp signal US. A single predetermined curve is selected from among the curves MUS0 to MUSn shown in FIG. 5 based on the setting for the target level L.

When the synthesized signal MUS is equal to T1 (fixed value), the visual processing portion 3 performs DR compression fixed at the tone conversion curve of curve 3 shown in FIG. 5. When the synthesized signal MUS is equal to the unsharp signal US, it performs DR compression that corresponds to the brightness of the local region, and thus in this DR compression, the effect of the visual processing corresponding to the brightness of the local region increases.

Next, the effect of the required visual processing is adjusted based on the setting of the effect adjustment signal MOD by the effect adjustment portion 5. For example, if MOD=0.5, then the synthesized signal MUS=0.5×US+0.5× T1.

In this way, by setting the effect adjustment signal MOD to a predetermined value, it is possible to achieve DR compression whose effects are different strengths, based on a conversion curve that is determined through interpolation of the tone conversion curve of curve 3 and the tone conversion curve MUSn.

It should be noted that the visual processing device 1 has the configuration of outputting the value that is obtained by converting the tone level of the input signal IS with the visual processing portion 3 as the output signal OS, but it may also have a configuration in which it outputs the value of the gain for the input signal IS, which corresponds to the value obtained by tone conversion.

Figure 6:
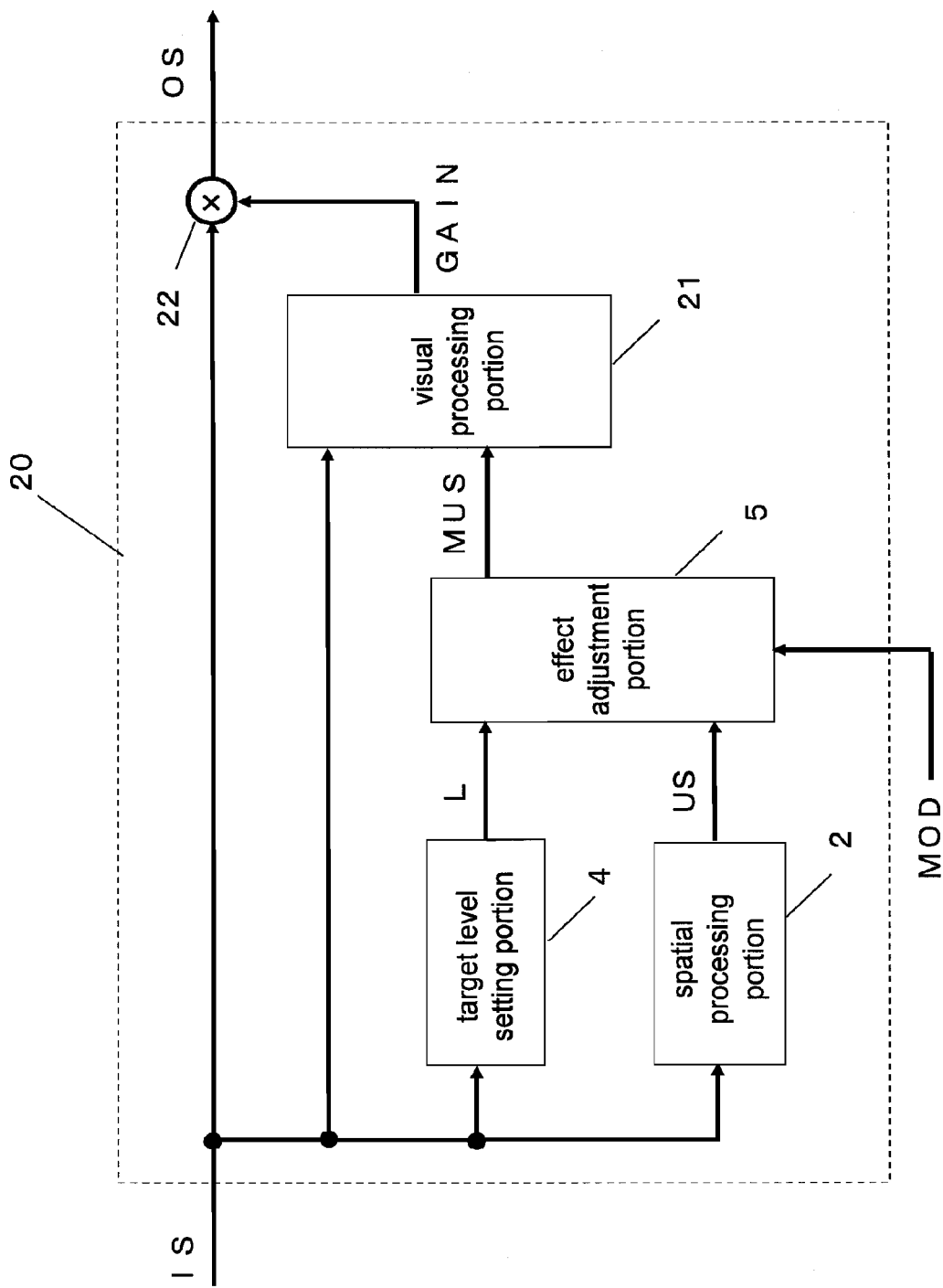
FIG. 6 is a block diagram of a first modified example of the visual processing device of the first embodiment.

FIG. 6 shows a block diagram of a visual processing device 20 according to a first modified example. To avoid repetition, the discussion of processing that is identical to that of the visual processing device 1 (FIG. 1) has been omitted.

Figure 7:
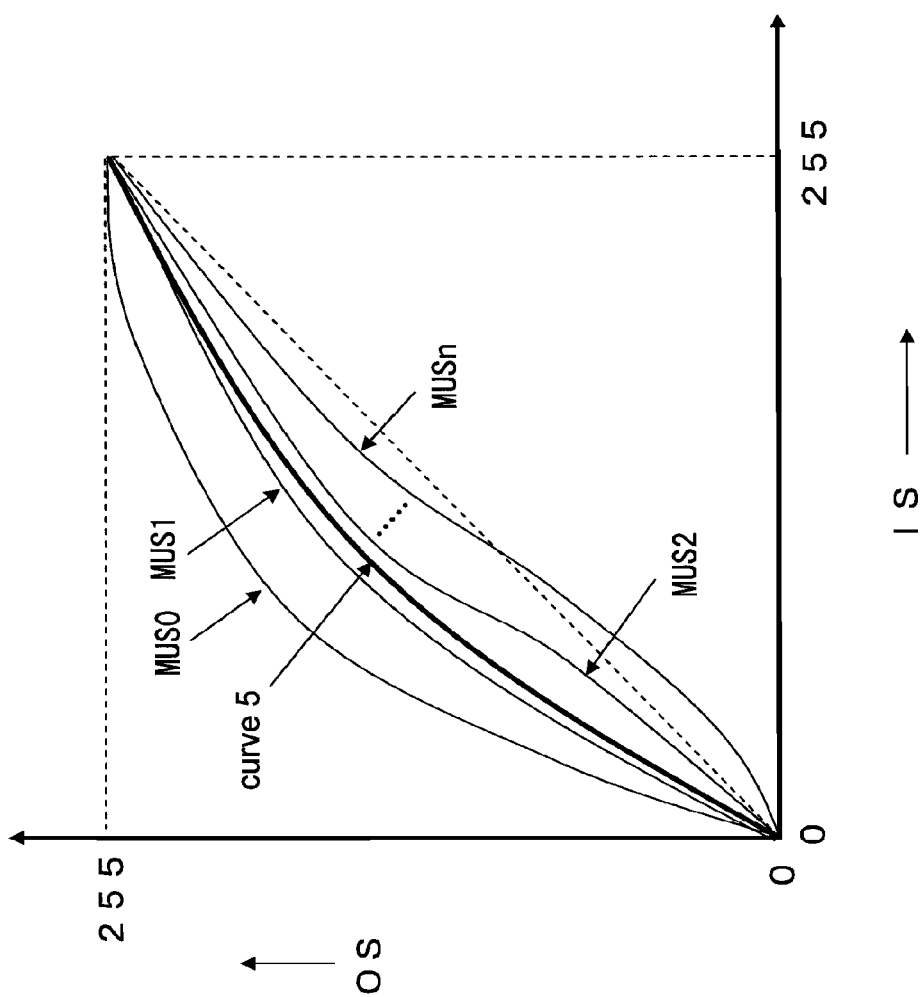
FIG. 7 is an explanatory diagram of the tone conversion characteristics in the first embodiment.

In FIG. 6, the visual processing device 20 has for example been set to that it has the two-dimensional tone conversion characteristics shown in FIG. 7. Here, the horizontal axis is the input signal IS that has been input, and the vertical axis the converted output signal OS.

For the tone conversion characteristics, different tone conversion curves from MUS0 to MUSn are selected based on the synthesized signal MUS. Based on these characteristics, conversion is performed such that the dark regions in the image have a higher contrast due to MUS0 and become brighter. On the other hand, conversion of bright regions in the image is inhibited by MUSn. Thus, it is possible to achieve effective dark area correction for backlit images in which people's faces are dark and the background region is bright, for example.

Figure 8:
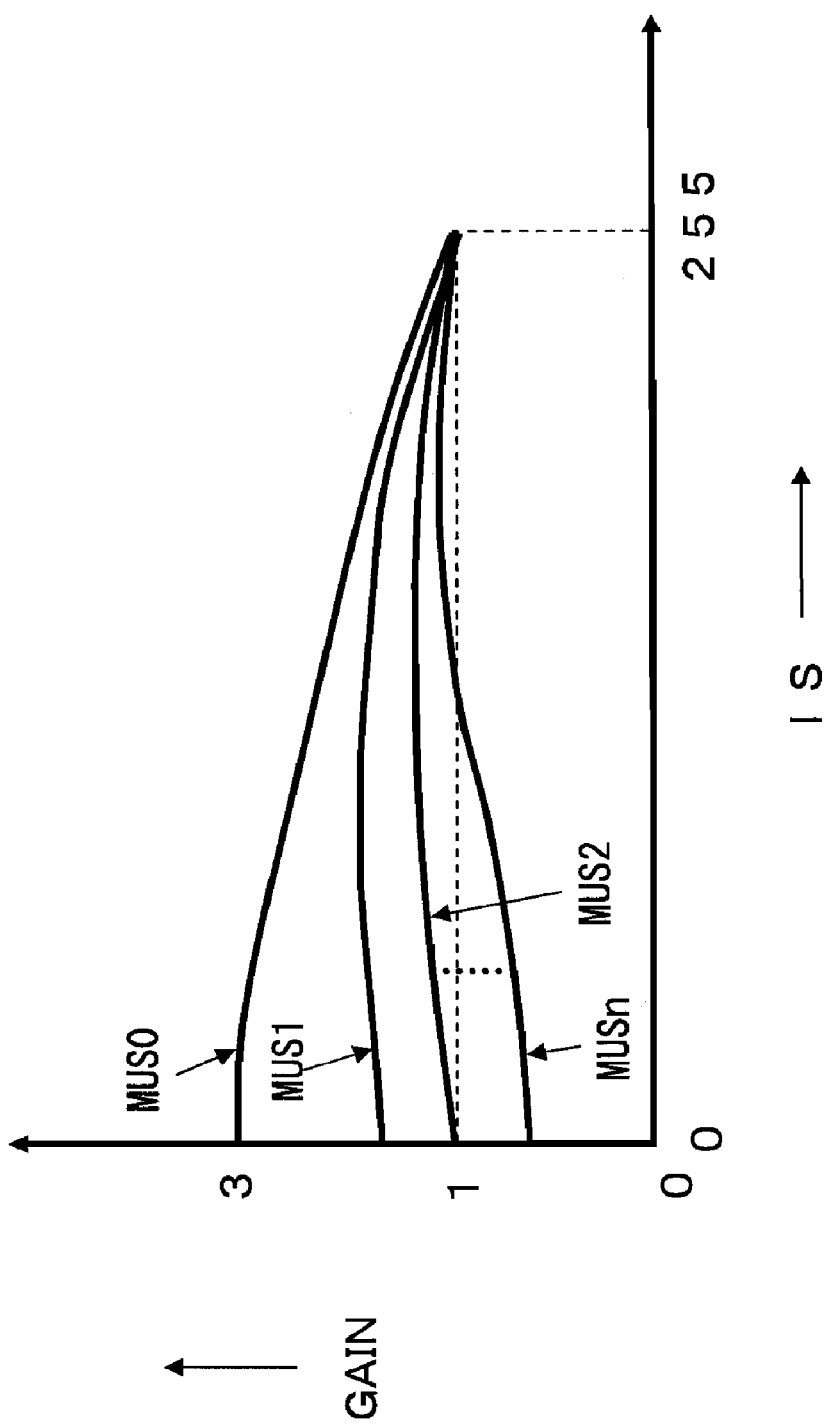
FIG. 8 is an explanatory diagram of the gain characteristics in the first embodiment.

Here, a visual processing portion 21 corrects the input signal IS based on the gain characteristics shown in FIG. 8, using the slope of the tone conversion curve of FIG. 7 as the gain. The horizontal axis is the input signal IS that has been input, and the vertical axis is the output of the gain signal GAIN.

An output that is equal to the output signal OS shown in FIG. 7 may be obtained by multiplying the gain signal GAIN by the input signal IS.

If tone conversion processing is to be achieved based on the tone conversion curve of FIG. 7, then the target level setting portion 4 sets the conversion characteristics of line 1 shown in FIG. 2 so that the target level L=the input signal IS. Thus, when the effect adjustment signal MOD=0, the synthesized signal MUS=the input signal IS.

The effect adjustment portion 5 synthesizes the target level L and the unsharp signal US through interpolation in accordance with the effect adjustment signal MOD, and outputs a synthesized signal MUS. In other words, it is possible to adjust the strength of the effect of visual processing with the effect adjustment signal MOD.

As for the visual processing portion 21, when the synthesized signal MUS=the input signal IS, the two signals that are input to the visual processing portion 3, that is, the input signal IS and the synthesized signal MUS, are the same value, and in the visual processing device 20, tone conversion of only the predetermined gamma conversion of curve 5 shown in FIG. 7 is executed, and tone conversion that has the effect of dark area correction is not executed.

Thus, by setting the value of the effect adjustment signal MOD, it is possible to adjust the effect of tone conversion from tone conversion with the characteristics of only a predetermined gamma conversion to tone conversion for achieving dark area correction.

The visual processing portion 21 outputs a gain signal GAIN based on the input signal IS and the synthesized signal MUS in order to achieve the gain properties that are set.

A multiplication portion 22 multiplies the gain signal GAIN and the input signal IS, and outputs an output signal OS.

One feature of the two-dimensional gain characteristics is that the change in the curve with respect to the input signal IS is smoother than the tone conversion curve. Thus, sufficient processing precision can be ensured even if the input signal IS and the synthesized signal MUS are thinned out roughly, and the bit precision of the input signal IS that is input to the visual processing portion 21 can be dropped. Thus, the scale of the circuit can be reduced in the hardware and logic design.

It should be noted that the visual processing portion 21 is constituted by a two-dimensional lookup table (hereinafter, referred to as "2D LUT") that gives the relationship between the input signal IS and the synthesized signal MUS and the gain signal GAIN, and it is also possible for a gain signal GAIN to be output with respect to the input signal IS and the synthesized signal MUS in reference to the 2D LUT. Thus, by storing gain values rather than tone conversion values in the 2D LUT, it is possible to reduce the number of bits of the two input signals, and this allows the memory capacity to be significantly reduced.

Having a 2D LUT serve as the visual processing portion 21 allows complex gain characteristics to be created in advance. Having a 2D LUT serve as the visual processing portion 21 allows the visual processing portion 21 to be achieved by a read-only memory (hereinafter, "ROM"). To make it possible to update the gain characteristics, it is also possible for the 2D LUT to be constituted by a rewritable memory such as a random access memory (hereinafter, "RAM"). The 2D LUT stores gain data having two-dimensional gain characteristics that have been set in advance. By changing the two-dimensional gain characteristics, it is possible to obtain various visual effects such as local contrast processing and DR compression processing.

Further, the visual processing devices 1 and 20 allow the strength of the effect to be flexibly adjusted by setting the value of the effect adjustment signal MOD with respect to the strength of the visual processing.

It should be noted that the effect adjustment signal MOD is a signal that can be changed in advance or in real time, depending on the setting. For example, it may be possible to use a remote control to select a screen menu of a display device and then set a corresponding value as the effect adjustment signal MOD.

It is also possible to automatically extract a feature of the image, such as a predetermined image pattern, image gradation, or color, and automatically set the most suitably value as the effect adjustment signal MOD.

It is also for this to be semi-automatic, such as using a remote control to make a selection from among "video quality" or "news quality," for example, displayed on a screen selection menu of the display device, and then automatically set a value within an adjustment range that has been set in advance for each selection menu as the effect adjustment signal MOD.

It is also possible for the visual processing devices 1 and 20 to have a broadcast content detection portion, which is not shown, and for the broadcast content detection portion to detect genre information or program description information of EPG display data that have been separated as program information, or genre information or program description information of data that are currently being received, and then to change the effect adjustment signal MOD based on the content of the information that has been detected. It should be noted that the genre information of the data or the information of the image also may be detected by the MPEG stream information.

As described above, the visual processing device of the embodiment can both increase and decrease the strength of the visual processing using an effect adjustment signal MOD, and thus it is not necessary to recreate the tone conversion characteristics data or the gain characteristic data in accordance with the strength.

Thus, it is not necessary to provide a dedicated circuit for achieving visual processing at various strengths or profile data LUTs for achieving visual processing at various strengths. Thus, the visual processing device can be achieved with less hardware circuitry and table memory capacity. Further, the visual processing device uses a LUT and it is not necessary to change the content of the LUT, and thus the time required for this change can be obviated and the visual effect to be adjusted in real time.

The visual processing device of this embodiment allows the effect adjustment signal MOD to be changed in real time, and thus the strength of the visual processing effect can be changed in real time. Specifically, it is possible to change the strength of the visual processing in frame or in pixel units, and this allows the strength of the visual processing to be changed for local regions in the image.

The effect adjustment portion 5 creates the synthesized signal MUS by interpolating the unsharp signal US and the input signal IS, the level signal, or a preset value for these signals, using the effect adjustment signal MOD. Thus, the visual processing device can change the effect of the visual processing from characteristics of only gamma conversion for transforming a predetermined brightness, to characteristics for transforming the local contrast.

Second Embodiment

Next, a second embodiment of the invention will be described in detail using the drawings.

In general, natural images have many tone levels, and by performing visual processing on natural images, it is possible to obtain sharp images with a high local contrast, for example. On the other hand, when visual processing is performed on an image with steep edges, the artifacts are prone to stand out. When the strength of the visual processing is reduced in order to suppress the artifacts, the processing becomes weak even for natural images and the resulting image is not sharp.

Thus, by weakening the visual processing only near edges, it is possible to maintain the processing effect for the natural image overall while suppressing artifacts near the edges.

The visual processing device according to the second embodiment of the invention performs adjustment (of the strength or correction amount) by outputting an effect adjustment signal for differing the visual processing effect so as to vary the effect of visual processing in correspondence with the effect adjustment signal.

It also performs adjustment by detecting regions adjacent to an edge or flat regions adjacent to an edge in the image to be subjected to visual processing, and creates an effect adjustment signal from the edge amount and the degree of flatness and differs the effect of visual processing in accordance with the effect adjustment signal.

Thus, even if an image with a steep edge region is input to the visual processing device, it is possible to obtain the visual processing effect while suppressing artifacts near the edge.

Here, visual processing is processing for giving characteristics that are close to human vision, and is for determining the value of an output signal based on the contrast between the value of a target pixel of an image signal that has been input and the values (brightness) of pixels around that target pixel. The visual processing may be adopted in backlight correction, knee processing, DR compression, color processing, and brightness adjustment (including tone processing and contrast adjustment), for example.

In this embodiment of the invention, the luminance component Y or the brightness component L of a YCbCr color space, a YUV color space, a Lab color space, a LUV color space, a YIQ color space, or a YPbPr color space is defined as the luminance signal. Hereinafter, the luminance signal is described as the image signal.

Figure 9:
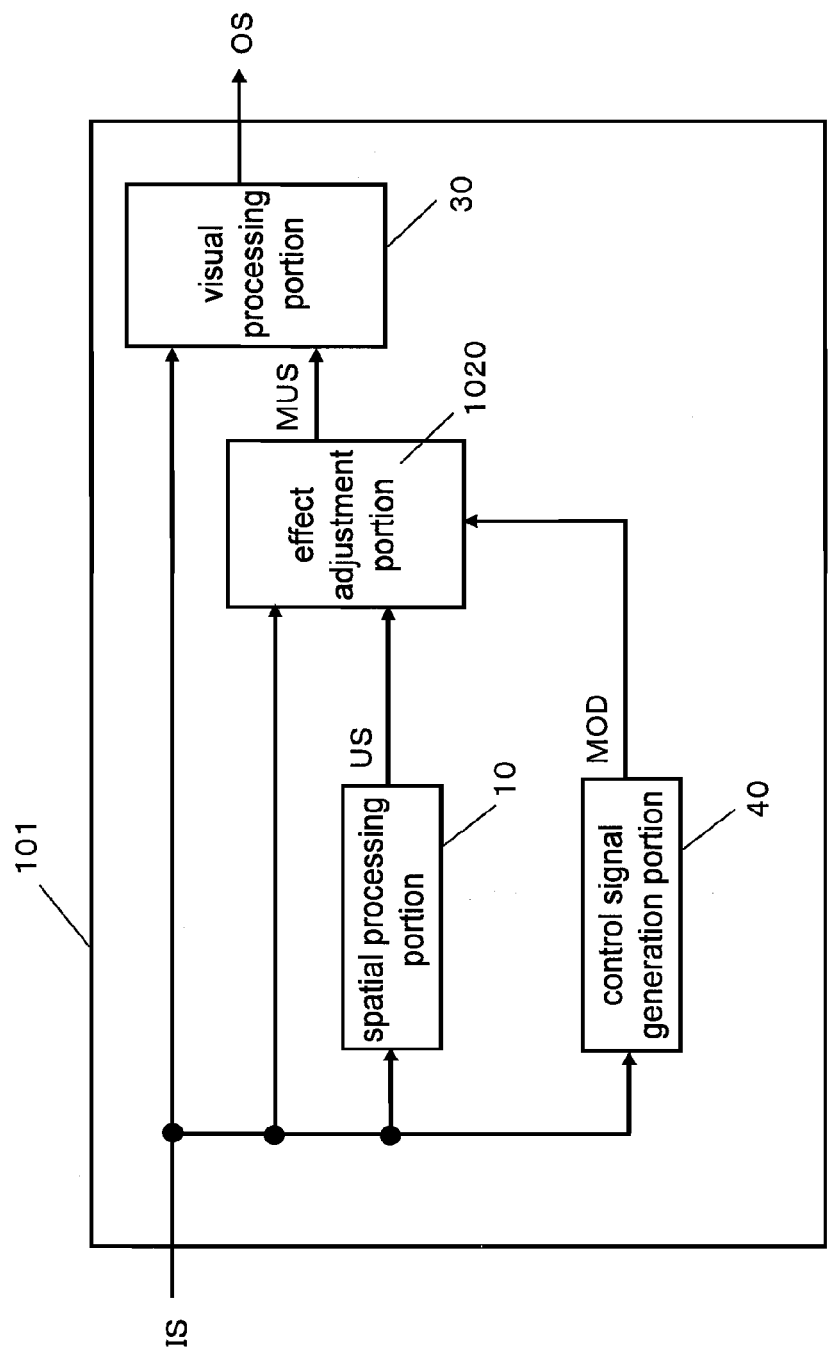
FIG. 9 is a block diagram showing the configuration of the visual processing device of the first embodiment of the invention.

The visual processing device of the second embodiment of the invention is described using FIGS. 9 through 16. FIG. 9 is a block diagram showing the configuration of a visual processing device 101 according to the second embodiment of the invention.

In FIG. 9, the visual processing device 101 according to the second embodiment of the invention is provided with a spatial processing portion 10 for outputting surrounding image information (unsharp signal) US from an image signal that has been input, a control signal generation portion 40 for outputting an effect adjustment signal MOD in accordance with the degree of flatness of the edge vicinity region, an effect adjustment portion 1020 for outputting a synthesized signal MUS that is synthesized changing the proportion of the image signal IS and the surrounding image information US according to the effect adjustment signal MOD, and a visual processing portion 30 for visually processing the image signal IS based on the synthesized signal MUS and the image signal IS.

The various functional sections of the visual processing device 101 are described below.

The spatial processing portion 10 extracts the value of a target pixel and the values of pixels in the region around the target pixel (hereinafter, called "surrounding pixels") from the image signal IS, and uses the values of the pixels that it has extracted to filter the image signal IS.

For example, the spatial processing portion 10 performs a low-pass filter on the image signal IS to create an unsharp signal US. The unsharp signal US is created by a computation such as the following.

$$US = (\Sigma[W_{ij}] \times [A_{ij}]) \div (\Sigma[W_{ij}])$$

Here, [Wij] is the weight coefficient of the pixel located at the i-th row j-th column among the target pixel and the surrounding pixels, and [Aij] is the pixel value of the pixel located at the i-th row j-th column among the target pixel and the surrounding pixels. The symbol Σ means to calculate the sum for each of the target pixel and the surrounding pixels.

It should be noted that it is possible to assign a weight coefficient with a smaller value the larger the absolute value of the difference between pixel values, and it is also possible to assign a smaller weight coefficient the larger the distance from the target pixel. The region of the surrounding pixels is a size that is set in advance in correspondence with the effect, and the visual effect can be increased by setting this region to size that is larger than a predetermined size. For example, if the size of the target image is 1024 pixels vertically by 768 pixels horizontally, then by creating an unsharp signal US from a region that is at least 80 pixels vertically by 80 pixels horizontally, the visual effect can be increased compared to local regions of about 3 pixels vertically by 3 pixels horizontally.

A FIR (Finite Impulse Response)-type low-pass spatial filter or an IIR (Infinite Impulse Response)-type low-pass spatial filter, which are commonly used to create unsharp signals, can be used as the low-pass spatial filter.

Next, the effect adjustment portion 1020 synthesizes the image signal IS and the unsharp signal US by interpolation in accordance with the effect adjustment signal MOD that has been output from the control signal generation portion 40, and outputs a synthesized signal MUS. The synthesized signal MUS is obtained through an interpolation computation such as that of Eq. 1 according to the effect adjustment signal MOD. The control signal generation section 40 is discussed later.

$$MUS = US \times MOD + IS \times (1.0 - MOD) \qquad \text{Eq. 1}$$

Here, the value of the effect adjustment signal MOD is changed within the range of 0.0 to 1.0, and when the value of the effect adjustment signal MOD is 0.0 there is no effect, whereas when the value of the effect adjustment signal MOD is 1.0, the strength of the processing is a maximum. It should be noted that Eq. 1 can be modified to Eq. 2, and similarly the synthesized signal MUS can be created.

$$MUS = (US - IS) \times MOD + IS \qquad \text{Eq. 2}$$

Next, the visual processing portion 30 converts the tone level of the image signal IS according to the synthesized signal MUS from the effect adjustment portion 1020.

Figure 10:
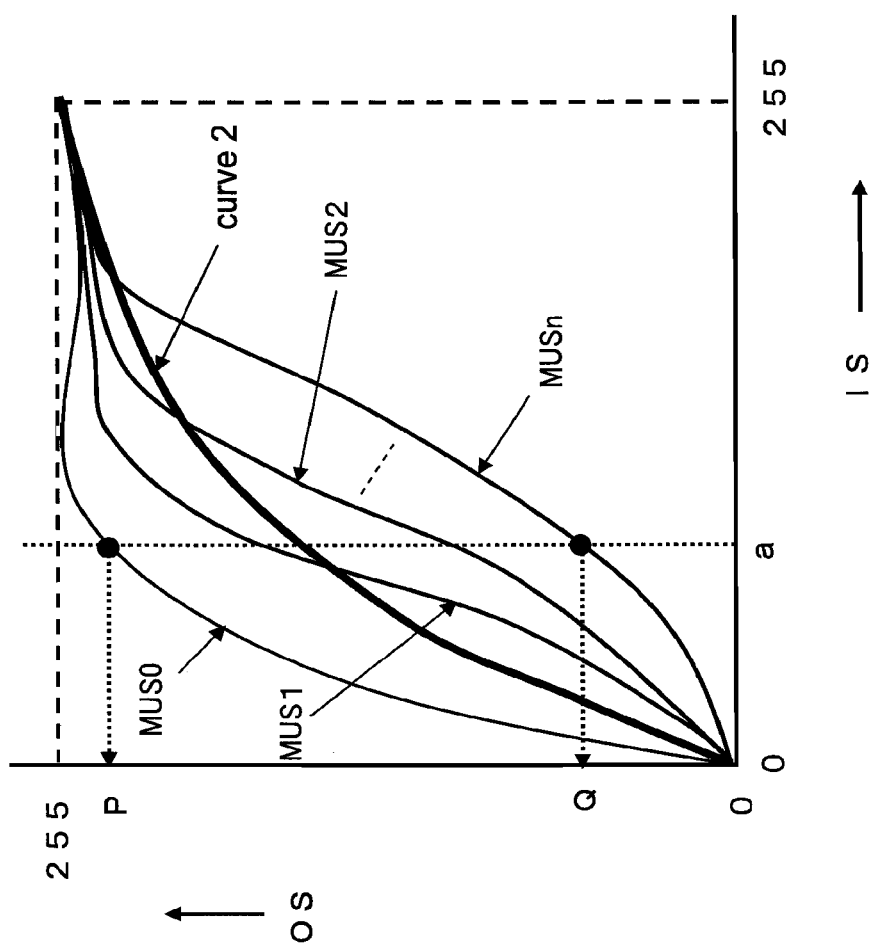
FIG. 10 is an explanatory diagram for describing the two-dimensional tone conversion characteristics of the same.

The visual processing portion 30 performs tone conversion based on the two-dimensional tone conversion characteristics shown in FIG. 10, for example. Here, two-dimensional tone conversion refers to tone conversion in which the value of an output is determined with respect to the two inputs, that is, the synthesized signal MUS and the image signal IS. The visual processing portion 30 outputs a processed signal OS with respect to the image signal IS and the synthesized signal MUS based on the two-dimensional tone conversion characteristics. It is possible to produce various visual effects based on the tone conversion characteristics.

The two-dimensional tone conversion characteristics are described using FIG. 10. FIG. 10 is an explanatory diagram for describing the two-dimensional tone conversion characteristics. Here, the horizontal axis is the image signal IS that has been input, and the vertical axis is the processed signal OS that has been transformed.

As shown in FIG. 10, the two-dimensional tone conversion has predetermined tone conversion characteristics that are in accord with the signal level of the synthesized signal MUS0 to MUSn. Thus, when the pixel value of the image signal IS is an 8-bit value, the pixel value of the output signal OS that corresponds to the value of the image signal IS separated into 256 levels is determined based on the predetermined two-dimensional tone conversion characteristics. The tone conversion characteristics are tone conversion curved that have predetermined gamma conversion characteristics, and the relationship is such that the output monotonically decreases along with the subscript of the synthesized signal MUS. It should be noted that even if there are ranges where the output partially does not monotonically decrease along with the subscript of the synthesized signal MUS, it is sufficient for it to be substantially monotonically decreasing. As shown in FIG. 10, in the two-dimensional tone conversion characteristics, the relationship of (the output value when MUS=MUS0) ≧(the output value when MUS=MUS1)≧ . . . ≧(the output value when MUS=MUSn) is satisfied for the brightness values of all input signal IS pixels.

With the two-dimensional tone conversion characteristics shown in FIG. 10, for an input image signal IS with a value "a," the visual processing portion 30 selects MUS0 when the brightness value of the surrounding region is small to obtain a value of "P" for the processed signal OS, whereas it selects MUSn when the brightness value of the surrounding region is large to obtain a value of "Q" for the processed signal OS. In this way, even for an input image signal IS with the value "a," the processed signal OS can be significantly varied from the value "P" to the value "Q" depending the change in the brightness value of the surrounding region. By doing this, the contrast of dark areas can be enhanced according to the synthesized signal MUS.

On the other hand, if the synthesized signal MUS is made equal to the image signal IS in order to eliminate the effect of visual processing, then it is possible to adopt the tone conversion characteristics of curve 2 shown in FIG. 10. With the tone conversion characteristics of curve 2, brightness adjustment (gamma conversion) of the entire image is possible, but there is no visual effect such as an increase in the contrast of only local dark area regions.

It should be noted that it is possible to produce various visual processing effects by changing the two-dimensional tone conversion characteristics, and thus the processing can be adopted for knee processing, DR compression, color processing, or brightness adjustment (including tone processing and contrast adjustment), for example.

Next, in the visual processing portion 30, the processed signal OS when the effect of visual processing has been differed based on the synthesized signal MUS is described using FIG. 11. FIG. 11 is an explanatory diagram for describing the output of the processed signal OS.

In FIG. 11(a), the horizontal axis is the pixel position to be processed, and the vertical axis is the output of the synthesized signal MUS.

For example, when the value of the effect adjustment signal MOD has been set to 0.5, the synthesized signal MUS becomes an output that is intermediate between the image signal IS and the unsharp signal US.

At this time, as shown in FIG. 11(b), if OS(IS,IS) is a processed signal OS processed based on only the image signal IS and OS(IS,US) is a processed signal OS processed based on the image signal IS and the unsharp signal US, then the processed signal OS(IS,MUS) that is obtained through visual processing according to the image signal IS and the synthesized signal MUS is an output that is intermediate between OS(IS,IS) and OS(IS,US).

Thus, the synthesized signal MUS is equal to US when the value of the effect adjustment signal MOD is 1.0, and a processed signal OS(IS,US) in which the visual processing effect is a maximum is output. On the other hand, the synthesized signal MUS is equal to IS when the value of the effect adjustment signal MOD is 0.0, and a processed signal OS(IS, IS) in which there is no visual processing effect is output.

In this way, the visual processing portion 30 can strengthen or weaken the effect of visual processing of the dark area contrast in accordance with the synthesized signal MUS. Thus, the visual processing device 101 can achieve various visual effects of varying effects, from the effect of processing in which only the brightness of the overall image is transformed, to the effect of processing for varying (changing) the contrast in a local region with the surrounding brightness.

It should be noted that the visual processing device 101 can achieve knee processing, DR compression processing, and color processing, for example, by changing the two-dimensional tone conversion characteristics.

It is also possible for the visual processing portion 30 to have a 2D LUT. In this case, the visual processing portion 30 performs tone conversion by setting the characteristic data (hereinafter, referred to as the "profile") shown in FIG. 10 in the 2D LUT of the visual processing portion 30.

The visual processing portion 30 can also perform visual processing through an arithmetic circuit. In particular, if profiles that are characteristics that can be approximated by a simple line are set in the 2D LUT of the visual processing portion 30, then it is possible to eliminate the table of the 2D LUT and reduce the circuit scale of the visual processing device 101.

Figure 12:
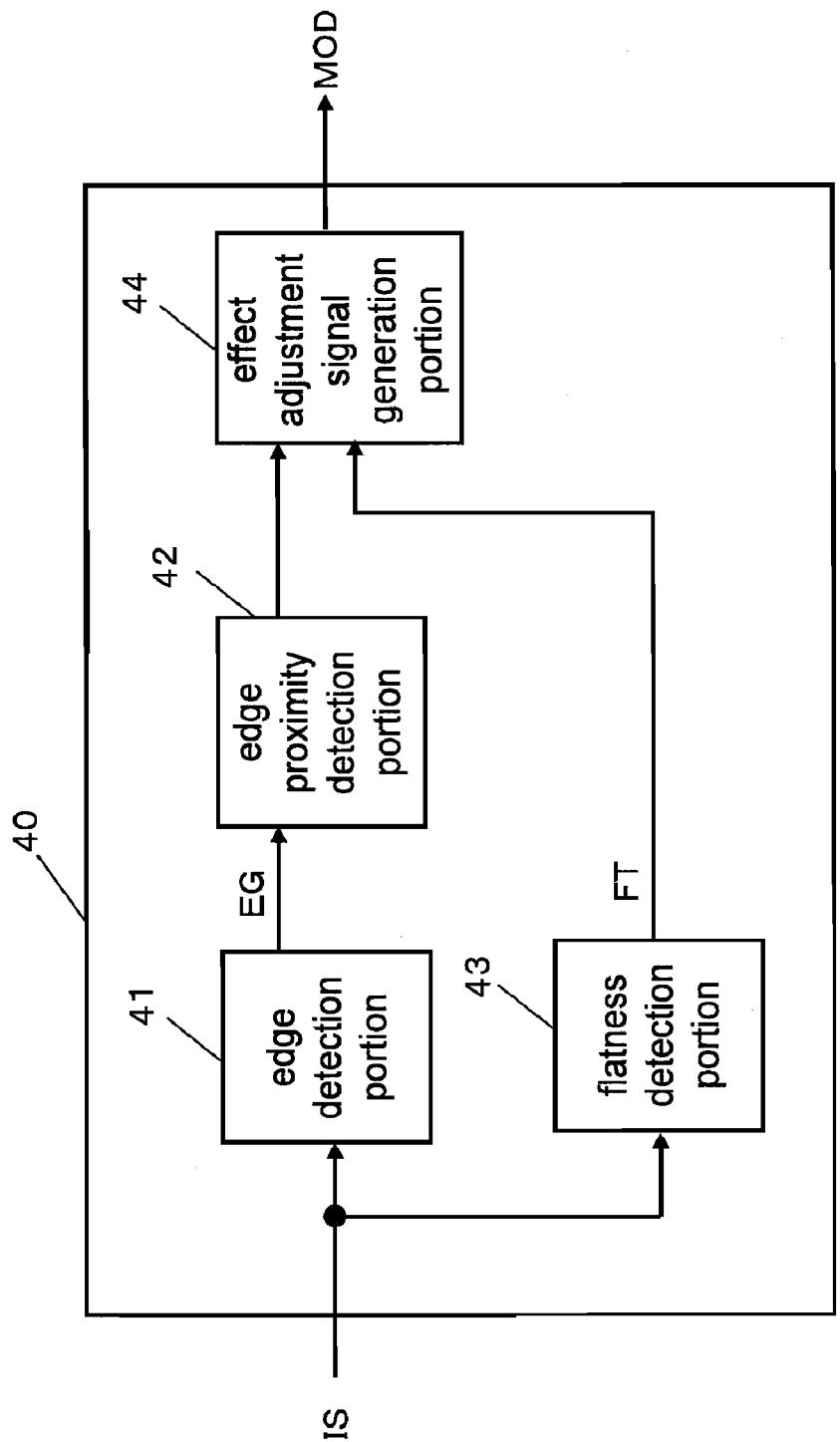
FIG. 12 is a block diagram that shows the configuration of the control signal generation portion of the same.
Figure 13:
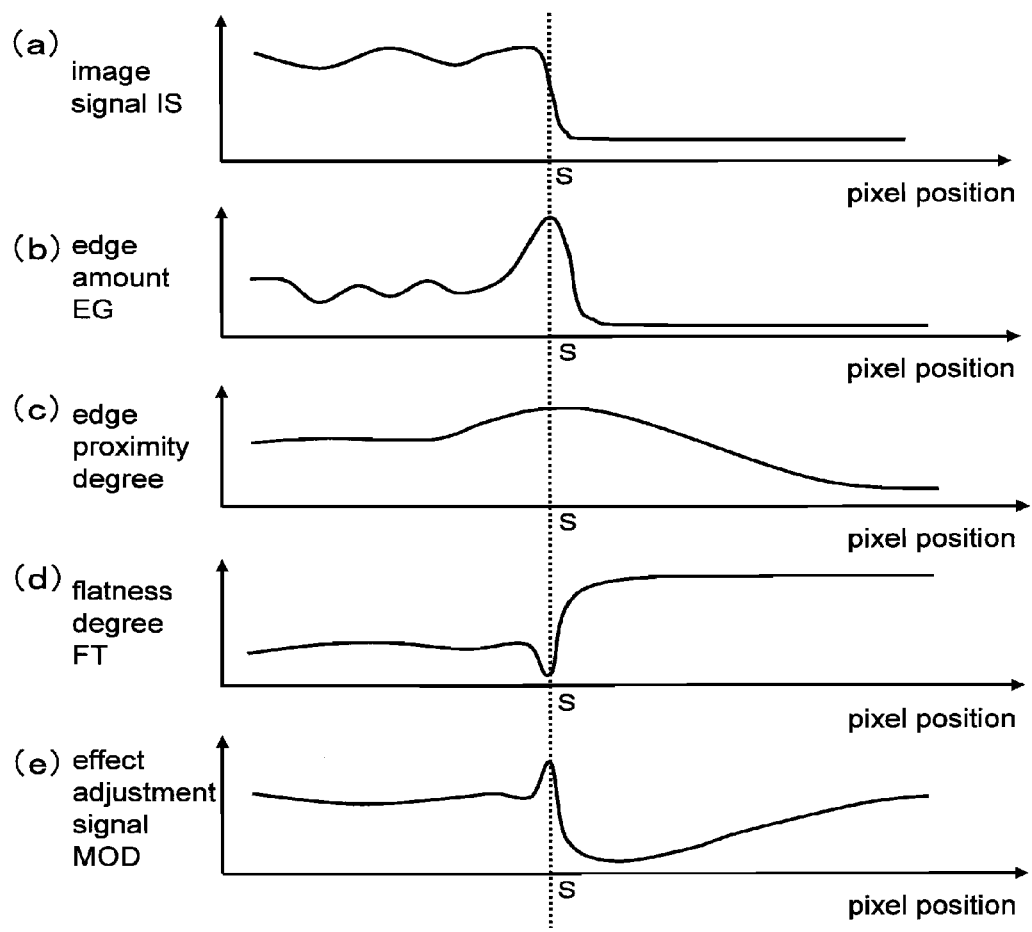
FIG. 13 is an explanatory diagram for describing the output of the effect adjustment signal of the same.

Next, the control signal generation portion 40 is described using FIGS. 12 and 13. FIG. 12 is a block diagram showing the configuration of the control signal generation portion 40, and FIG. 13 is an explanatory diagram for describing the output of the effect adjustment signal MOD.

As shown in FIG. 12, the control signal generation portion 40 is provided with an edge detection portion 41 for detecting the edge amount, that is, the luminance difference of each adjacent region, from the input signal IS, an edge proximity detection portion 42 for detecting the degree of proximity of the edge region from the edge amount, a flatness detection portion 43 for detecting the degree of flatness of flat regions whose luminance difference with an adjacent region is at or below a predetermined value, and an effect adjustment signal generation portion 44 for outputting an effect adjustment signal MOD in accordance with the degree of edge proximity degree and the degree of flatness.

The edge detection portion 41 detects the edge amount from the image signal IS for each region of a predetermined range. The edge detection portion 41 detects the edge amount EG using an edge detection filter (not shown) such as a first-order derivative filter like a Sobel filter or a Prewitt filter or a second-order derivative filter like a Laplacian filter. The edge detection portion 41 for example outputs an edge amount such as that shown in FIG. 13(b) when the image signal IS shown in FIG. 13(a) has been input. Here, in FIG. 13(a) the vertical axis is the value of the image signal IS, and the horizontal axis is the pixel position of the pixel being processed. The vertical axis in FIG. 13(b) is the edge amount EG, and the horizontal axis is the pixel position of the pixel being processed.

The edge proximity detection portion 42 detects region near an edge. For example, the edge proximity detection portion 42 applies a low-pass filter on the edge amount detected for each predetermined region, and outputs a degree of proximity that becomes a larger output with increased edge proximity. For example, as shown in FIG. 13(c), the edge proximity detection portion 42 outputs a degree of edge proximity that becomes a larger output as the edge proximity increases. Here, the vertical axis in FIG. 13(c) is the degree of edge proximity, and the horizontal axis is the pixel position of the pixel being processed.

The flatness detection portion 43 detects the degree of flatness of flat regions in which the difference in luminance with an adjacent region is at or below a threshold value. For example, as shown in FIG. 13(d), the flatness detection portion 43 detects the difference in luminance with respect to the adjacent region from the output of the edge amount of FIG. 13(b), and outputs a larger degree of flatness the smaller the difference in luminance. Here, the vertical axis in FIG. 13(d) is the flatness FT, which indicates the degree of flatness, and the horizontal axis is the pixel position of the pixel being processed.

As shown in FIG. 13(e), the effect adjustment signal generation portion 44 multiplies the degree of proximity of FIG. 13(c) by the degree of flatness of FIG. 13(d), and outputs an effect adjustment signal MOD that weakens the visual effect the larger the edge proximity degree and the higher the degree of flatness. Here, the vertical axis in FIG. 13(d) is the output of the effect adjustment signal MOD, and the horizontal axis is the pixel position of the pixel being processed. The visual effect by the visual processing device 101 becomes stronger the larger the value of the effect adjustment signal MOD.

By doing this, the effect adjustment signal generation portion 44, as shown in FIG. 13(e), creates an output that weakens the visual effect in regions that are proximate to an edge, and creates an output that strengthens the visual effect in regions that are away from regions that are near to an edge. Further, in regions that are close to an edge, the effect adjustment signal generation portion 44, based on the degree of flatness, creates an output that weakens the visual effect the larger the degree of flatness, and creates an output that strengthens the visual effect the smaller the degree of flatness.

Thus, with the visual processing device 101, it is possible t is possible to achieve visual processing in which it is possible to reduce artifacts only near edges, and that has an excellent visual processing effect for natural images.

Figure 14:
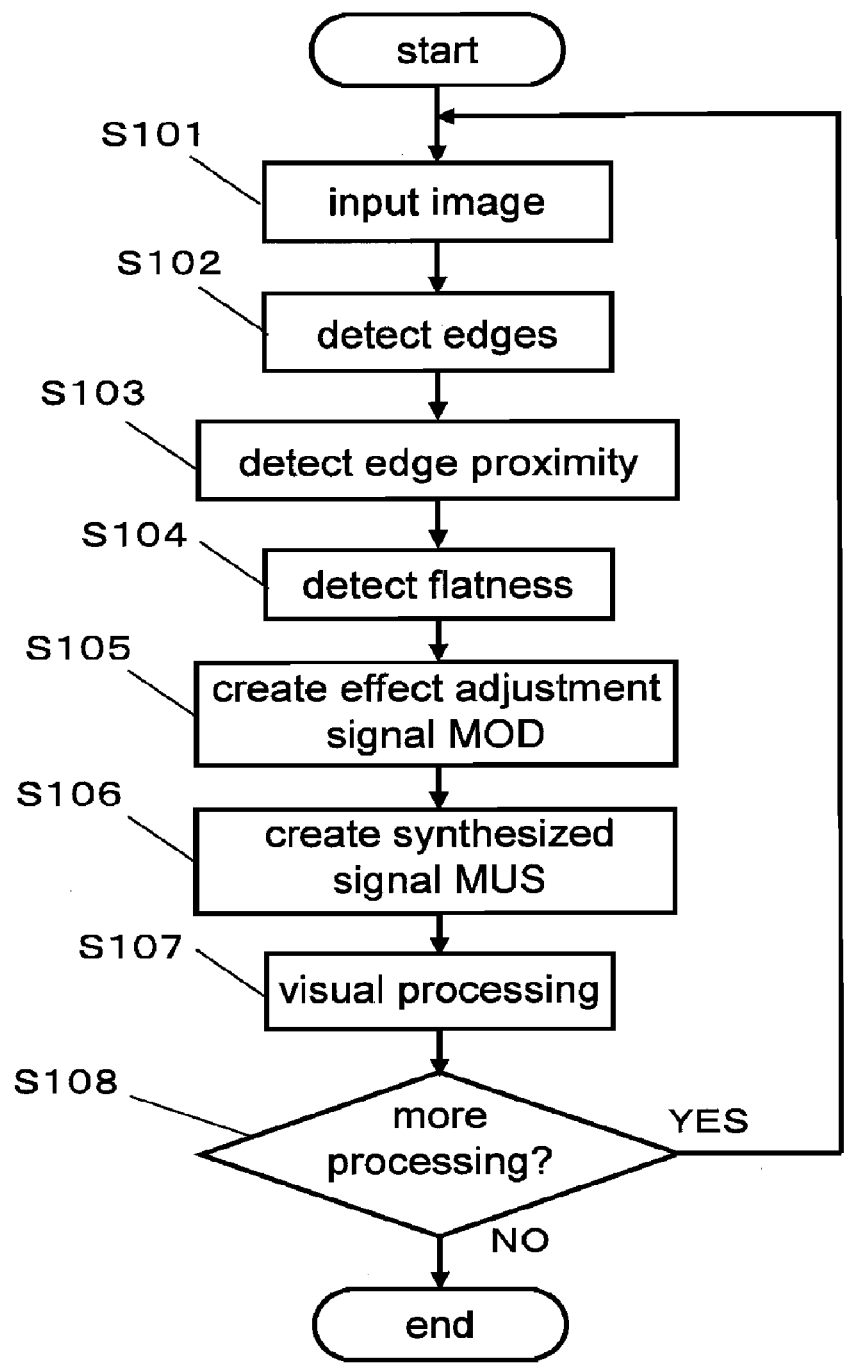
FIG. 14 is a flowchart that describes the operation of that visual processing device.

Next, the operation of the visual processing device 101 is described using FIG. 14. FIG. 14 is a flowchart for describing the operation of the visual processing device 101.

Figure 16:
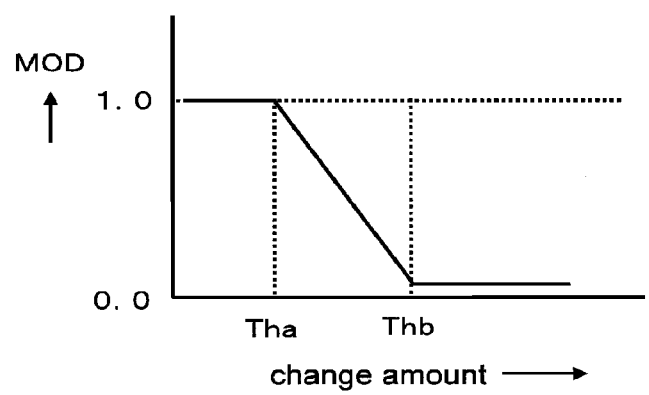
FIG. 16 is an explanatory diagram for describing the effect adjustment signal of a modified example of the same.

As shown in FIG. 16, an image is input to the visual processing device 101 (S101), and the edge detection portion 41 detects an edge amount, which is the difference in luminance, for each adjacent region from the image signal IS (S102).

Next, the edge proximity detection portion 42 of the visual processing device 101 processes the edge amount with a low-pass filter to detect the degree of proximity from the edge amount (S103). The flatness detection portion 43 of the visual processing device 101 then detects the luminance difference from the edge amount to detect the degree of flatness near the edge (S104).

Next, the effect adjustment signal generation portion 44 of the visual processing device 101 multiplies the proximity degree that has been output from the edge proximity detection portion 42 by the flatness degree that has been output from the flatness detection portion 43 to create an effect adjustment signal MOD (S105).

The visual processing device 101 next, through the effect adjustment portion 1020, creates a synthesized signal MUS that is synthesized changing the ratio of the image signal IS and the unsharp signal US in accordance with the effect adjustment signal MOD (S106).

Next, the visual processing portion 30 of the visual processing device 101 selects a single curve of the two-dimensional tone conversion characteristics shown in FIG. 10 based on the synthesized signal MUS, and converts the image signal IS (S107). By doing this, the visual processing device 101 executes visual processing that has been adjusted so as to alter the effect of visual processing in accordance with the synthesized signal MUS.

Next, the visual processing device 101 determines whether or not there is a pixel to process next (S108). If there are no more pixels for which processing is necessary, then visual processing is completed. On the other hand, if there are further pixels that require processing, then the procedure is returned to step S101 and the next image (pixel) is input. Thereafter, the steps from S101 to S108 are repeated until there are no longer any pixels that require processing.

As mentioned above, with the visual processing device 101 of the second embodiment of the invention, it is possible to achieve visual processing in which it is possible to reduce artifacts only near edges, and that has an excellent visual processing effect for natural images.

It should be noted that although the visual processing device 101 finds the degree of edge proximity from the edge amount and finds the degree of flatness from the input image signal IS, and creates an effect adjustment signal MOD based on the degree of edge proximity and the degree of flatness, it is also possible to create the effect adjustment signal MOD from the amount of change of the unsharp signal US of the spatial processing portion 10.

Below is described a method for detecting a flat region near an edge according to a modified example of the control signal generation portion 40.

Figure 15:
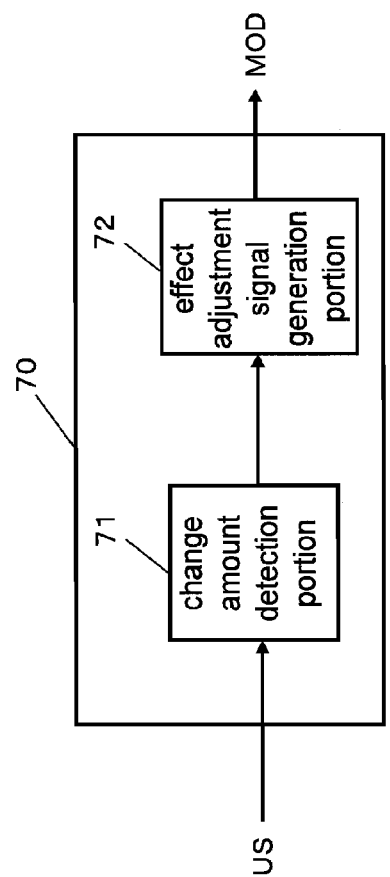
FIG. 15 is a block diagram showing the configuration of the control signal generation portion of a modified example of the same.

An implementation in which the effect adjustment signal MOD is created from the amount of change in the unsharp signal US is described using FIGS. 15 and 16. FIG. 15 is a block diagram showing the configuration of a control signal generation portion 70.

As shown in FIG. 15, the control signal generation portion 70 is provided with a change amount detection portion 71 for detecting the amount of change in the unsharp signal US, and an effect adjustment signal generation portion 72 for outputting an effect adjustment signal MOD in accordance with the amount of change that has been detected.

The change amount detection portion 71 detects the amount of change in the unsharp signal US. This detection is performed using an edge detection filter (not shown) such as a first-order derivative filter like a Sobel filter or a Prewitt filter or a second-order derivative filter like a Laplacian filter.

The effect adjustment signal generation portion 72 adjusts the output according to the amount of change that has been detected by the change amount detection portion 71. That is, the effect adjustment signal generation portion 72 outputs an effect adjustment signal MOD with a smaller signal level (value) the higher the amount of change. For example, as shown in FIG. 16, the signal level of the effect adjustment signal MOD is changed when the amount of change that has been detected is equal to or greater than a predetermined value Tha, and reduces the signal level of the effect adjustment signal MOD in the range up to a predetermined value Thb. The signal level of the effect adjustment signal MOD is not altered above the predetermined threshold Thb. By doing this, it is possible to change the signal level of the effect adjustment signal MOD when a steep edge region has been input, without affecting edge components that are normally present in natural images. Here, the horizontal axis is the amount of change, and the vertical axis is the output (signal level) of the effect adjustment signal MOD. It should be noted that a range of 0.0 to 1.0 has been adopted for the signal level of the effect adjustment signal MOD that is output, but it is also possible to adjust this to from 0.2 to 1.0, for instance, depending on the strength of the visual processing. Further, the visual processing device 101 is designed such that the effect of the visual processing by the visual processing device 101 becomes stronger the larger the signal level of the effect adjustment signal MOD.

As illustrated above, with the control signal generation portion 70 it is possible to detect a flat region near an edge and subsequently create the effect adjustment signal MOD, from the amount of change of the unsharp signal US.

It should be noted that it is also possible for flat regions near edges to be detected from a reduced image such as a thumbnail image in which the image signal has been reduced, and then output an effect adjustment signal MOD based on the degree of flatness near the edge or the amount of change in the unsharp signal US.

It is also possible to provide a reducing portion (not shown), for reducing the image signal, at a stage between the input signal and the control signal generation portion 40, and then from the reduced image that is produced by the reducing portion, output an effect adjustment signal MOD based on the degree of flatness near the edge or the amount of change in the unsharp signal US.

By using a reduced image, it is possible to detect flat regions that are near edges while suppressing the effects of noise. In other words, there is less of a noise component in a reduced image that has been created by a reduction method in which an image signal is first averaged and then thinned out, and thus by using a reduced image, it is possible to detect a flat region near an edge while suppressing the effects of noise. Further, if a reduced signal is used, it is possible to reduce the number of pixels that are to be detected, and this allows the number of calculations to be reduced.

It is also possible to set a low-pass filter, for instance, before the control signal generation portion 40 or the control signal generation portion 70, to limit the band of the image signal and then detect flat regions that are near edges. By doing this, it is possible to reduce the noise component, and detect flat regions near edges while suppressing the effects of noise.

Third Embodiment

Figure 17:
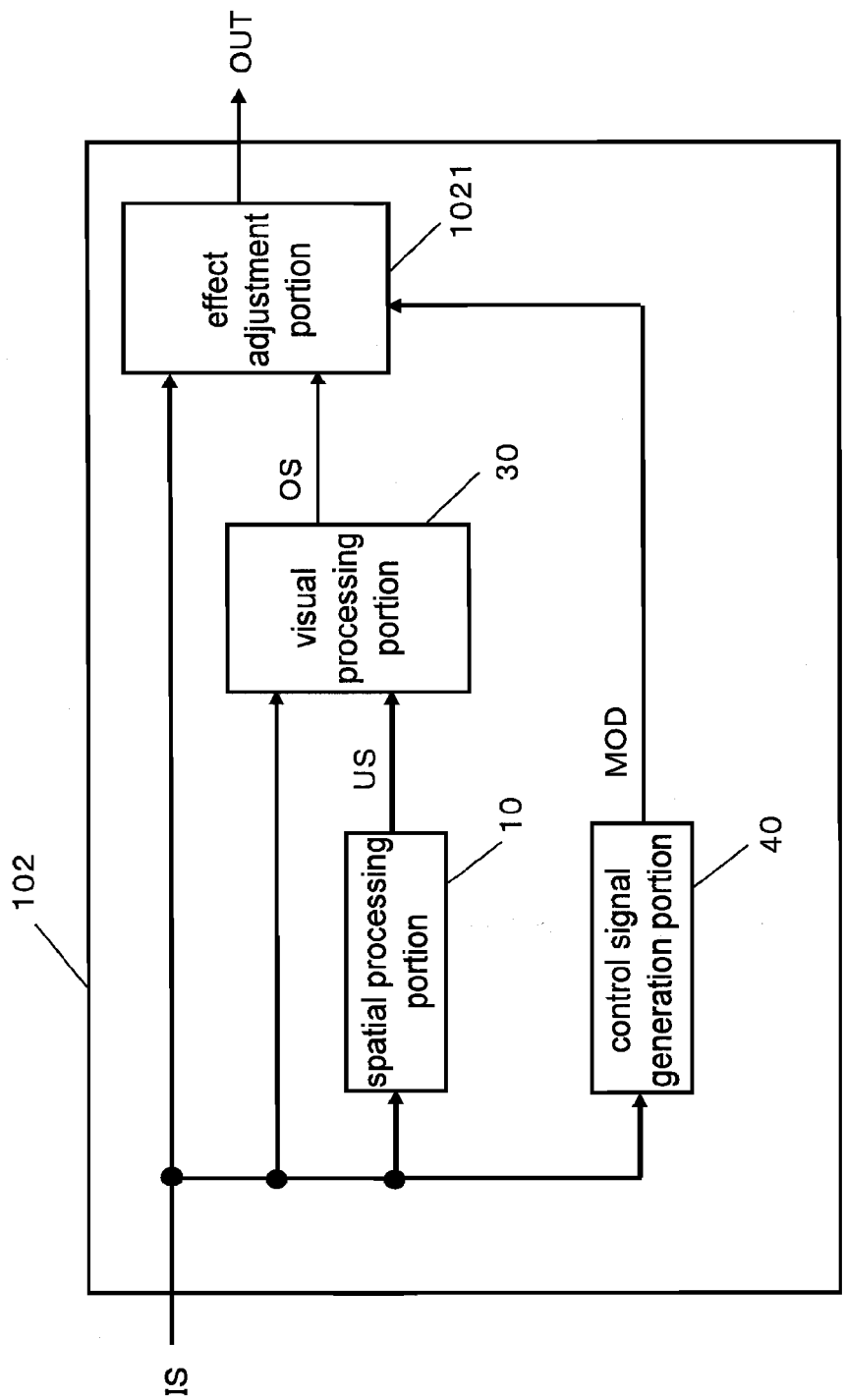
FIG. 17 is a block diagram that shows the configuration of a visual processing device according to a second embodiment of the invention.

In the second embodiment of the invention, a synthesized signal MUS that is synthesized with different ratios of the image signal IS and the surrounding image information (unsharp signal) US according to an effect adjustment signal MOD is output, and the visual processing portion 30 outputs a processed signal OS that is obtained by visually processing the image signal IS according to the synthesized signal MUS from the effect adjustment portion 1020, but in the third embodiment of the invention, an effect adjustment portion 1021 outputs a synthesized output OUT that is obtained by synthesizing a processed signal OS that has been visually processed and the image signal IS according to an effect adjustment signal, and this embodiment is described using FIG. 17.

FIG. 17 is a block diagram that shows the configuration of a visual processing device 102 according to a third embodiment of the invention. Hereinafter, sections that are identical to those of the second embodiment are assigned the same reference numerals as before and will not be described in detail.

In FIG. 17, the visual processing portion 30 outputs a processed signal OS based on the image signal IS and the output US of the spatial processing portion 10.

The effect adjustment portion 1021 interpolates the image signal IS and the processed signal OS in accordance with the effect adjustment signal MOD in order to differ (change) the effect of the visual processing. For example, the output OUT from the effect adjustment portion 1021 is calculated through an interpolation calculation like in Eq. 3 below.

$$OUT = OS \times MOD + IS \times (1.0 - MOD) \qquad \text{Eq. 3}$$

It should be noted that Eq. 3 can be modified as shown in Eq. 4.

$$OUT = (OS - IS) \times MOD + IS \qquad \text{Eq. 4}$$

Thus, according to the third embodiment of the invention, it is possible to output a synthesized signal OUT that is synthesized varying the ratio of the processed signal OS and the image signal IS according to the effect adjustment signal MOD, and it is possible to differ (change) the effect of visual processing.

It should be noted that it is also possible to substitute the control signal generation portion 70 of the second embodiment of the invention for the control signal generation portion 40. In this case as well, it is possible to similarly detect regions that are near an edge and then create an effect adjustment signal MOD that corresponds to the amount of change in the surrounding information near the edge.

Fourth Embodiment

Figure 18:
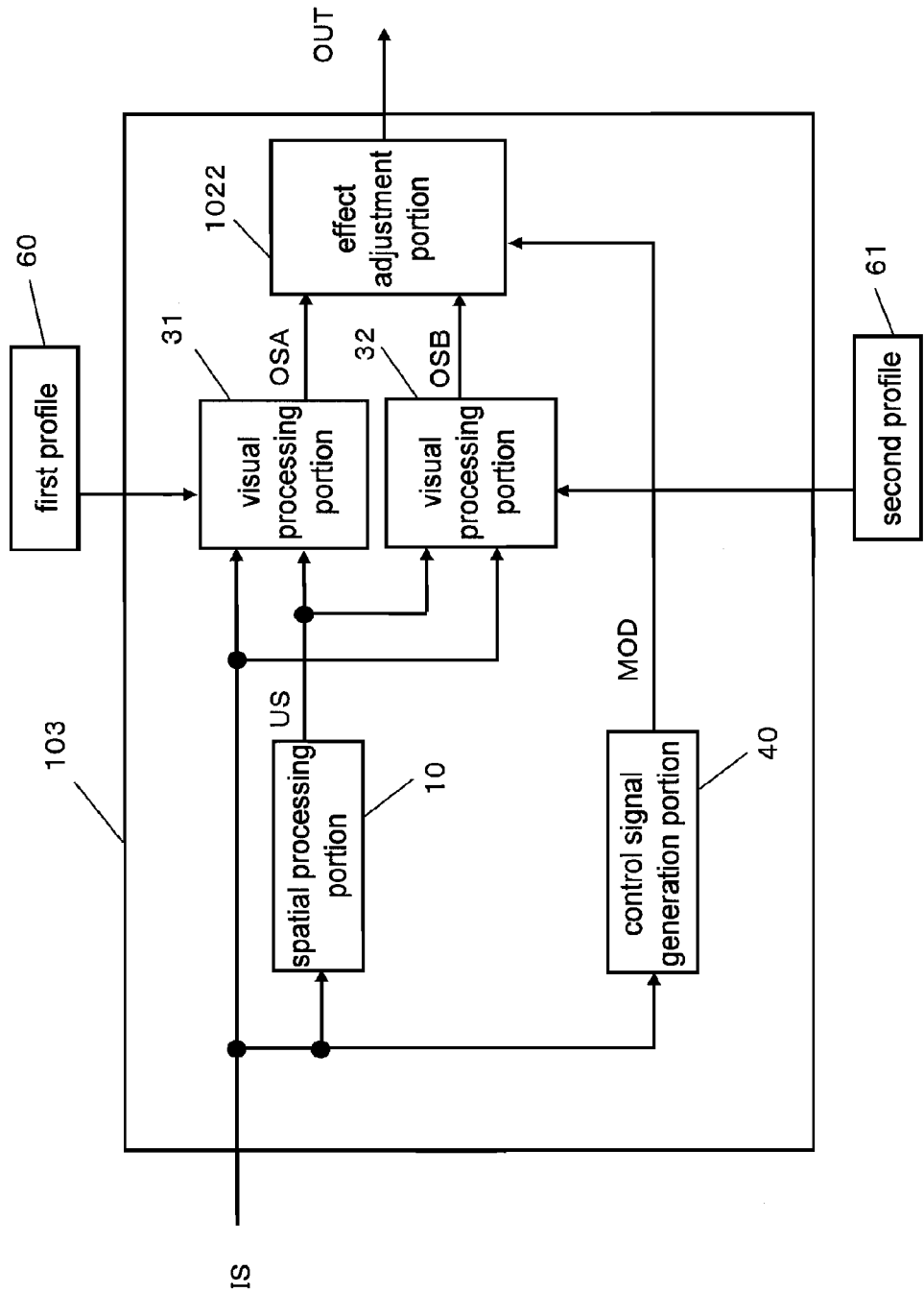
FIG. 18 is a block diagram that shows the configuration of a visual processing device according to a third embodiment of the invention.

In the second embodiment of the invention, a synthesized signal MUS that is synthesized altering the ratio of the image signal IS and the surrounding image information US according to an effect adjustment signal MOD is output, and the visual processing portion 30 outputs a processed signal OS that is obtained by visually processing the image signal IS according to the synthesized signal MUS from the effect adjustment portion 1020, but in the fourth embodiment of the invention, an effect adjustment portion 1022 outputs a synthesized output OUT that is synthesized changing the proportion of the outputs of a visual processing portion 31 and a visual processing portion 32, which have different visual processing effects, in accordance with the effect adjustment signal MOD, and this embodiment is described using FIG. 18.

FIG. 18 is a block diagram that shows the configuration of a visual processing device 103 according to a fourth embodiment of the invention. Hereinafter, sections that are identical to those of the second embodiment are assigned the same reference numerals as before and will not be described in detail.

The effect adjustment portion 1022 synthesizes an output OSA of the visual processing portion 31 in which a first profile 60 has been set in the LUT and an output OSB of the visual processing portion 32 in which a second profile 61 has been set in the LUT, which have different strengths of visual processing, through an interpolation computation in accordance with the effect adjustment signal MOD that is output from the control signal generation portion 40, and outputs a synthesized output OUT. It should be noted that it is also possible to create a synthesized output through an extrapolation computation. At this time, the synthesized output OUT is as shown in Eq. 5.

$$OUT = OSA \times MOD + OSB \times (1.0 - MOD) \qquad \text{Eq. 5}$$

It should be noted that Eq. 5 can be modified as shown in Eq. 6.

$$OUT = (OSA - OSB) \times MOD + OSB \qquad \text{Eq. 6}$$

Thus, according to the visual processing device 103 of the fourth embodiment of the invention, by obtaining a synthesized output that is synthesized varying the ratio of the outputs of the visual processing portion 31 and the visual processing portion 32, which have different visual processing effects, in accordance with the effect adjustment signal MOD, it is possible to perform visual processing in which the degree of the visual effect is differed.

It should be noted that it is also possible to substitute the control signal generation portion 70 of the second embodiment of the invention for the control signal generation portion 40. In this case as well, it is possible to similarly detect regions that are near an edge and then create an effect adjustment signal MOD that corresponds to the amount of change in the surrounding information near the edge.

Fifth Embodiment

Figure 19:
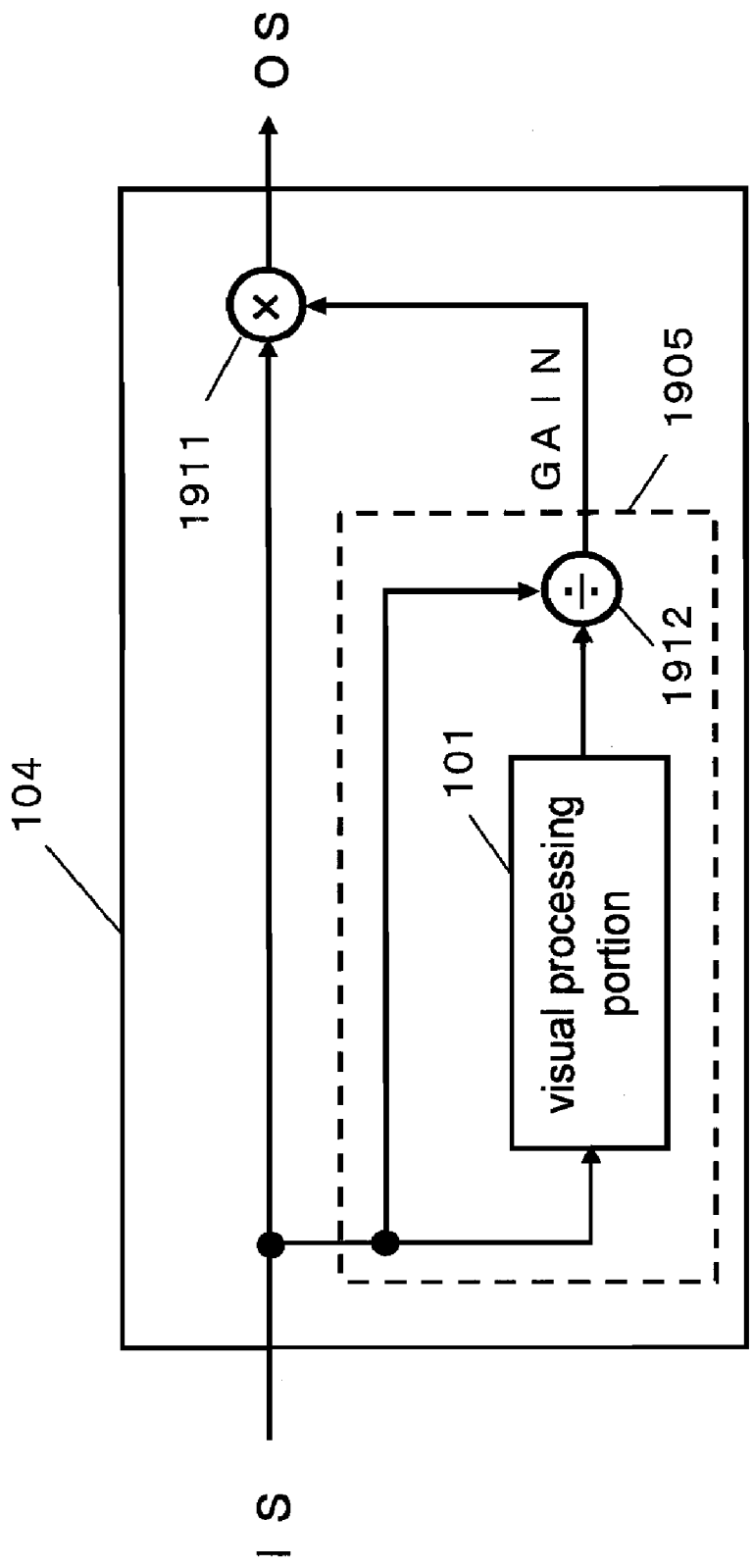
FIG. 19 is a block diagram that shows the configuration of a visual processing system according to a fourth embodiment of the invention.
Figure 20:
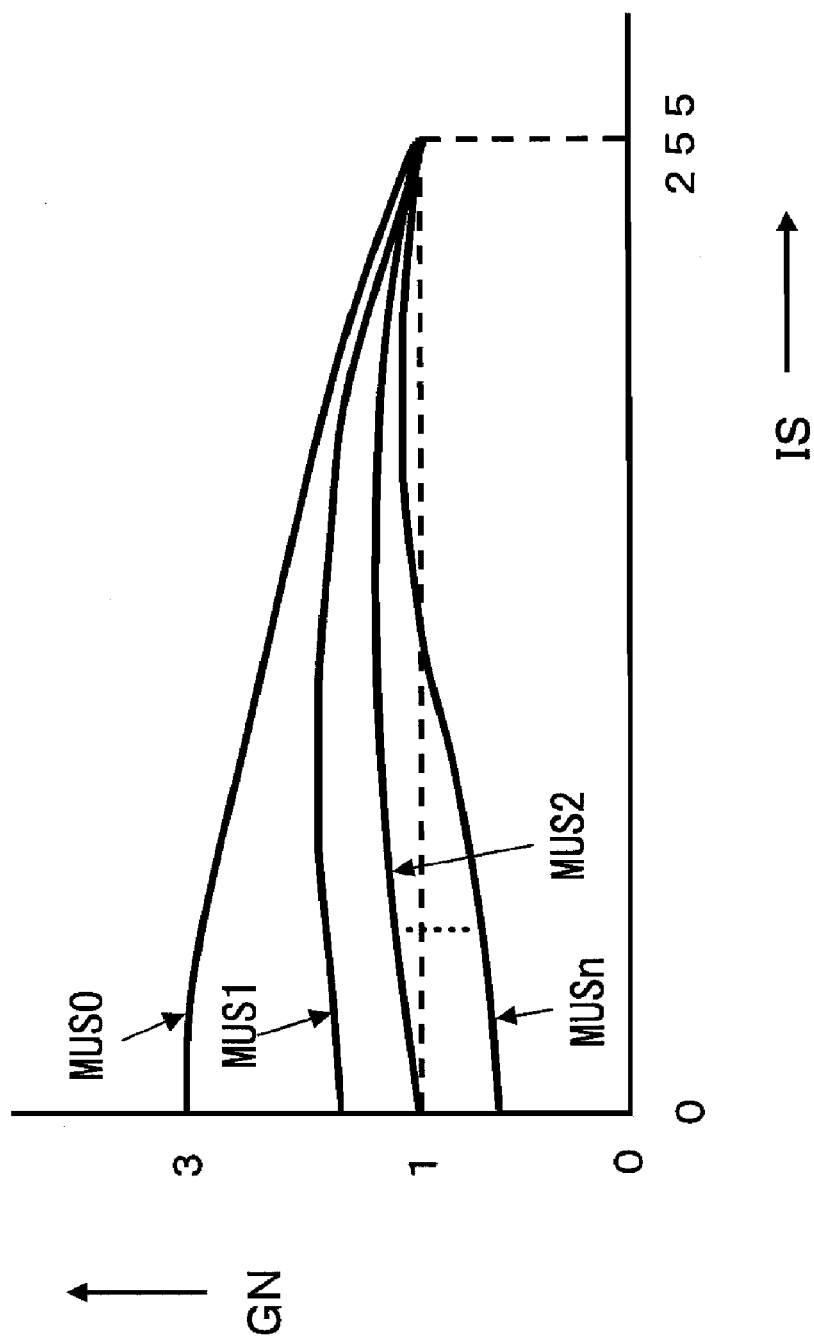
FIG. 20 is an explanatory diagram for describing the two-dimensional gain characteristics of the same.

In the visual processing devices of the second embodiment of the invention through the fourth embodiment of the invention, a tone conversion value that is based on two-dimensional tone conversion characteristics is output, but the fifth embodiment of the invention describes a case in which tone conversion is performed using a gain signal using FIGS. 19 and 20.

FIG. 19 is a block diagram that shows the configuration of a gain-type visual processing system 104 according to the fifth embodiment of the invention, and FIG. 20 is an explanatory diagram for describing the two-dimensional gain characteristics. Hereinafter, sections that are identical to those of the second embodiment are assigned the same reference numerals as before and will not be described in detail.

In FIG. 19, the gain-type visual processing system 104 is provided with a gain-type visual processing device 1905 for outputting a gain signal GAIN that is obtained by visually processing the image signal IS, and a multiplier 1911 for multiplying the gain signal GAIN and the image signal IS.

The gain-type visual processing device 1905 is provided with the visual processing device 101 for outputting a processing signal OS that is obtained by visually processing the image signal IS, and a divider 1912 for dividing the processed signal OS by the image signal IS. Here, the visual processing device 101 outputs a tone conversion value that is obtained by visually processing the output of the image signal IS, and by dividing this tone conversion value by the image signal IS, it is possible to achieve the gain-type visual processing device 5.

The multiplier 1911 multiplies the image signal IS and the gain signal GAIN that is output by the gain-type visual processing device 1905, and output a tone conversion value produced by visually processing the output of the image signal IS.

It should be noted that it is also possible for the visual processing portion 30 to carry out processing by directly using a profile that has the two-dimensional gain characteristics shown in FIG. 20. Here, the vertical axis of FIG. 20 is the gain output GN, and the horizontal axis is the image signal IS. The two-dimensional gain characteristics shown in FIG. 20 are equivalent to those that are obtained by dividing the output of the profile of the two-dimensional tone conversion characteristics shown in FIG. 10 by the image signal IS. It is also possible to set a profile that has these two-dimensional gain characteristics in the LUT of the visual processing portion 30 of the visual processing device 101. If a profile of the two-dimensional gain characteristics is set in the LUT of the visual processing portion 30 in advance, then the gain signal GN and the gain signal GAIN become equal, and thus it is possible to achieve the gain-type visual processing device 1905 without the divider 12.

With the gain-type visual processing device 1905, there is little change in the processed signal with respect to the change in the image signal IS that has been input, and thus it is possible to reduce the bit number of the input signal and also to reduce the circuit scale. Additionally, if the visual processing portion 30 is provided with a 2D LUT, then it is possible to reduce the memory capacity.

Thus, with the gain-type visual processing system 104 of the fifth embodiment of the invention, by controlling the gain signal GAIN it is possible to easily suppress saturation of the tone and achieve excellent visual processing.

It should be noted that the visual processing device 101 of the second embodiment of the invention can be replaced with the visual processing device 102 of the third embodiment of the invention. The gain-type visual processing device 1905 can be similarly achieved in this case as well.

Likewise, the visual processing device 101 of the second embodiment of the invention can be replaced with the visual processing device 103 of the fourth embodiment of the invention. The gain-type visual processing device 1905 can be similarly achieved in this case as well.

Thus, according to the second embodiment of the invention through the fifth embodiment of the invention, it is possible to achieve visual processing in which artifacts are suppressed, even if an image that has steep edge regions has been input.

It should be noted that the visual processing device described in this embodiment can be provided in or connected to a device for handling moving images, and may create an effect adjustment signal MOD from the image of each frame or each field. The control signal generation portion 40 can extract edge information or flatness information from a frame image at least one (frame) prior when the image signal is a frame image, or from a field image at least one (field) prior when the image signal is a field image. By doing this, the visual processing device can use an effect adjustment signal MOD that corresponds to the edge information or the flatness information from the top of the frame. It is also possible for the visual processing device to extract edge information or flatness information from a field image at least one (field) prior, and use an effect adjustment signal MOD that corresponds to the edge information or the flatness information from the top of the field image. It is also possible for the control signal generation portion 40 to extract edge information or flatness information from a frame image at least one (frame) prior or from a field image at least one (field) prior, and by doing this it becomes easy to coordinate the delay of the circuit and the circuit scale can be reduced.

Sixth Embodiment

In general, natural images have a large number of tone levels, and by performing visual processing on a natural image it is possible to obtain a sharp image in which the local contrast, for instance, has been enhanced. On the other hand, special images have a statistical bias, such as either an extremely low proportion of regions in which the gradation changes in the image of the image signal, or an extremely large proportion of regions in which the gradation does not change in the image of the image signal. In such special images, there are many flat regions in the image. For this reason, artifacts easily stand out when visual processing is executed on a special image with steep edges. Weakening the visual processing in order to suppress these artifacts weakens the processing for natural images as well and results in images that are not sharp.

Thus, by suppressing artifacts only for special images, it is possible to achieve an excellent visual processing effect for natural images.

The visual processing device in the sixth embodiment of the invention detects special images that have a statistical bias from the image signal, creates an effect adjustment signal based on the degree of the statistical bias, and then performs adjustment so as to differ (change) the effect of visual processing in accordance with the effect adjustment signal that has been created.

Here, the visual processing is processing for giving characteristics that are close to human vision, and is processing for determining the value of an output signal based on the contrast between the value of a target pixel of an image signal that has been input and the values of pixels around that target pixel. The visual processing may be adopted in backlight correction, knee processing, DR compression, color processing, and brightness adjustment (including tone processing and contrast adjustment).

In this embodiment of the invention, the luminance component Y or the brightness component L of a YCbCr color space, a YUV color space, a Lab color space, a Luv color space, a YIQ color space, or a YPbPr color space is defined as the luminance signal. Hereinafter, the luminance signal is described as the image signal.

The visual processing device of the sixth embodiment of the invention is described using FIGS. 21 through 28. FIG. 1 is a block diagram that shows the configuration of a visual processing device 1001 of the sixth embodiment of the invention.

Figure 21:
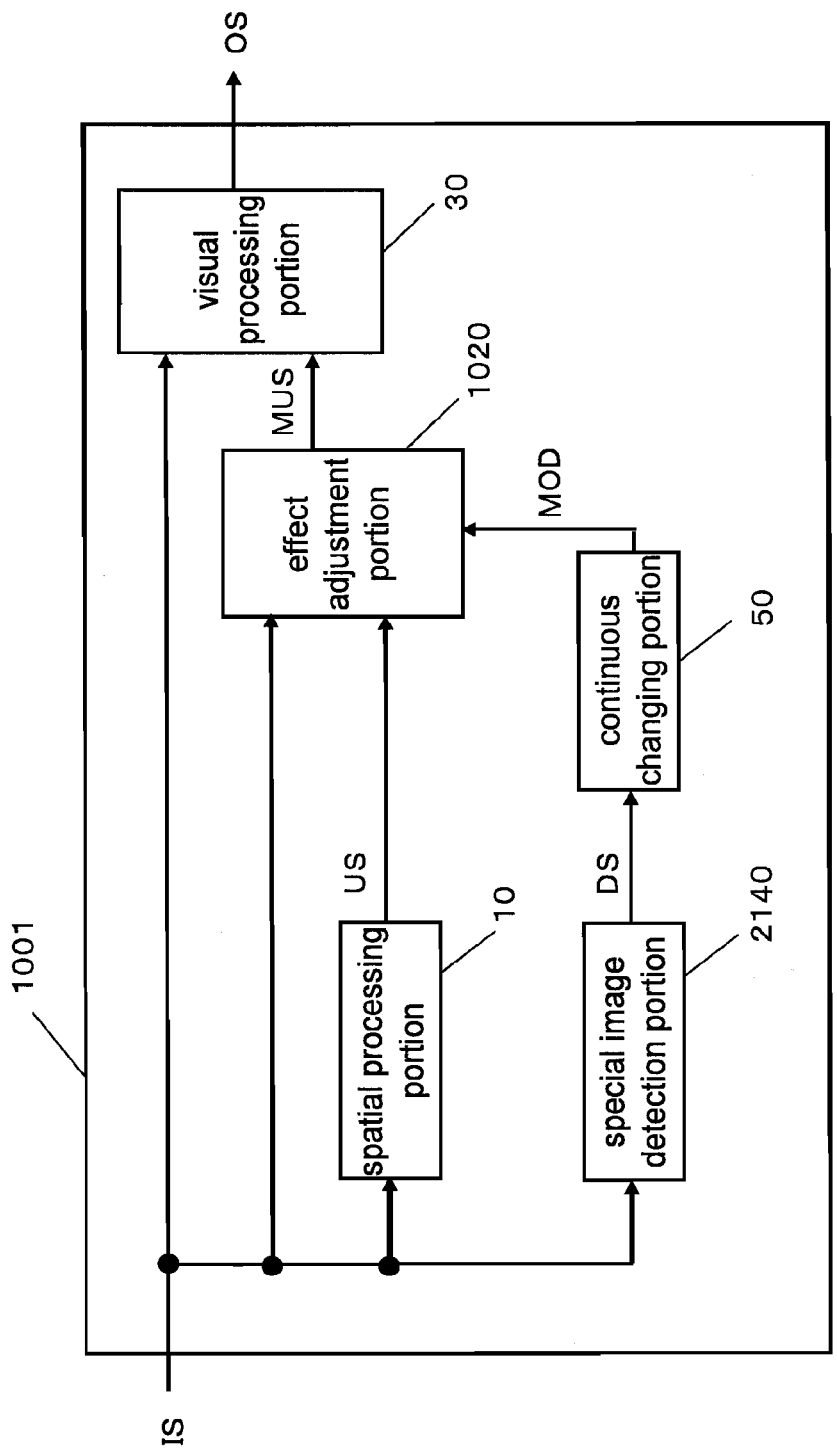
FIG. 21 is a block diagram that shows the configuration of a visual processing device according to a sixth embodiment of the invention.

In FIG. 21, the visual processing device 1001 of the sixth embodiment of the invention is provided with a spatial processing portion 10 for extracting surrounding image information (unsharp signal) US from the image signal IS that has been input, a special image detection portion 2140 that detects special images that have a statistical bias from the image signal IS and output a special image effect adjustment signal DS for differing the effect of visual processing based on the degree of the statistical bias, a continuous changing portion 50 for outputting an effect adjustment signal MOD that is obtained by continuously changing the special image effect adjustment signal DS between frames, an effect adjustment portion 1020 for outputting a synthesized signal MUS that is synthesized changing the proportion of the image signal IS and the surrounding image information US according to the effect adjustment signal MOD, and a visual processing portion 30 for outputting a processed signal OS that is obtained by visually processing the image signal IS according to the synthesized signal MUS from the effect adjustment portion 1020.

With this configuration, the special image detection portion 2140 can output a special image effect adjustment signal DS that corresponds to the degree of the information bias held by the special image. The effect adjustment portion 1020 can create a synthesized signal MUS for differing the effect of visual processing by the visual processing portion 30, using a effect adjustment signal MOD that is obtained by continuously changing the special image effect adjustment signal DS. The visual processing portion 30 can convert the tone level of the image signal IS according to the synthesized signal MUS that is output from the effect adjustment portion 1020.

Thus, even if a special image has been input, the visual processing device 1001 can detect the special image and the visual processing portion 30 can differ the effect of visual processing for the special image in order to suppress artifacts.

The functional portions of the visual processing device 1001 are described below.

The spatial processing portion 10 extracts the value of a target pixel and the values of pixels in the region around the target pixel (hereinafter, called "surrounding pixels") from the image signal IS, and uses the values of the pixels that it has extracted to perform filter processing on the image signal IS.

For example, the spatial processing portion 10 performs a low-pass filter on the image signal IS to create an unsharp signal US from the image signal IS. The unsharp signal US is created by a computation such as the following.

$$US = (\Sigma[Wij] \times [Aij])/(\Sigma[Wij])$$

Here, [Wij] is the weight coefficient of the pixel located at the i-th row j-th column among the target pixel and the surrounding pixels, and [Aij] is the pixel value of the pixel located at the i-th row j-th column among the target pixel and the surrounding pixels. The symbol $\Sigma$ means to calculate the sum for the target pixel and the surrounding pixels.

It should be noted that it is possible to assign a weight coefficient with a smaller value the larger the absolute value of the difference between pixel values, and it is also possible to assign a smaller weight coefficient the larger the distance from the target pixel. The region of the surrounding pixels is a size that is set in advance according to the effect, and the visual effect can be increased by setting this region to size that is larger than a predetermined size. For example, if the size of the target image is 1024 pixels vertically by 768 pixels horizontally, then by creating an unsharp signal US from a region that is at least 80 pixels vertically by 80 pixels horizontally, the visual effect can be increased compared to each local region of about 3 pixels vertically by 3 pixels horizontally.

A spatial filter such as a FIR (Finite Impulse Response)-type low-pass spatial filter or an IIR (Infinite Impulse Response)-type low-pass spatial filter can be used as the low-pass filter.

Next, the effect adjustment portion 1020 synthesizes the image signal IS and the unsharp signal US by interpolation in accordance with the effect adjustment signal MOD that has been output from the continuous changing portion 50, and outputs a synthesized signal MUS. The synthesized signal MUS is obtained through an interpolation computation such as Eq. 7 in accordance with the effect adjustment signal MOD. The continuous changing portion 50 is described later.

$$MUS = US \times MOD + IS \times (1.0 - MOD) \qquad \text{Eq. 7}$$

Here, the value of the effect adjustment signal MOD changes within the range of 0.0 to 1.0, with no visual processing effect when the value of the effect adjustment signal MOD is 0.0, and a maximum visual processing effect when it is 1.0. It should be noted that Eq. 7 can be modified to Eq. 8, and the synthesized signal MUS can be similarly created.

$$MUS = (US - IS) \times MOD + IS \qquad \text{Eq. 8}$$

Next, the visual processing portion 30 converts the tone level of the image signal IS in accordance with the synthesized signal MUS from the effect adjustment portion 1020.

Figure 22:
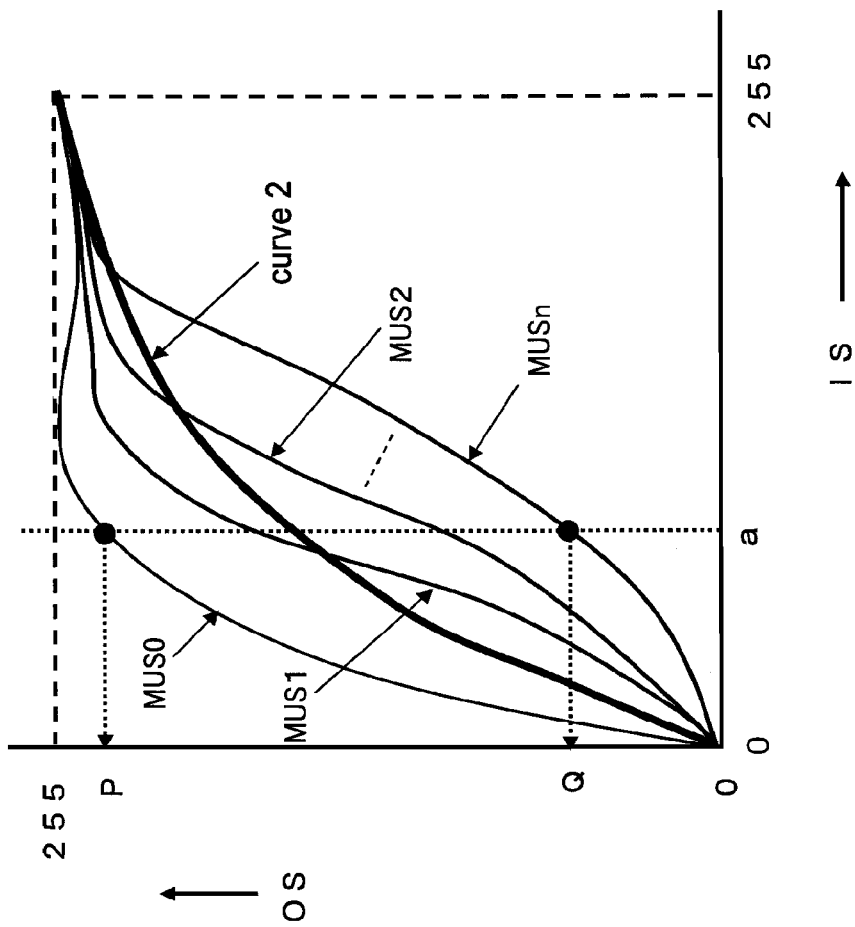
FIG. 22 is an explanatory diagram for describing the two-dimensional tone conversion characteristics of the same.

The visual processing portion 30 performs tone conversion based on the two-dimensional tone conversion characteristics shown in FIG. 22, for example. Here, two-dimensional tone conversion refers to tone conversion in which the value of the output is determined with respect to the two inputs of the synthesized signal MUS and the image signal IS. The visual processing portion 30 outputs a processed signal OS with respect to the image signal IS and the synthesized signal MUS based on the two-dimensional tone conversion characteristics. Various visual effects can be produced with the tone conversion characteristics.

The two-dimensional tone conversion characteristics shall be described using FIG. 22. FIG. 22 is an explanatory diagram for describing the two-dimensional tone conversion characteristics. Here, the horizontal axis is the image signal IS that has been input, and the vertical axis is the output of the converted processed signal OS.

As shown in FIG. 22, two-dimensional tone conversion has predetermined tone conversion characteristics according to the signal level of the synthesized signals MUS0 through MUSn. Thus, when the pixel value of the image signal IS is an 8-bit value, the pixel value of the output signal OS with respect to the value of the input signal IS separated into 256 levels is determined based on the predetermined two-dimensional tone conversion characteristics. The tone conversion characteristics are tone conversion curves that have predetermined gamma conversion characteristics, and have the relationship where the output monotonically decreases along with the subscript of the synthesized signal MUS. It should be noted that even if there are ranges where the output partially does not monotonically decrease along with the subscript of the synthesized signal MUS, it is sufficient for the output to be substantially monotonically decreasing. As shown in FIG. 22, the two-dimensional tone conversion characteristics satisfy the relationship of (the output value when MUS=MUS0) (the output value when MUS=MUS1)≧ . . . ≧(the output value when MUS=MUSn) with respect to the brightness value of all image signals IS.

According to the two-dimensional tone conversion characteristics shown in FIG. 22, for an image signal IS with a value of "a" that has been input, the visual processing portion 30 selects MUS0 when the brightness value of the surrounding region is small to obtain a value "P" for the processed signal OS, and selects MUSn when the brightness value of the surrounding region is large in order to obtain a value "Q" for the processed signal OS. In this way, even for an input image signal IS with the value "a," the processed signal OS can be significantly changed from the value "P" to the value "Q" depending the change in the brightness value of the surrounding region. By doing this, the contrast of dark areas can be enhanced according to the synthesized signal MUS.

On the other hand, if the synthesized signal MUS is made equal to the image signal IS in order to eliminate the effect of visual processing, then it is possible to have the tone conversion characteristics of curve 2 shown in FIG. 22. With the tone conversion characteristics of curve 2, brightness adjustment (gamma conversion) of the entire image is possible, but there is no visual effect such as an increase in the local contrast.

It should be noted that it is possible to produce various visual processing effects by changing these two-dimensional tone conversion characteristics, and thus the visual processing can be adopted for knee processing, DR compression, color processing, or brightness adjustment (including tone processing and contrast adjustment).

Next, the processed signal OS when the effect of visual processing has been differed based on the synthesized signal MUS by the visual processing portion 30 is described using FIG. 23. FIG. 23 is an explanatory diagram for describing the output of the processed signal OS.

In FIG. 23(a), the horizontal axis is the pixel position to be processed, and the vertical axis is the output of the synthesized signal MUS.

For example, when the value of the effect adjustment signal MOD has been set to 0.5, the synthesized signal MUS becomes an output that is intermediate between the image signal IS and the unsharp signal US.

At this time, as shown in FIG. 23(b), if OS(IS,IS) is a processed signal OS that has been processed based on only the image signal IS and OS(IS,US) is a processed signal OS that has been processed based on the image signal IS and the unsharp signal US, then a processed signal OS(IS,MUS) that has been obtained by visual processing based on the image signal IS and the synthesized signal MUS is an output that is intermediate between OS(IS,IS) and OS(IS,US).

Thus, the synthesized signal MUS is equal to US when the value of the effect adjustment signal MOD is 1.0, and a processed signal OS(IS,US) in which the visual processing effect is a maximum is output. On the other hand, the synthesized signal MUS is equal to IS when the value of the effect adjustment signal MOD is 0.0, and a processed signal OS(IS,IS) in which there is no visual processing effect is output.

In this way, the visual processing portion 30 can strengthen or weaken the effect of the enhancing the local contrast according to the synthesized signal MUS. Thus, the visual processing device 1001 can achieve various visual effects that are different effects, from the effect of processing in which only the brightness of the overall image is transformed, to the effect of processing in which the contrast in local regions is varied (changed) with the surrounding brightness.

It should be noted that the visual processing device 1001 can achieve knee processing, DR compression processing, and color processing, for example, by changing the two-dimensional tone conversion characteristics.

It is also possible for the visual processing portion 30 to have a 2D LUT. In this case, the visual processing portion 30 performs tone conversion by setting the characteristic data (hereinafter, referred to as the "profile") shown in FIG. 22 in the 2D LUT of the visual processing portion 30.

The visual processing portion 30 can also perform visual processing through an arithmetic circuit. In particular, if the 2D LUT of the visual processing portion 30 is provided with profiles, which are characteristics that can be approximated by a simple line, then it is possible to eliminate the table of the 2D LUT and reduce the circuit scale of the visual processing device 1001.

Next, the special image detection portion 2140 is described using FIGS. 24 through 27. Here, a case in which the bias of the information of the special image is detected from the proportion of regions in which the gradation changes in the image. The change in the gradation is detected from the edge component.

Figure 24:
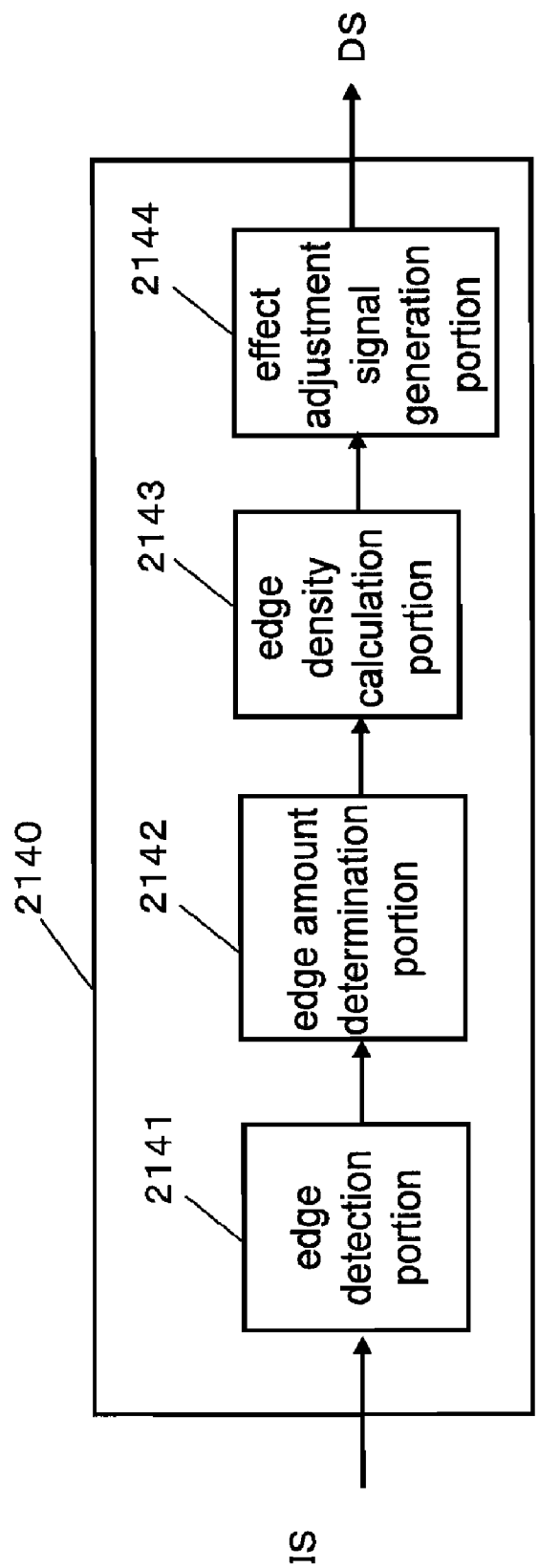
FIG. 24 is a block diagram that shows the configuration of the special image detection portion of the same.
Figure 25:
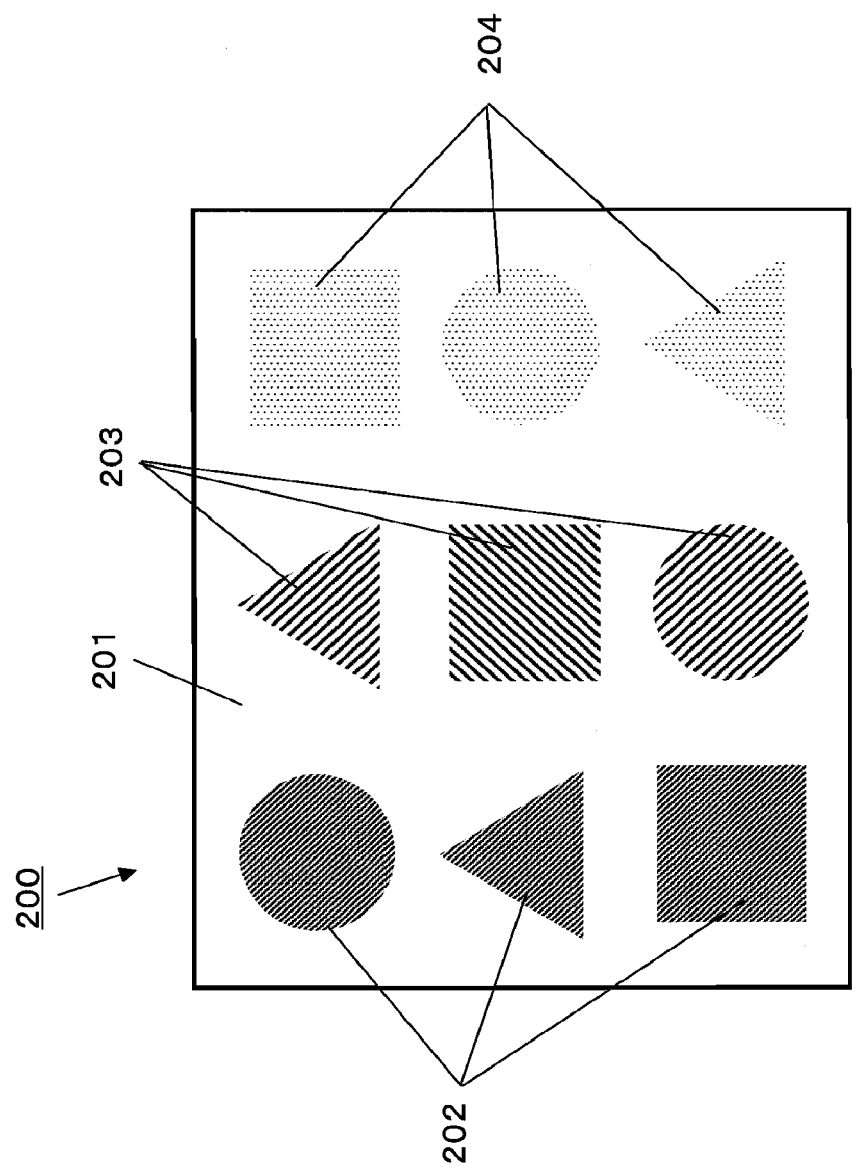
FIG. 25 is an explanatory diagram for describing the special images of the same.
Figure 26:
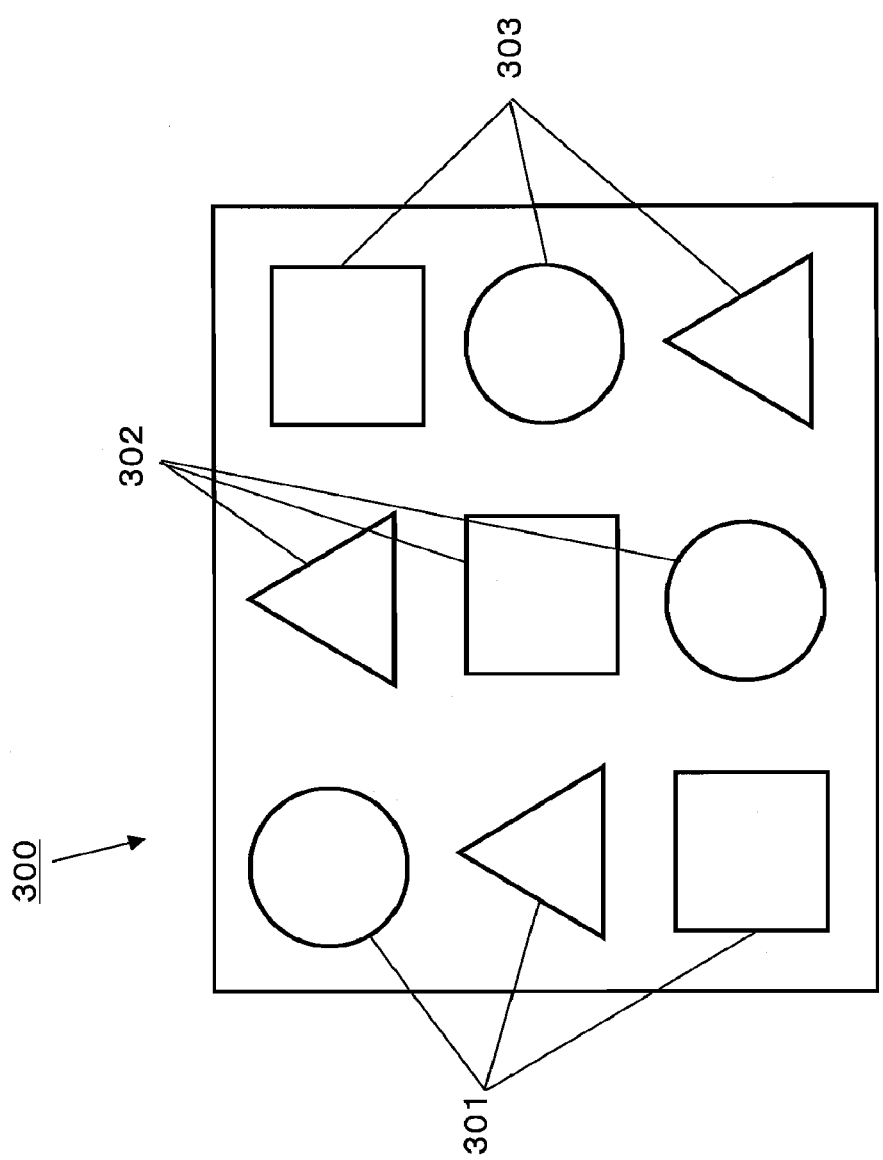
FIG. 26 is an explanatory diagram for describing edge pixels of the same.
Figure 27:
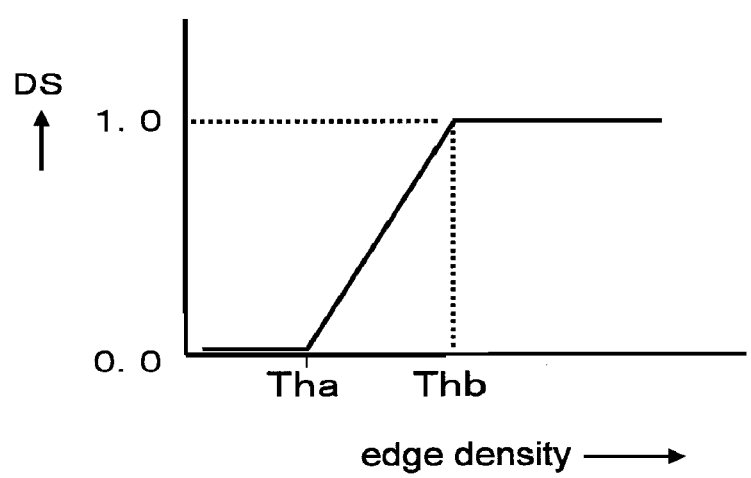
FIG. 27 is an explanatory diagram for describing the output of the effect adjustment signal of the same.

FIG. 24 is a block diagram showing the configuration of the special image detection portion 2140, FIG. 25 is an explanatory diagram for describing the special image, FIG. 26 is an explanatory diagram for describing the edge pixels, and FIG. 27 is an explanatory diagram for describing the output of the special image effect adjustment signal DS.

As shown in FIG. 24, the special image detection portion 2140 is provided with an edge detection portion 2141 for detecting an edge amount for each pixel from the image signal IS, an edge amount determination portion 2142 for determining an edge pixel in which the edge amount is equal to or greater than a predetermined value, an edge density calculation portion 2143 for calculating the ratio of the number of edge pixels to the total number of pixels in the image signal IS, and an effect adjustment signal generation portion 2144 for outputting a special image effect adjustment signal DS according to the ratio that has been calculated by the edge density calculation portion 2143.

Thus, with the visual processing device 1001 it is possible to detect special images with an extremely small tone level number in which the edge component is restricted to the border region of a drawing image, and the bias of that information can be detected.

The special image detection portion 2140 detects a statistical bias from a frame image one or more frames prior when the image signal is a frame image, and detects a statistical bias from a field image one or more fields prior when the image signal is a field image. By doing this, the visual processing device 1001 can use a special image effect adjustment signal DS that corresponds to the bias of the information of the special image from the top of the frame or the field.

For example, a case in which the special image detection portion 2140 processes the special image 200 shown in FIG. 25 is described. As shown in FIG. 25, the special image 200 has a background region 201, a pattern group 202, a pattern group 203, and a pattern group 204, and each one of these regions has a tone level (gradation value) that is constant or that fluctuates little. Each group is made of different shapes whose tone level (gradation value) is substantially the same.

The edge detection portion 2141 detects the edge amount for each pixel from the image signal IS. The edge detection portion 2141 detects the edge amount using an edge detection filter (not shown) such as a first-order derivative filter like a Sobel filter or a Prewitt filter or a second-order derivative filter like a Laplacian filter.

The edge amount determination portion 2142 compares the edge amount and a threshold value that has been set in advance for each pixel, and determines that a pixel is an edge pixel when the edge amount is equal to or greater than the predetermined threshold value.

For example, due to the processing of the special image 200 by the edge amount determination portion 2142, an output 300 such as that shown in FIG. 26 is obtained.

In FIG. 26, the edge pixels are the edge pixels 301, the edge pixels 302, and the edge pixels 303, and occur in the border region of the graphic patterns of the special image 200.

Next, returning to FIG. 24, the edge density calculation portion 2143 calculates the edge density, which is the ratio of the number of edge pixels to the total number of pixels in the image signal IS, as follows.

edge density=edge pixel number÷total pixel number

Here, if the image signal IS is a frame image, then the edge density is the ratio of the edge pixel number to the total pixel number in the frame. If the image signal IS is a field image, then the edge density is the ratio of the edge pixel number to the total pixel number in the field.

The effect adjustment signal generation portion 2144 adjusts the output according to the edge density. In other words, the effect adjustment signal generation portion 2144 outputs a special image effect adjustment signal DS with a larger signal level (value) the larger the edge density. For example, as shown in FIG. 27, it increases the signal level of the special image effect adjustment signal DS when the edge density is in the range from a predetermined value Tha to a predetermined value Thb. By setting threshold values in this way, it is possible to create a special image effect adjustment signal DS in which the visual effect has been completely eliminated if the edge density is below the threshold value Tha, which is included in special images. On the other hand, if a pixel is greater than a threshold value Yhb, which is included in normal images that are not special images, it is possible to create a special image effect adjustment signal DS for processing without weakening the visual effect. Here, the horizontal axis is the edge density, and the vertical axis is the output of the special image effect adjustment signal DS. It should be noted that the range of the signal level of the special image effect adjustment signal DS has been set from 0.0 to 1.0, but it is also possible to adjust this to 0.2 to 1.0, for instance, in accordance with the strength of the visual processing. The visual processing device 1001 is configured such that the effect of visual processing becomes stronger the larger the signal level of the special image effect adjustment signal DS.

The continuous changing portion 50 operates to continuously change the effect adjustment signal MOD between frames when the special image effect adjustment signal DS is output in frame units, or between fields when the special image effect adjustment signal DS is output in field units. For example, the continuous changing portion 50 is provided with a memory portion (not shown) such as a register for temporarily storing the special image effect adjustment signal DS, and creates the effect adjustment signal MOD by interpolating the special image effect adjustment signal DS that is output from the special image detection portion 2140 in a new frame and the special image effect adjustment signal DS that has been stored temporarily, and this effect adjustment signal MOD that is created is stored in the memory portion. The memory portion stores the first special image effect adjustment signal DS that is detected as an initial value. The continuous changing portion 50 outputs the effect adjustment signal MOD that is created through this interpolation computation. By doing this, the effect adjustment signal MOD is kept from changing abruptly between frames. The continuous changing portion 50 can be achieved by an IIR-type filter, for example.

Figure 28:
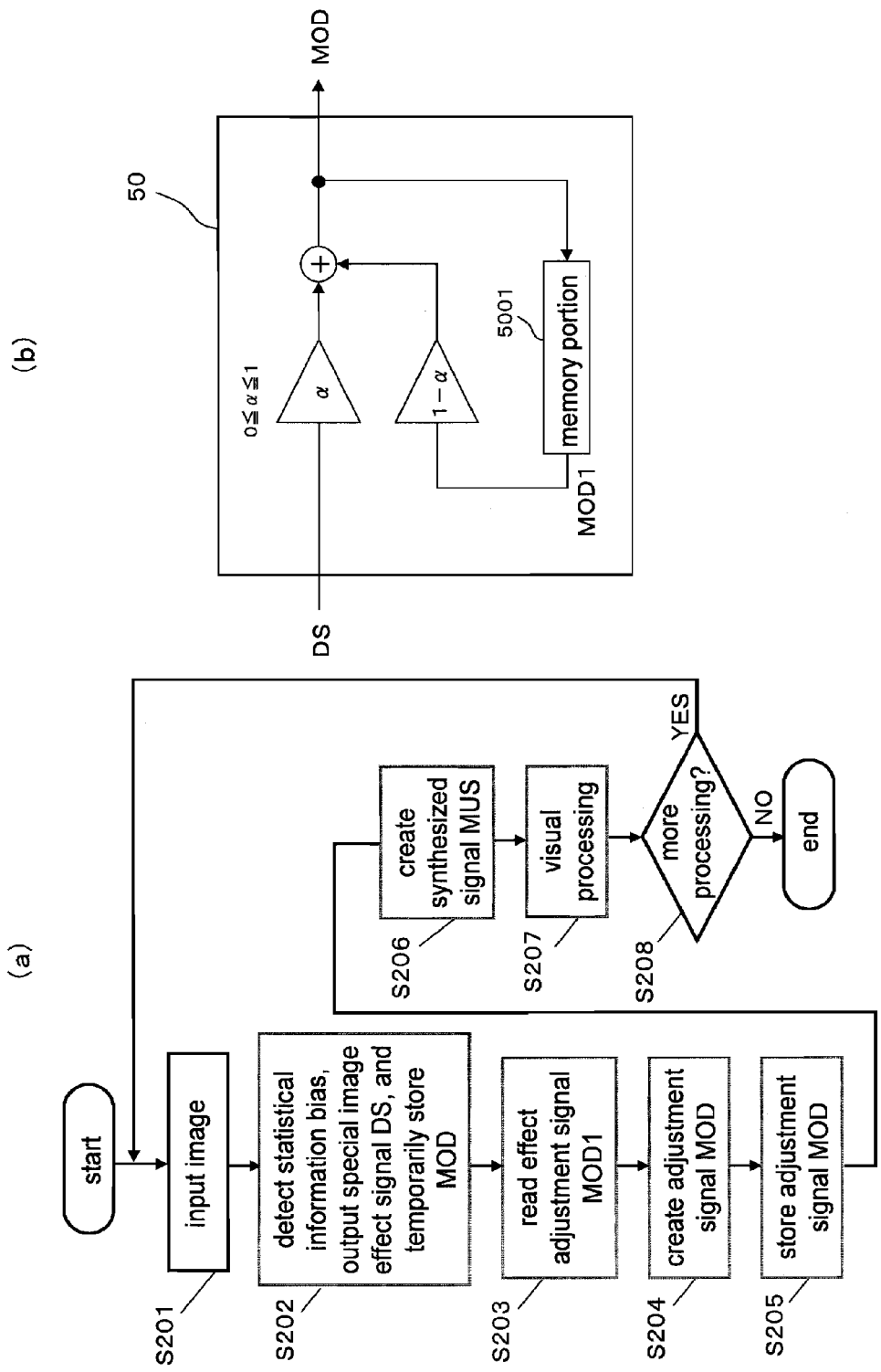
FIG. 28 is a flowchart that describes the operation of the visual processing device and also is a structural diagram of the continuous changing portion.

Next, the operation of the visual processing device 1001 is described using FIG. 28. FIG. 28(*a*) is a flowchart for describing the operation of the visual processing device 1001. FIG. 28(*b*) is a diagram that shows an example of the configuration of the continuous changing portion 50.

As shown in FIGS. 28(*a*) and (*b*), if the image signal IS is a frame image, then in order to detect a statistical bias from the frame image one or more frames prior, a plurality of frame images are input to the visual processing device 1001. Alternatively, if the image signal IS is a field image, then in order to detect a statistical bias from the field image one or more fields prior, a plurality of field images are input to the visual processing device 1001 (S201). Once a plurality of frame images or a plurality of field images have been input to the visual processing device 1001, the special image detection portion 2140 detects a special image from the image signal IS, which is a frame image or a field image to be detected, and outputs a special image effect adjustment signal DS that corresponds to the statistical bias of the special image that has been detected (S202).

Next, the visual processing device 1001 performs interpolation such that the effect adjustment signal MOD is continuously changing between frames. The visual processing device 1001 reads the effect adjustment signal MOD1 of one frame prior, which has been temporarily stored in a memory portion 5001 such as a register for temporary storage by the continuous changing portion 50 (S203), and the special image effect adjustment signal DS that was detected in step S202 and the effect adjustment signal MOD1 that was read in step S203 are interpolated by an interpolation computation, for example, and the effect adjustment signal MOD that is created by this interpolation processing is output from the continuous changing portion 50 (S204). Thus, sudden changes that occur between processed frame images are suppressed, and it is possible to suppress flickering of the image, for example, that results from differences in the visual effect.

Next, the visual processing device 1001 temporarily stores the effect adjustment signal MOD that has been created by interpolating the special image effect adjustment signal DS and the effect adjustment signal MOD1 in the memory portion 5001 (S205). If the interpolation processing is the result of an internal division computation, then the ratio of that interpolation can be given in advance.

Next, the effect adjustment portion 1020 of the visual processing device 1001 creates a synthesized signal MUS by synthesizing the image signal IS and the unsharp signal US from the spatial processing portion 10 in accordance with the effect adjustment signal MOD (S206).

The visual processing portion 30 of the visual processing device 1001 then selects one of the curves of the two-dimensional tone conversion characteristics shown in FIG. 22 and transforms the image signal IS according to the synthesized signal MUS (S207).

Next, the visual processing device 1001 determines whether or not there is a frame image to process next (S208). If there are no more frame images that require processing, then the visual processing is completed. On the other hand, if there are frame images that require processing, then the procedure is returned to step S201 and the next frame image is input. Thereafter, the steps from S201 to S208 are repeated until there are no longer any frames that require processing.

It should be noted that above, a case in which interpolation processing is performed so to continuously change the effect adjustment signal MOD between frames, but the target for interpolation processing is not limited to between frames, and it may also be between fields as well.

As discussed above, with the visual processing device 1001 of the sixth embodiment of the invention, even if a special image has been input, the edges in the image are detected and the effect of visual processing is adjusted based on the edge amount that has been detected, and thus it is possible to increase the visual effect in natural images while suppressing artifacts in special images.

It should be noted that the method of detecting a statistical bias is not limited to the method of the special image detection portion 2140 discussed above. Special images have a statistical bias, such as either an extremely low proportion of regions in which the gradation changes in the image of the image signal IS, or an extremely large proportion of regions in which the gradation does not change in the image of the image signal IS.

Another modified example of the method of detecting a statistical bias is described below.

First, a special image detection portion 700 according to a first modified example is described. With the special image detection portion 700 according to the first modified example, a statistical bias is detected from the proportion of regions in which the gradation does not change in the image of the image signal IS. Regions in which the gradation does not change can be detected from the degree of flatness of the image. A method of detecting a bias in the number of tone levels from the image signal IS is adopted as the method for detecting the degree of flatness. In images in which the there are very few tone levels (number of tones) that can be taken for the pixels making up the image (images in which there is an extremely narrow distribution of the number of tone levels taken by the pixels), there is a wide region in which the gradation is constant, and thus the degree of flatness in the image becomes higher. The degree of the special image can be found from this bias in information.

Figure 29:
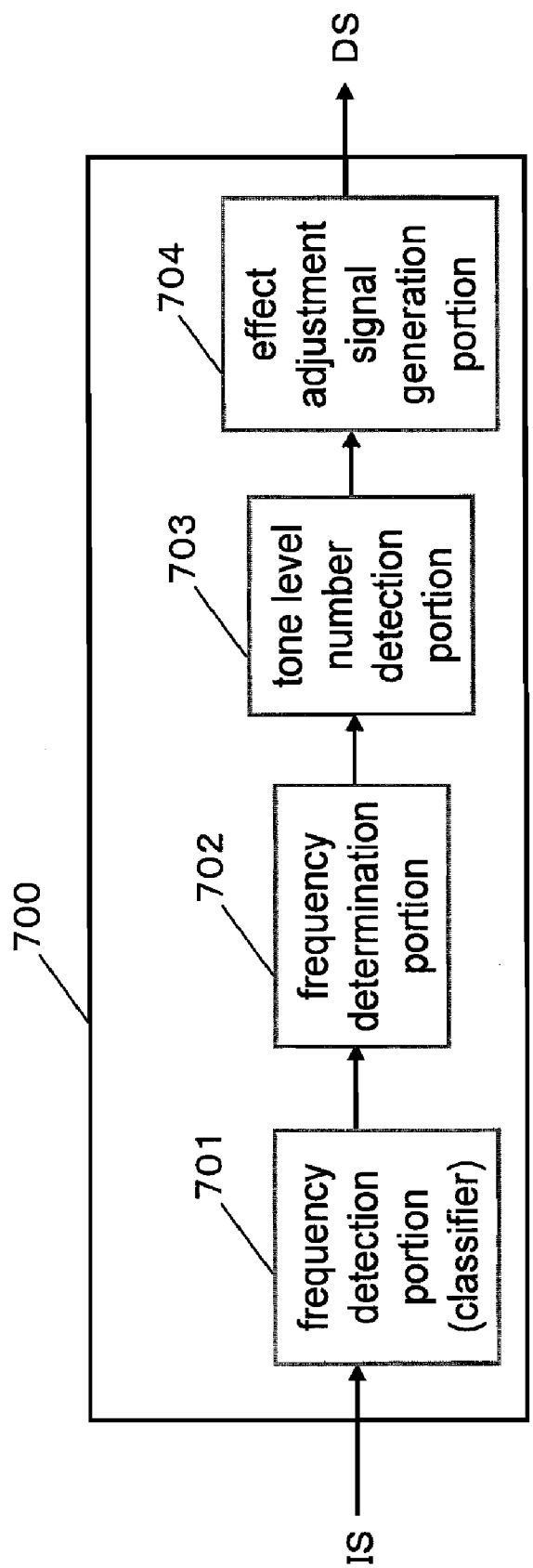
FIG. 29 is a block diagram that shows the configuration of a special image detection portion of a first modified example of the same.
Figure 30:
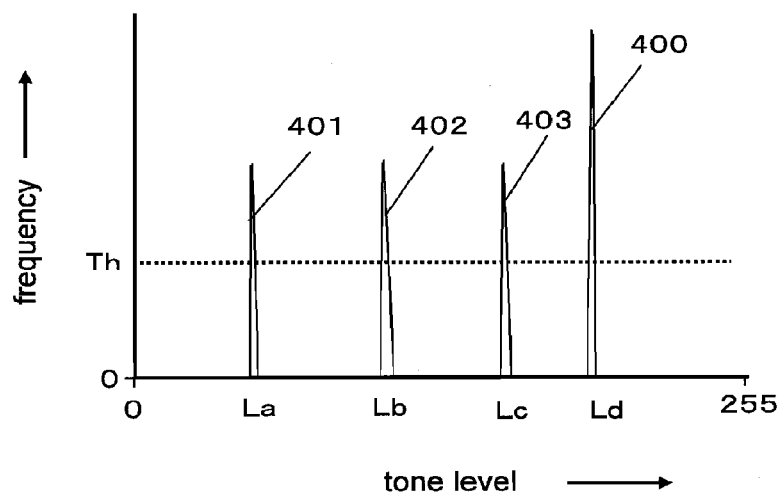
FIG. 30 is an explanatory diagram for describing the frequency distribution that is detected by the frequency detection portion (classifire) of the first modified example of the same.
Figure 31:
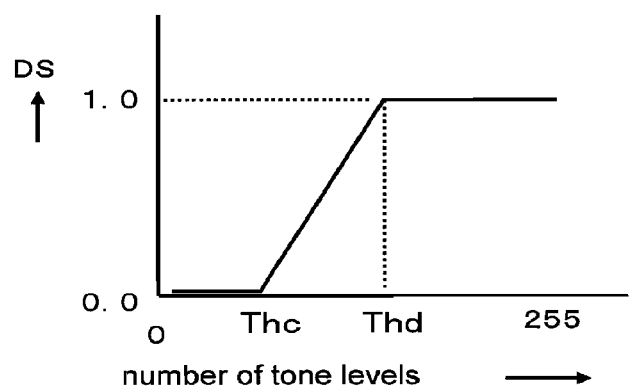
FIG. 31 is an explanatory diagram for describing the effect adjustment signal of the first modified example of the same.

Using FIGS. 29, 30, and 31, a first modified example of a case in which a bias in the tone level number is detected from the image signal IS is described. FIG. 29 is a block diagram showing the configuration of the special image detection portion 700 of the first modified example, FIG. 30 is an explanatory diagram for describing the frequency distribution that is detected by a frequency distribution portion 701 of the first modified example, and FIG. 31 is an explanatory diagram for describing the special image effect adjustment signal DS that is output from the special image detection portion 700 of the first modified example.

As shown in FIG. 29, the special image detection portion 700 is provided with a frequency detection portion (classifier) 701 for detecting the frequency of each tone level from the image signal, a frequency determination portion 702 for comparing the frequency of each tone level with a predetermining threshold and determining whether the tone level has a higher frequency than the predetermined threshold, a tone level number detection portion 703 for detecting the number of tone levels that have been determined to be high frequency by the frequency determination portion 702, and an effect adjustment signal generation portion 704 for outputting an effect adjustment signal in accordance with the number of tone levels that has been detected by the tone level number detection portion 703.

The frequency detection portion (classifier) 701 detects the frequency of each tone level from the image signal using a histogram method. For example, if the image signal has 256 tone levels, then it detects the frequency with which the tone levels appear from 0 to 255.

The frequency determination portion 702 compares the frequency of each tone level with a predetermining threshold to detect tone levels with a higher frequency than the predetermined threshold.

As shown in FIG. 30, the frequency determination portion 702 determines that a frequency 401 is larger than a predetermined threshold Th at a tone level La. Similarly, the frequency determination portion 702 determines that a frequency 402, a frequency 403, and a frequency 400 are each larger than a predetermined threshold Th at the tone levels Lb, Lc, and Ld. Here, the horizontal axis in FIG. 30 is the tone level, and the vertical axis is the frequency.

The tone level number detection portion 703 calculates the number of tone levels that have been determined to be high frequency by the frequency determination portion 702.

Based on the number of tone levels that has been calculated, the effect adjustment signal generation portion 704 increases the signal level (value) of the special image effect adjustment signal DS the larger the tone level number and outputs the special image effect adjustment signal DS. For example, as shown in FIG. 31, the signal level (value) of the special image effect adjustment signal DS is increased over the range of a calculated tone level number of the predetermined value Thc to the predetermined value Thd.

By providing threshold values in this way, it is possible for the effect adjustment signal generation portion 704 to create a special image effect adjustment signal DS for eliminating the visual effect completely if the tone level number is equal to or below the threshold Thc, which is included in special images. On the other hand, the effect adjustment signal generation portion 704 can create a special image effect adjustment signal DS for processing without weakening the visual effect if the tone level number is equal to or greater than a threshold value Thd, which is included in normal images that are not special images. Here, the horizontal axis is the tone level number, and the vertical axis is the output of the special image effect adjustment signal DS. It should be noted that the range of the value of the special image effect adjustment signal DS that is output has been set from 0.0 to 1.0, but it is also possible to adjust this to from 0.2 to 1.0, for instance, in accordance with the strength of the visual processing. The visual processing device 1001 is configured such that the effect of the visual processing becomes stronger the larger the value of the special image effect adjustment signal DS.

Thus, with the special image detection portion 700 of the first modified example, it is possible to detect the degree of a special image from the image signal based on the bias of the image information, and the special image detection portion 2140 can be substituted with the special image detection portion 700.

Next, a special image detection portion 80 according to a second modified example is described. With the special image detection portion 80 according to the second modified example, the statistical bias is detected from the proportion of regions in which the gradation does not change in the image of the image signal IS. Regions in which the gradation does not change can be detected by the degree of flatness of the image. As the method for detecting the degree of flatness, a method in which a continuous length of analogous pixels whose difference in luminance with adjacent pixels is below a predetermined value is detected from the image signal IS, and then a mean continuous length obtained by taking the mean of a plurality of continuous lengths that have been detected is adopted. By doing this, it is possible to detect the degree of the special image. In special images, there are broad regions of constant gradation, and thus the degree of flatness in the image is high and many pixels with an analogous luminance follow one other. In other words, it is possible to detect the degree of a special image from the statistical bias.

Figure 32:
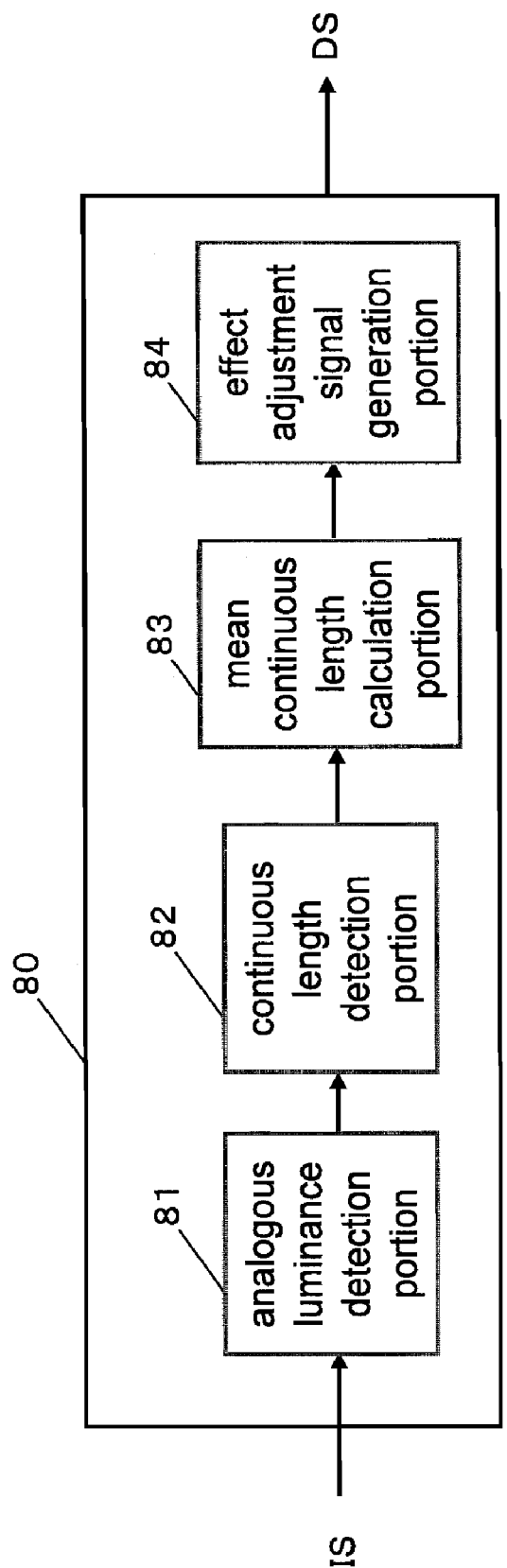
FIG. 32 is a block diagram that shows the configuration of the special image detection portion of a second modified example of the same.
Figure 33:
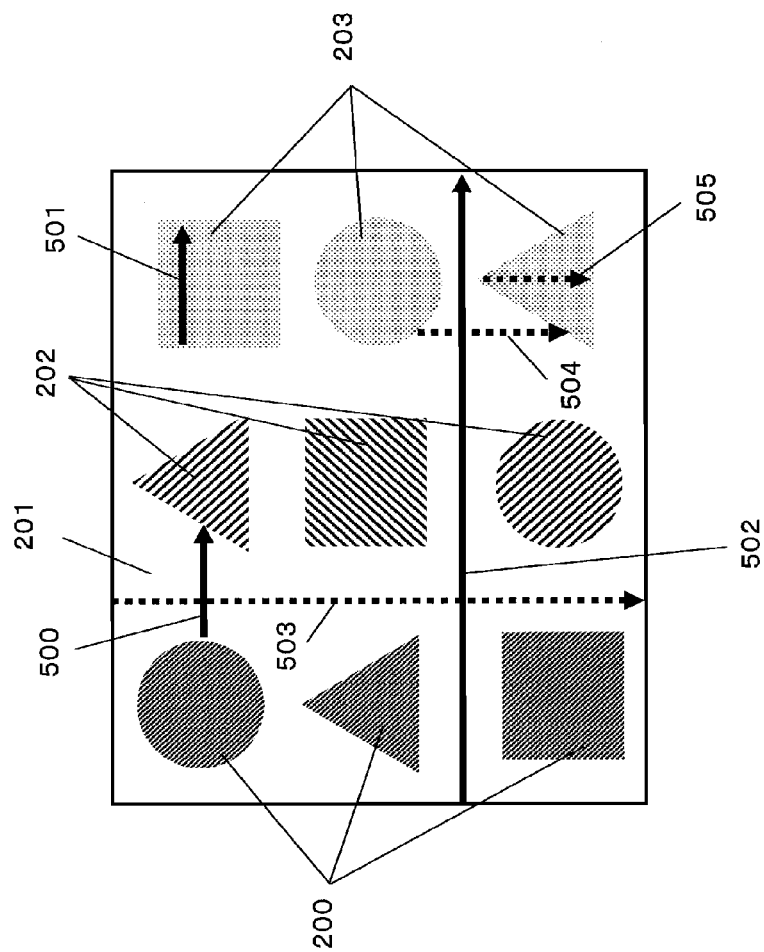
FIG. 33 is an explanatory diagram for describing the continuous lengths of the second modified example of the same.
Figure 34:
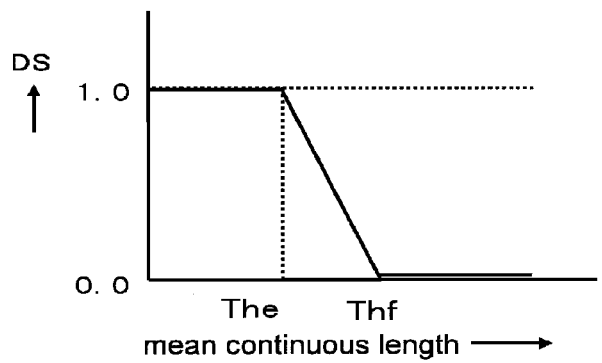
FIG. 34 is an explanatory diagram for describing the effect adjustment signal of the second modified example of the same.

The case of the second modified example, in which continuous lengths when analogous luminance signals are continuous are detected from the image signal, is described using FIGS. 32, 33, and 34.

FIG. 32 is a block diagram showing the configuration of the special image detection portion 80 of the second modified example, FIG. 33 is an explanatory diagram for describing the continuous lengths of the second modified example, and FIG. 34 is an explanatory diagram for describing the special image effect adjustment signal DS of the second modified example.

As shown in FIG. 32, the special image detection portion 80 of the second modified embodiment is provided with an analogous luminance detection portion 81 for detecting analogous pixels whose difference in luminance with adjacent pixels is less than a predetermined value from the image signal IS, a continuous length detection portion 82 for detecting a continuous length of contiguous analogous pixels, a mean continuous length calculation portion 83 for calculating a mean continuous length by finding the mean of a plurality of continuous lengths that have been detected by the continuous length detection portion 82, and an effect adjustment signal generation portion 84 for outputting a special image effect adjustment signal DS according to the mean continuous length.

The analogous luminance detection portion 81 detects analogous pixels whose difference in luminance with adjacent pixels is equal to or less than a predetermined value from the image signal. The predetermined value is a value that is found experimentally in advance, and is determined by the picture quality specifications of a device in question.

The continuous length detection portion 82 detects continuous lengths of contiguous analogous pixels. For example, as shown in FIG. 33, multiple pixels of continuous analogous pixels are detected as continuous lengths in the vertical direction, such as the vertical direction 503, the vertical direction 504 and the vertical direction 505, and in the horizontal direction, such as the horizontal direction 500, the horizontal direction 501 and the horizontal direction 502.

The mean continuous length calculation portion 83 calculates a mean continuous length by averaging a plurality of continuous lengths that have been detected by the continuous length detection portion 82.

The effect adjustment signal generation portion 84 outputs a special image effect adjustment signal DS according to the mean continuous length, such the signal level (value) of the special image effect adjustment signal DS is smaller the longer the mean continuous length. For example, as shown in FIG. 34, it reduces the signal level (value) of the special image effect adjustment signal DS when the mean continuous length that has been detected is within the range of the predetermined value The to the predetermined value Thf. Here, the horizontal axis is the mean continuous length, and the vertical axis is the output of the special image effect adjustment signal DS.

By providing threshold values in this way, it is possible for the effect adjustment signal generation portion 84 to create a special image effect adjustment signal DS for processing without weakening the visual effect in a case where this is below a threshold value The, which includes normal images that are not special images. On the other hand, the effect adjustment signal generation portion 84 can create a special image effect adjustment signal DS in which the visual effect has been completely eliminated in a case where this is equal to or greater than the threshold Thf, which includes special images.

It should be noted that the range of the value of the special image effect adjustment signal DS has been set from 0.0 to 1.0, but it is also possible to adjust this to from 0.2 to 1.0, for instance, depending on the strength of the visual processing. The visual processing device 1001 is configured such that the effect of the visual processing becomes stronger the larger the value of the special image effect adjustment signal DS.

Thus, with the special image detection portion 80 of the second modified example, it is possible to detect the magnitude of a special image that has a bias of information from the image signal, and the special image detection portion 80 can be substituted for the special image detection portion 2140.

A special image detection portion 90 according to a third modified example is described next. In the third modified example, a statistical bias of information is detected from the proportion of regions in which the gradation changes in the image of the image signal IS. Regions in which the gradation changes can be detected from edge components in the image. Here, high frequency blocks that include high frequency components are detected from a plurality of blocks that have been obtained by partitioning as edge components in the image, and by detecting the ratio of the number of high frequency blocks with respect to the total number of blocks that have been obtained by partitioning, the degree that an image is a special image is detected.

Figure 35:
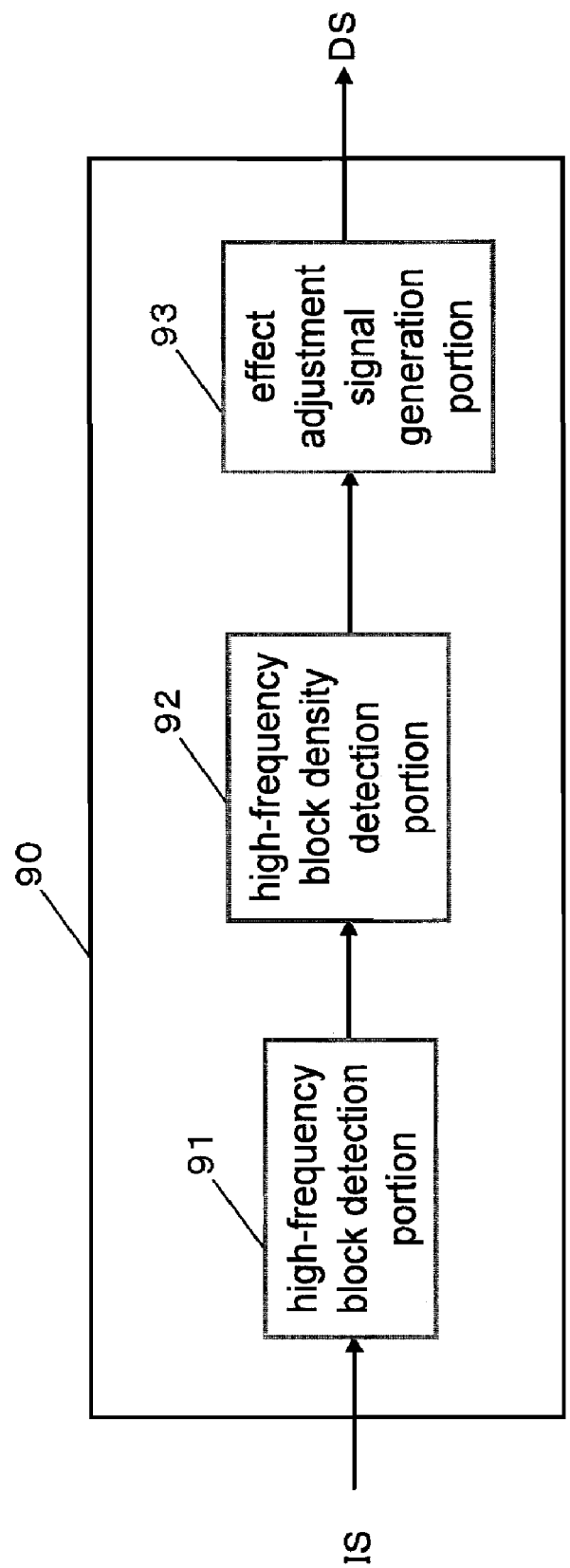
FIG. 35 is a block diagram that shows the configuration of the special image detection portion of a third modified example of the same.
Figure 36:
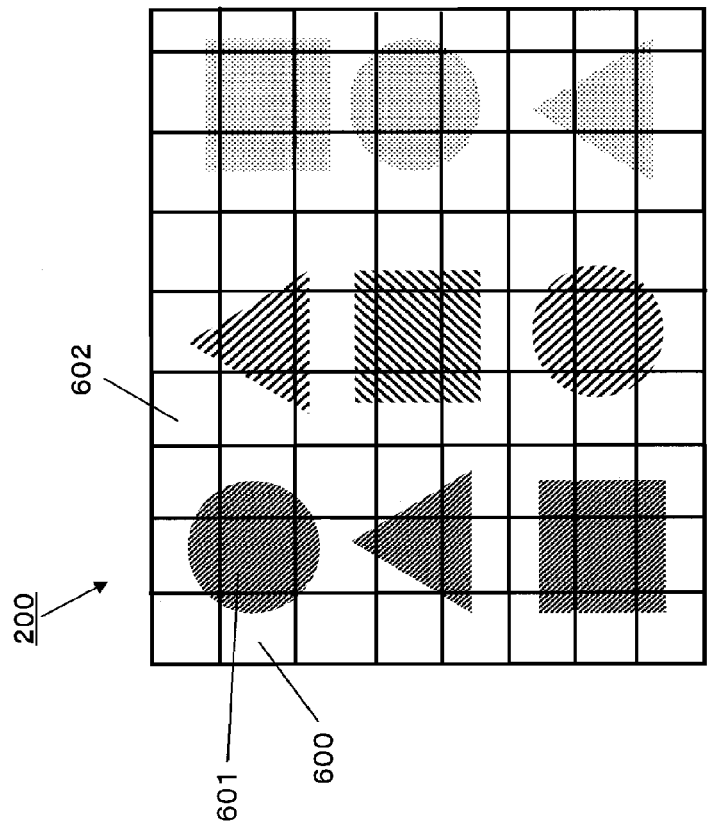
FIG. 36 is an explanatory diagram for describing the block images of the third modified example of the same.
Figure 37:
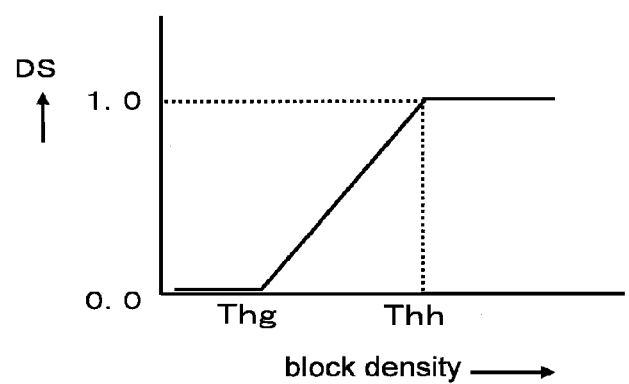
FIG. 37 is an explanatory diagram for describing the effect adjustment signal of the third modified example of the same.

The case of the third modified example, in which the ratio of the number of high frequency blocks is detected, is described using FIGS. 35, 36, and 37. FIG. 35 is a block diagram showing the configuration of the special image detection portion 90 of the third modified example, FIG. 36 is an explanatory diagram for describing the block images of the third modified example, and FIG. 37 is an explanatory diagram for describing the special image effect adjustment signal DS of the third modified example.

As shown in FIG. 35, the special image detection portion 90 of the third modified example is provided with a high-frequency block detection portion 91 for detecting high-frequency blocks that include high-frequency components from an image signal IS that has been partitioned into a plurality of blocks, a high-frequency block density detection portion 92 for detecting the ratio of the number of high-frequency blocks with respect to the total block number, and an effect adjustment signal generation portion 93 for outputting an effect adjustment signal according to the ratio of the number of blocks that has detected by the high-frequency block density detection portion 92.

The high-frequency block detection portion 91 can detect high-frequency components in each encoded block in a case where the image signal that has been input is a compressed image encoded by MPEG or JPEG, for example. For example, it can extract high-frequency components by detecting the AC coefficient of each encoded block.

The high-frequency block detection portion 91 determines that a block is a high-frequency block when a high-frequency component equal to or greater than a predetermined value has been detected.

A case in which the special image 200 has been partitioned into a plurality of blocks as in FIG. 36, for example, and high-frequency components are detected for each block, is described.

The high-frequency block detection portion 91 detects a high-frequency component in the blocks 600 because they contain a edge of the image pattern, and determines that these are "high-frequency blocks." On the other hand, the high-frequency block detection portion 91 cannot detect a high-frequency component in the blocks 601 and 602 because they each have a substantially constant tone level (gradation value), and determines that each of these is "not a high-frequency block." Hereinafter, it performs detection in the same manner for all of the blocks that have been obtained by partitioning.

The high-frequency block density detection portion 92 detects the ratio of the number of high-frequency blocks to the total number of partitioned blocks (hereinafter, this is called the "block density").

Based on the block density, the effect adjustment signal generation portion 93 increases the value of the special image effect adjustment signal DS the higher the block density, and outputs the special image effect adjustment signal DS. For example, as shown in FIG. 37, the effect adjustment signal generation portion 93 increases the value of the special image effect adjustment signal DS when the block density that has been detected is in the range of equal to or greater than a predetermined value Thg up to a predetermined value Thh. By providing threshold values in this way, it is possible for the effect adjustment signal generation portion 93 to create a special image effect adjustment signal DS in which the visual effect has been completely eliminated if the block density is below the threshold Thg, which includes special images. On the other hand, the effect adjustment signal generation portion 93 can create a special image effect adjustment signal DS for processing without weakening the visual effect if the block density is greater than a threshold value Thh, which includes normal images that are not special images. Here, the horizontal axis is the block density, and the vertical axis is the output of the special image effect adjustment signal DS. It should be noted that the range of the value of the special image effect adjustment signal DS that is output has been set from 0.0 to 1.0, but it is also possible to adjust this to from 0.2 to 1.0, for instance, depending on the strength of the visual processing. The visual processing device 1001 is configured such that the effect of the visual processing becomes stronger the larger the value of the special image effect adjustment signal DS.

Thus, with the special image detection portion 90 of the third modified example, it is possible to detect the degree of a special image that has a bias in the image information from the image signal IS, and the special image detection portion 90 can be substituted for the special image detection portion 2140.

It should be noted that it is also possible for a special image having a statistical bias of information to be detected from a reduced image such as a thumbnail image obtained by reducing the image signal, and then to output an effect adjustment signal based on that statistical bias of information.

It is also possible to provide a reducing portion (not shown), for reducing the image signal, which is inserted between the input signal IS and the special image detection portion 2140, 700, 80, or 90, and then detect special images having a statistical bias from the reduced image that is created by the reducing portion and output an effect adjustment signal MOD based on that statistical bias.

By using a reduced image, it is possible to detect flat regions that are near edges while suppressing the effects of noise. In other words, there is less of a noise component in a reduced image that has been created by a reduction method in which an image signal is first averaged and then thinned out, and thus it is possible to detect a statistical bias in information while suppressing the effects of noise. Further, using a reduced signal makes it possible to lower the number of pixels to be detected, and this allows the number of calculations to be reduced.

Seventh Embodiment

With the visual processing device 1001 according to the sixth embodiment of the invention, a synthesized signal MUS that is synthesized altering the ratio of the image signal IS and the surrounding image information (unsharp signal) US according to an effect adjustment signal MOD is output, and the visual processing portion 30 outputs a processed signal OS that is obtained by visually processing the image signal according to the synthesized signal MUS from the effect adjustment portion 1020, but with a visual processing device 1002 according to the seventh embodiment of the invention, an effect adjustment portion 2021 outputs a synthesized output OUT that is obtained by synthesizing the processed signal OS that has been visually processed and the image signal IS according to an effect adjustment signal. The visual processing device 1002 according to the seventh embodiment of the invention is described using FIG. 38.

Figure 38:
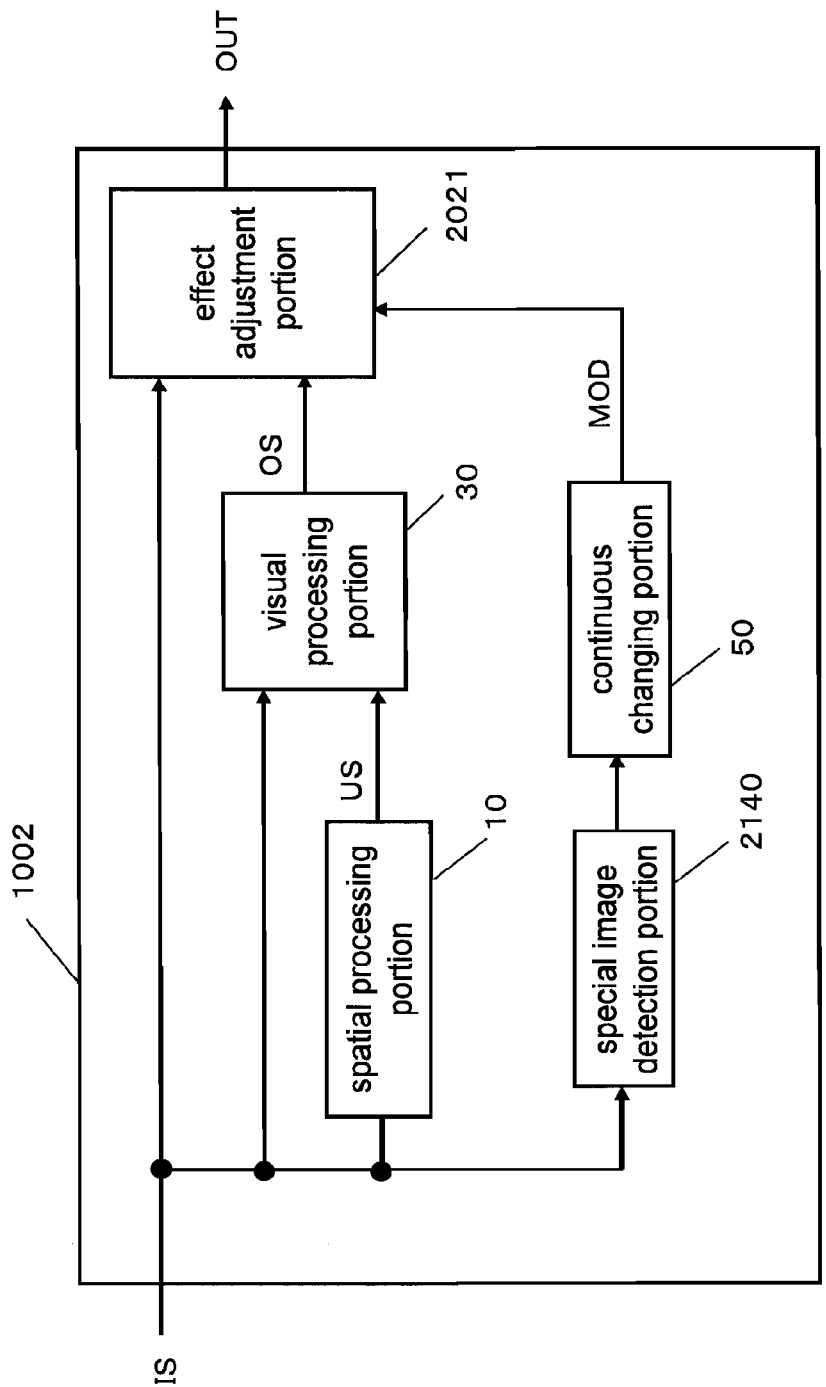
FIG. 38 is a block diagram that shows the configuration of a visual processing device according to a seventh embodiment of the invention.

FIG. 38 is a block diagram that shows the configuration of the visual processing device 1002 according to the seventh embodiment of the invention. Hereinafter, sections that are identical to those of the sixth embodiment are assigned the same reference numerals as before and will not be described in detail.

In FIG. 38, the visual processing portion 30 outputs a processed signal OS based on the image signal IS and the output US of the spatial processing portion 10.

The effect adjustment portion 2021 interpolates the image signal IS and the processed signal OS using the effect adjustment signal MOD in order to differ the effect of the visual processing. For example, the output OUT from the effect adjustment portion 2021 is calculated through an interpolation calculation such as that of Eq. 9 below.

$$OUT = OS \times MOD + IS \times (1.0 - MOD) \qquad \text{Eq. 9}$$

It should be noted that Eq. 9 can be modified as shown in Eq. 10.

$$OUT = (OS - IS) \times MOD + IS \qquad \text{Eq. 10}$$

Thus, according to the visual processing device 1002 of the seventh embodiment of the invention, it is possible to output a synthesized output OUT that is synthesized changing the proportion of the processed signal OS and the image signal IS according to the effect adjustment signal MOD, and the effect of visual processing can be differed.

It should be noted that it is also possible to substitute the special image detection portion 2140 for the special image detection portion 700 of the sixth embodiment of the invention. In this case as well, it is possible to similarly detect special images and then create an effect adjustment signal MOD that corresponds to the bias of the image information.

It should be noted that it is also possible to substitute the special image detection portion 2140 for the special image detection portion 80 of the sixth embodiment of the invention. In this case as well, it is possible to similarly detect special images and then create an effect adjustment signal MOD that corresponds to the bias of the image information.

It should be noted that it is also possible to substitute the special image detection portion 2140 for the special image detection portion 90 of the sixth embodiment of the invention. In this case as well, it is possible to similarly detect special images and then create an effect adjustment signal MOD that corresponds to the bias of the image information.

Eighth Embodiment

With the visual processing device 1001 of the sixth embodiment of the invention, a synthesized signal MUS that is synthesized changing the proportion of the image signal IS and the surrounding image information (unsharp signal) US according to an effect adjustment signal MOD is output, and the visual processing portion 30 outputs a processed signal OS that is obtained by visually processing the image signal IS according to the synthesized signal MUS from the effect adjustment portion 1020, but with a visual processing device 1003 according to the eighth embodiment of the invention, an effect adjustment portion 2022 creates a profile that is synthesized changing the proportion of the output of each of a plurality of profiles with different visual processing effects in accordance with the effect adjustment signal MOD (hereinafter, this will be called a "synthesized profile"), and sets this in the LUT of the visual processing portion 30. This embodiment is described using FIG. 39.

Figure 39:
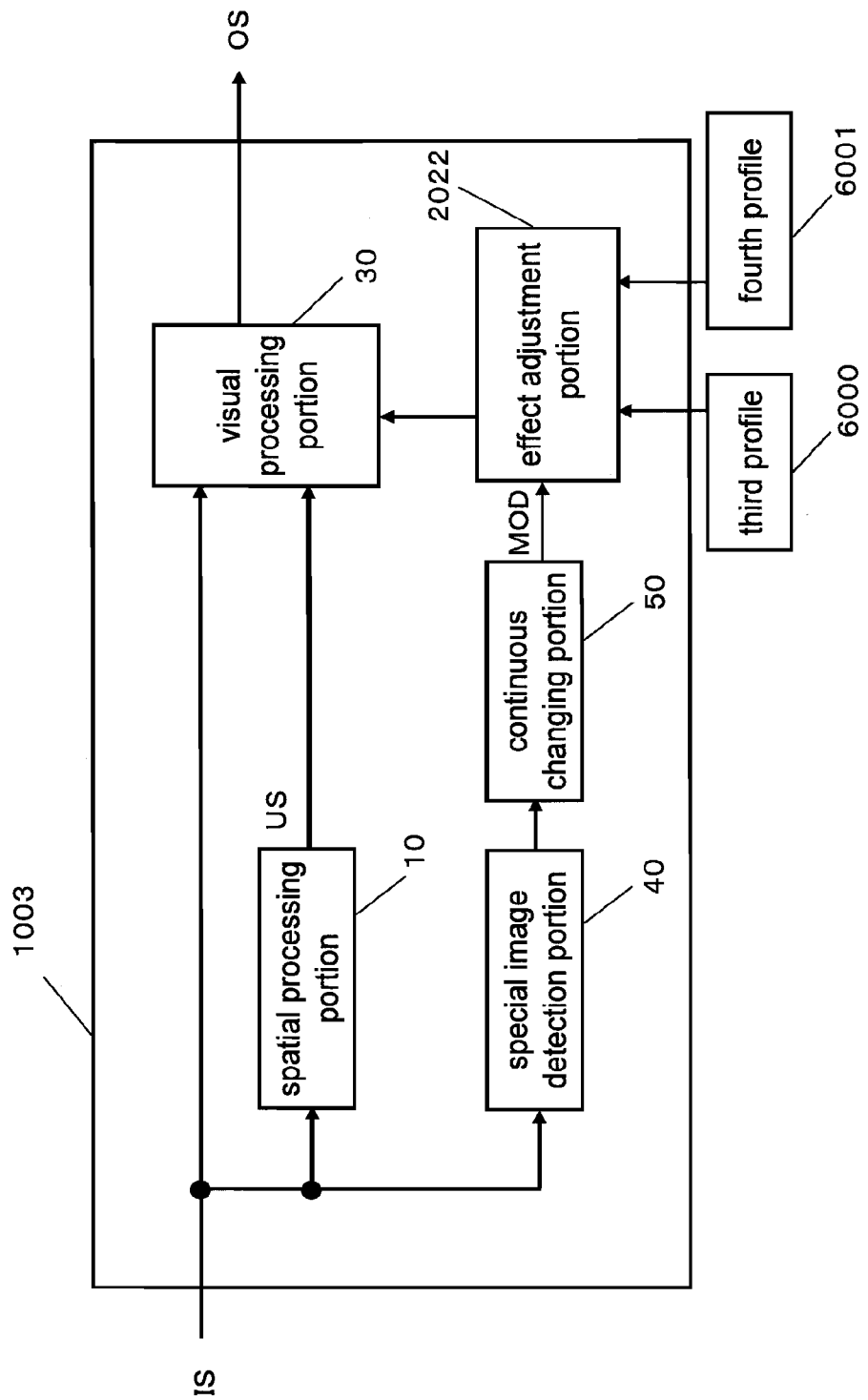
FIG. 39 is a block diagram that shows the configuration of a visual processing device according to an eighth embodiment of the invention.

FIG. 39 is a block diagram that shows the configuration of a visual processing device 1003 according to the eighth embodiment of the invention. Hereinafter, sections that are identical to those of the sixth embodiment are assigned the same reference numerals as before and will not be described in detail.

The effect adjustment portion 2022 synthesizes a third profile 6000 and a fourth profile 6001, which have different strengths of visual processing, through an interpolation computation based on the effect adjustment signal MOD in order to create a synthesized profile, and sets this in the LUT of the visual processing portion 30. It should be noted that it is also possible to create the synthesized profile through an extrapolation computation.

The visual processing portion 30 can perform visual processing with different strengths of visual processing and different degrees of visual effects using the synthesized profile that has been set in the LUT.

Thus, according to the visual processing device 1003 of the eighth embodiment of the invention, by synthesizing a plurality of profiles with different visual processing strengths and effects in accordance with the effect adjustment signal MOD and then setting the synthesized profile in the LUT of the visual processing portion 30, it is possible to differ the effect of visual processing.

It should be noted that it is also possible to substitute the special image detection portion 2140 for the special image detection portion 700 of the sixth embodiment of the invention. In this case as well, it is possible to similarly detect special images and then create an effect adjustment signal MOD that corresponds to the bias of information.

It should be noted that it is also possible to substitute the special image detection portion 2140 for the special image detection portion 80 of the sixth embodiment of the invention. In this case as well, it is possible to similarly detect special images and then create an effect adjustment signal MOD that corresponds to the bias of information.

It should be noted that it is also possible to substitute the special image detection portion 2140 for the special image detection portion 90 of the sixth embodiment of the invention. In this case as well, it is possible to similarly detect special images and then create an effect adjustment signal MOD that corresponds to the bias of information.

Ninth Embodiment

Figure 40:
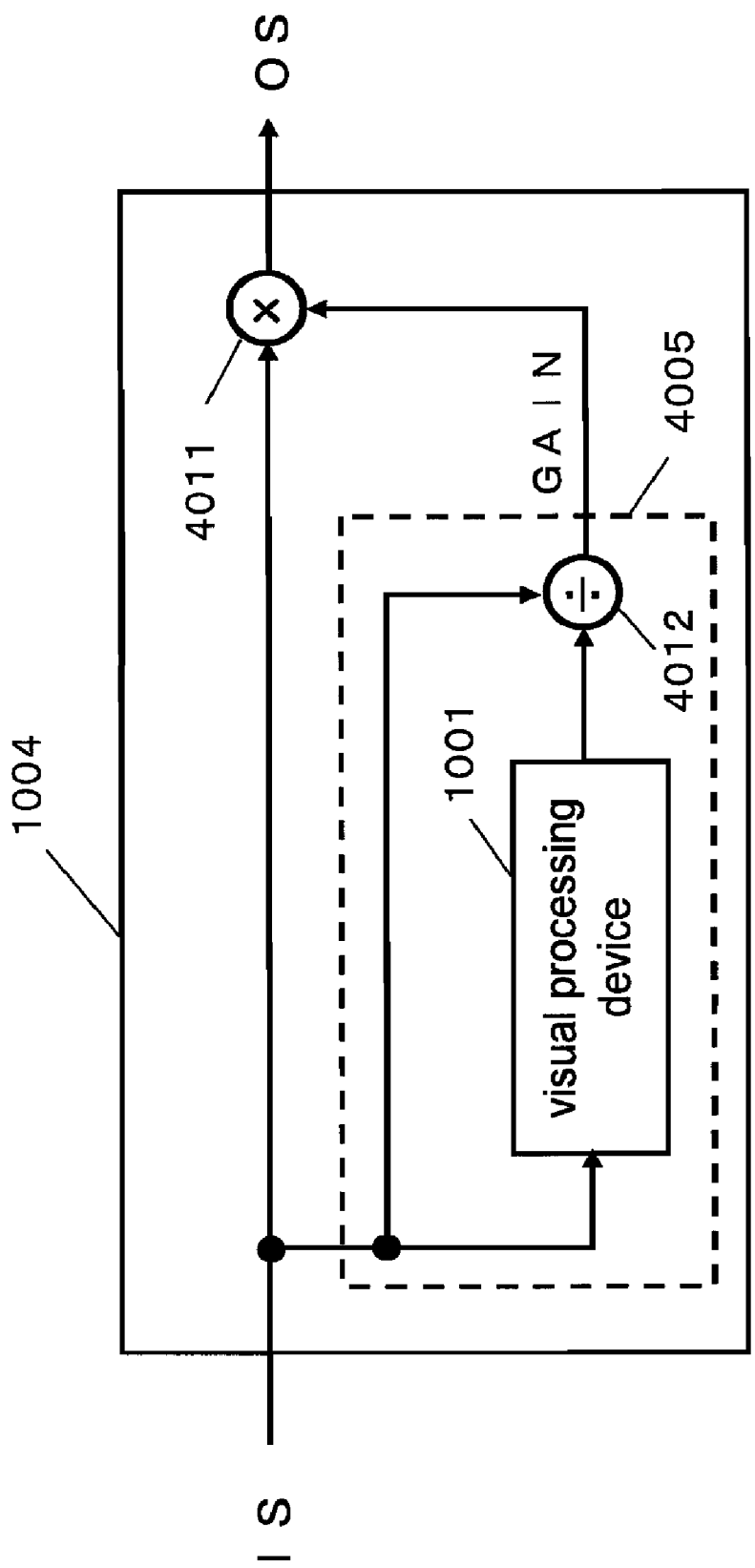
FIG. 40 is a block diagram that shows the configuration of a visual processing system according to a ninth embodiment of the invention.
Figure 41:
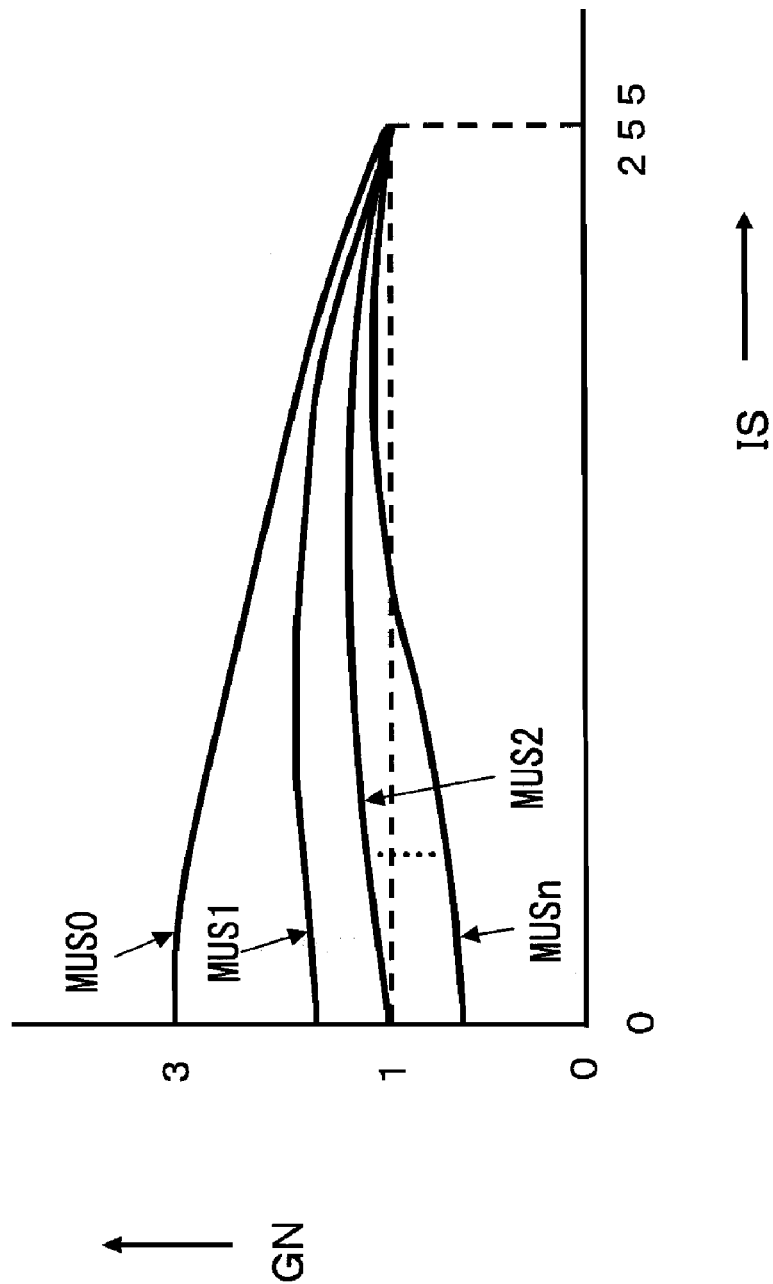
FIG. 41 is an explanatory diagram for describing the two-dimensional gain characteristics of the same.

With the visual processing devices of the sixth embodiment of the invention through the eighth embodiment of the invention, a tone conversion value based on two-dimensional tone conversion characteristics is output, but in the ninth embodiment of the invention, a gain-type visual processing system 1004 that performs tone conversion using a gain output is described using FIGS. 40 and 41.

FIG. 40 is a block diagram that shows the configuration of a gain-type visual processing system 1004 according to the ninth embodiment of the invention, and FIG. 41 is an explanatory diagram for describing the two-dimensional gain characteristics. Hereinafter, sections that are identical to those of the sixth embodiment are assigned the same reference numerals as before and will not be described in detail.

In FIG. 40, the gain-type visual processing system 1004 is provided with a gain-type visual processing device 4005 for outputting a gain signal GAIN that is obtained by visually processing the image signal IS, and a multiplier 4011 for multiplying the gain signal GAIN and the image signal IS.

The gain-type visual processing device 4005 is provided with the visual processing device 1001 for outputting a processing signal OS obtained by visually processing the image signal IS, and a divider 4012 for dividing the processed signal OS by the image signal IS. Here, the visual processing device 1001 outputs a tone conversion value that is obtained by visually processing the output of the image signal IS, and by dividing this tone conversion value by the image signal IS, it is possible to achieve the gain-type visual processing device 4005.

The multiplier 4011 multiplies the image signal IS and the gain signal GAIN that is output by the gain-type visual processing device 4005, and outputs a tone conversion value in which the output of the image signal IS has been visually processed.

It should be noted that it is also possible for the visual processing portion 30 to carry out processing by directly using a profile that has the two-dimensional gain characteristics shown in FIG. 41. Here, the vertical axis of FIG. 41 is the gain output GN, and the horizontal axis is the image signal IS. The two-dimensional gain characteristics shown in FIG. 41 are equivalent to those that are obtained by dividing the output of the profile of the two-dimensional tone conversion characteristics shown in FIG. 22 by the image signal IS. It is also possible to set a profile that has these two-dimensional gain characteristics in the LUT of the visual processing portion 30 of the visual processing device 1001. By setting a profile of these two-dimensional gain characteristics in the LUT of the visual processing portion 30 in advance in this way, the gain output GN and the gain signal GAIN become equal and thus the divider 12 can be eliminated and it is still possible to achieve the gain-type visual processing device 4005.

With the gain-type visual processing device 4005 in the gain-type visual processing system 1004 of the ninth embodiment of the invention, there is little change in the processed signal that has been visually processed with respect to the change in the image signal IS that has been input, and thus it is possible to reduce the number of bits of the input signal and also to reduce the circuit scale. Additionally, if the visual processing portion 30 is provided with a 2D LUT, then the memory capacity can be reduced as well.

It should be noted that the visual processing device 1002 of the seventh embodiment of the invention can be substituted for the visual processing device 1001 of the sixth embodiment of the invention. The gain-type visual processing device 4005 can be similarly achieved in this case as well.

Likewise, the visual processing device 1003 of the eighth embodiment of the invention can be substituted for the visual processing device 1001 of the sixth embodiment of the invention. The gain-type visual processing device 4005 can be similarly achieved in this case as well.

Thus, according to the sixth embodiment of the invention through the ninth embodiment of the invention, the visual processing effect can be maintained when a normal image that is not a special image has been input, and artifacts can be inhibited when a special image has been input.

Tenth Embodiment

The various functions such as the spatial processing function, effect adjustment function, visual processing function and the like in the visual processing device or visual processing system according to the present invention explained in the aforementioned embodiments may be carried out by hardware using an integrated circuit, or by software that operates using a central processing unit (hereinafter, abbreviated as "CPU"), digital signal processor and the like. Alternatively, they may be carried out by mixed processing using the hardware and software.

When the functions are carried out by the hardware, each function in the embodiments of the present invention may be achieved by a separate integrated circuit, or a part or all of the functions may be achieved by one integrated circuit. The LSI may be referred to as an IC, a system LSI, a super LSI or an ultra LSI in accordance with the degree of integration.

In addition, the integrating circuit may be achieved by an application specific integrated circuit or a versatile processing unit. For example, it is possible to use an FPGA (Field Programmable Gate Array) that is programmable after the LSI is produced or a silicon figurable processor that can restructure connection or setting of circuit cells in the LSI.

Furthermore, if another technique for integrating circuits rather than the LSI appears with the progress of semiconductor technology, then that technique may be utilized for integrating the functional blocks. Biotechnology has the potential for such technology.

Figure 46:
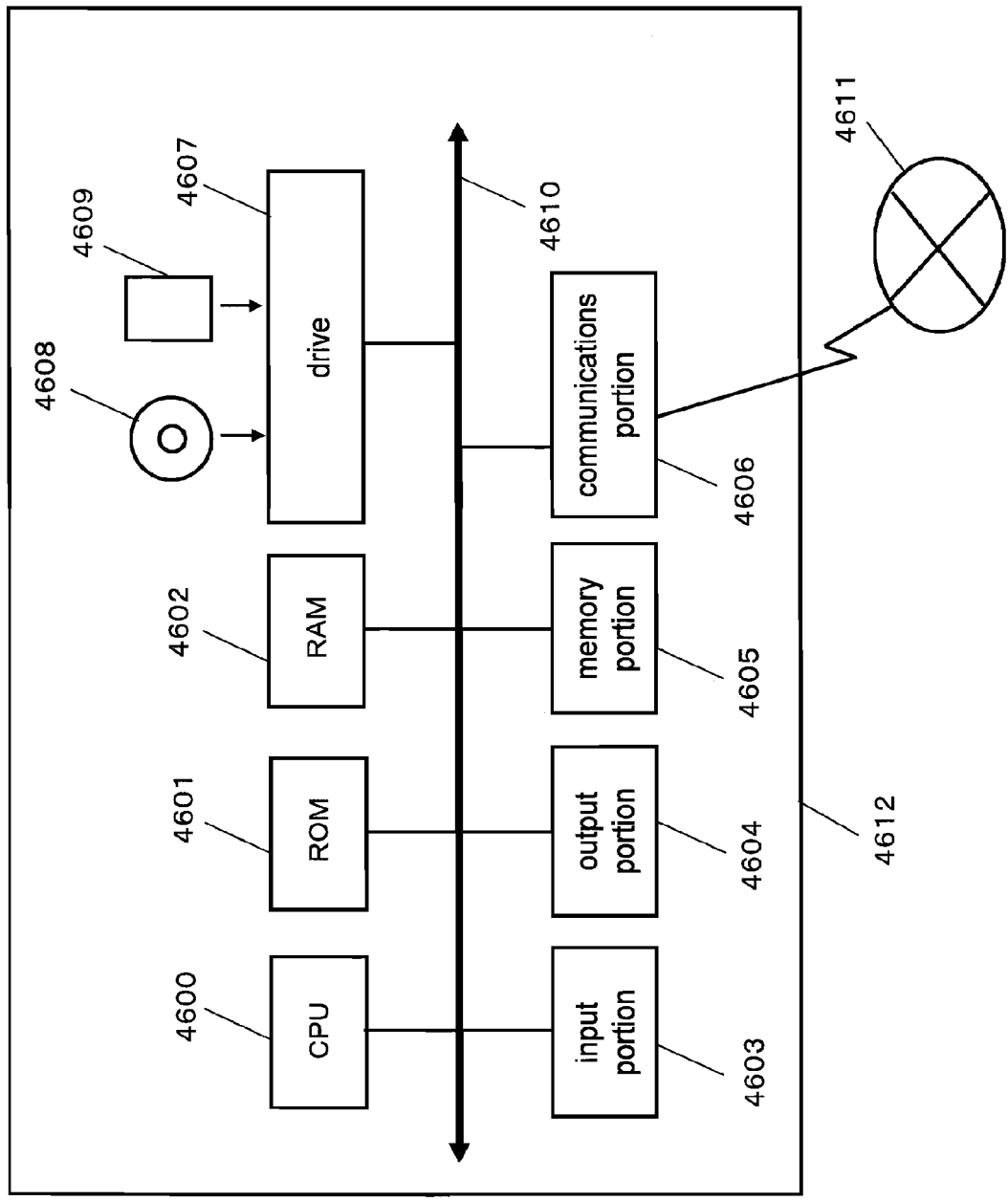
FIG. 46 is a block diagram that describes an example of a computer system according to the second embodiment.
Figure 47:
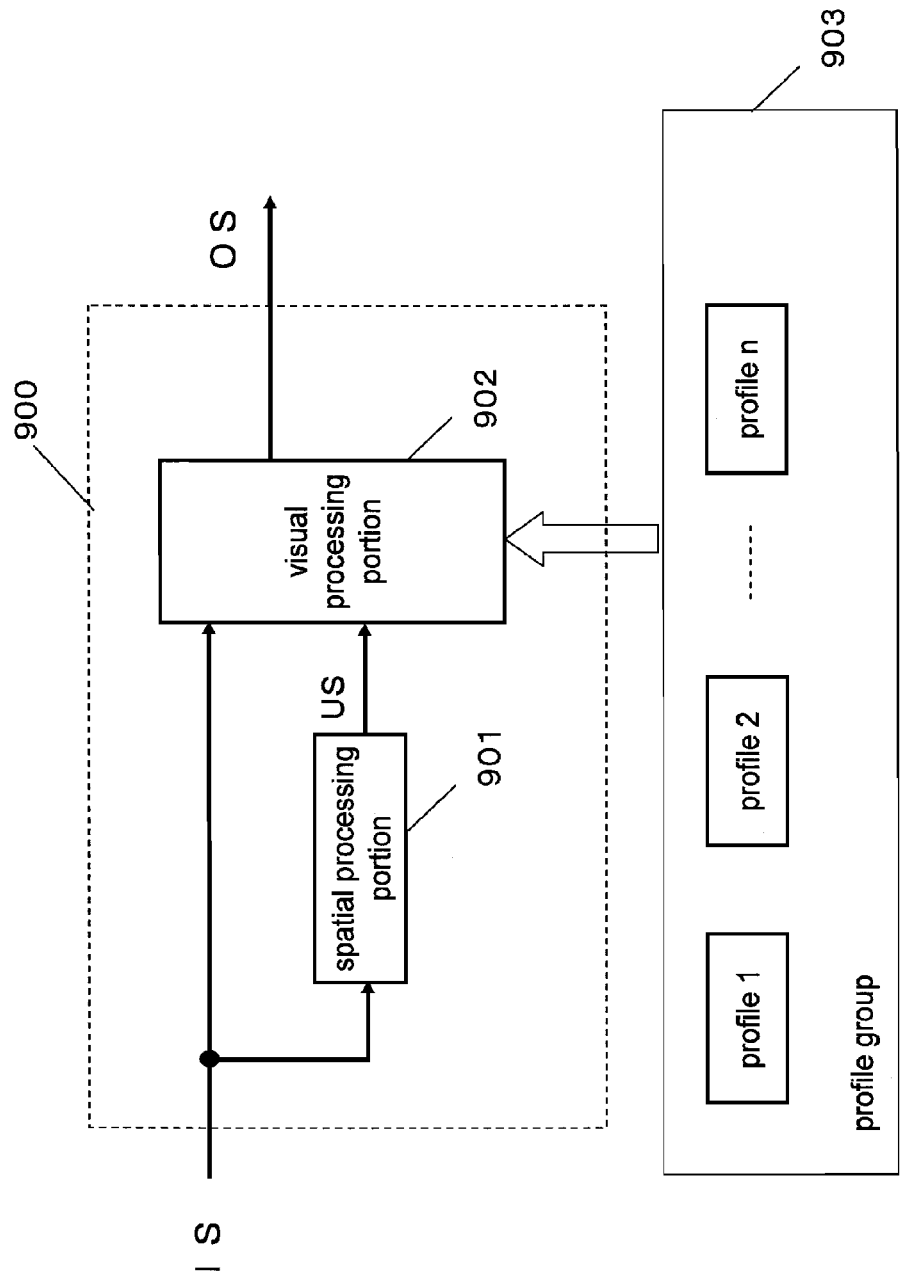
FIG. 47 is a block diagram of a conventional visual processing device.
Figure 48:
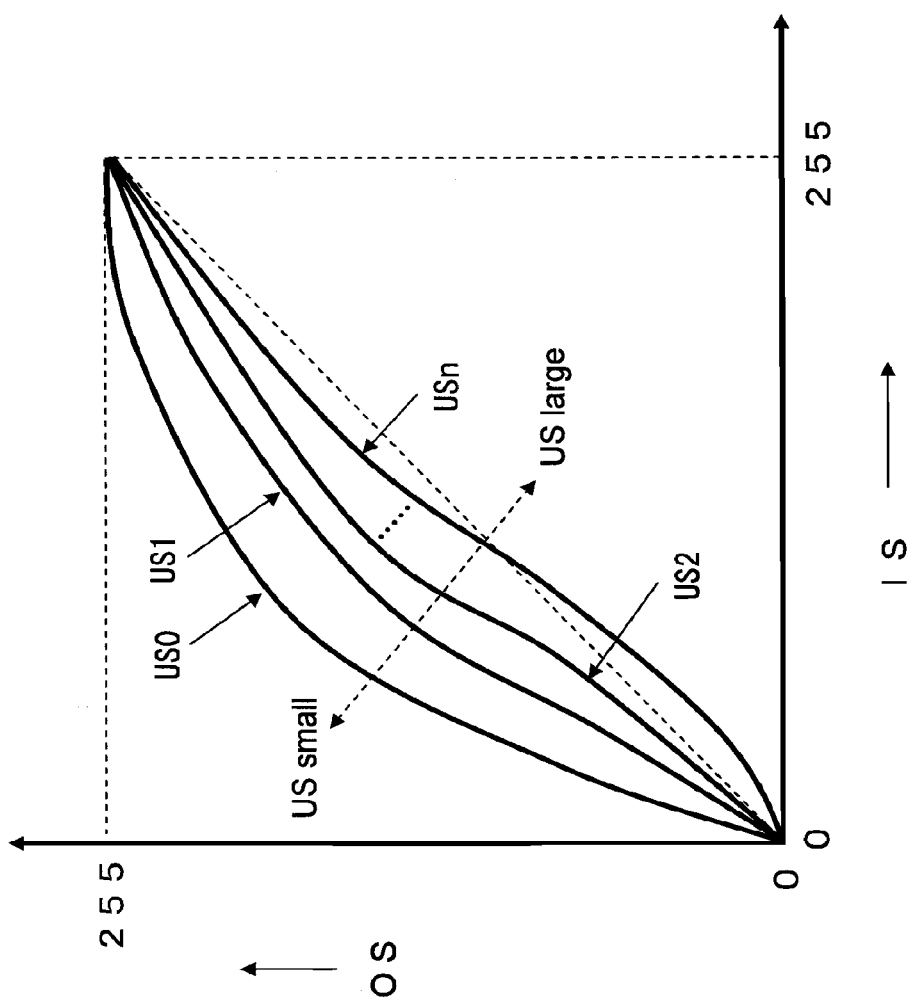
FIG. 48 is a diagram of the tone conversion characteristics of this device.

Next, a case in which various functions are executed by software is described using FIG. 46. FIG. 46 is a block diagram showing the configuration of a computer 4612 according to an embodiment of the invention.

In FIG. 46, the computer 4612 is provided with a CPU 4600 that executes the commands of various types of programs, a ROM 4601 storing programs, for example, a RAM 4602 holding temporarily stored data, an input portion 4603 that inputs images, an output portion 4604 that outputs images, and a memory portion 4605 that stores programs and various types of data.

The computer 4612 also can be provided with a communication portion 4606 for communicating with the outside, and a drive portion 4607 for suitably connecting to information storage media.

The various functional portions send and receive control signals and data, for example, via a bus 4610.

The CPU 4600 executes various functions according to programs stored on the ROM 4601, programs stored on the memory portion 4605, and programs stored on the RAM 4602.

The ROM 4601 stores a visual processing program and characteristic data, for example.

The RAM 4602 temporarily stores data that are required for the processing of the various functions by the CPU 100.

The input portion 4603 inputs images. For example, it is possible for the input portion 4603 to receive electromagnetic waves to obtain broadcast image data, decode the broadcast image data and obtain video signal. It is also possible to obtain digital images directly over a wired connection.

The output portion 4604 outputs the images. For example, the output portion 4604 outputs to a display device such as a liquid crystal display device or a plasma display.

The memory portion 4605 is made of a magnetic memory and the like, and stores various programs or data.

The communication portion 4604 may be connected to the network 111 and the like, and obtain the program via the network 111, or may install the obtained program in the memory portion 4605 as necessary. In this way, the computer 6 can download the program via the communication portion 4606.

The drive portion 4607 appropriately connects to an information storage medium and obtains information stored therein. The information storage medium may be, for example, the disk 4608 such as a magnetic disk, magneto optical disk, optical disk, or the memory card 4609 such as a semiconductor memory. In addition, the program having the various functions, characteristic data and the like may be stored in the disk 4608 or the memory card 4609 such as the semiconductor memory, and the information may be provided to the computer 4612.

A program can be incorporated into a computer in advance by dedicated hardware, or it can be provided already incorporated into a ROM 4601 or a memory portion 4605.

The program can be adopted by devices that handle images, such as information processing devices, televisions, digital cameras, portable telephones, and PDAs. The program can be installed in or connected to a device that handles images, and executes the same visual processing as the visual processing that is achieved by the visual processing devices or visual processing systems described in above embodiments.

It should be noted that if the visual processing device is adopted in a display device, then it is also possible to switch the display mode when a special image is detected.

If the visual processing portion, for instance, of the visual processing devices described in the above embodiments is constituted by a 2D LUT, then the data of the 2D LUT that is referenced are stored in a memory device such as a hard disk or a ROM, and are referenced as necessary. It is also possible for the data of the 2D LUT to be provided from a device for providing the two-dimensional gain data (profile) for the 2D LUT that is directly connected, or is indirectly connected via a network, to the visual processing device.

A first visual processing method can be achieved for example by causing a computer 4612 to execute an effect adjustment step of performing processing for setting the effect of visual processing according to an effect adjustment signal, a visual processing step of performing visual processing on an image signal that has been input, a target level setting step of setting a predetermined target level, and a spatial processing step of performing predetermined spatial processing on the image signal and outputting a processed signal. The computer 4612 in the effect adjustment step is made to output a synthesized signal that is obtained by synthesizing the processed signal and the predetermined target level according to the effect adjustment signal, and in the visual processing step is made to convert the tone level of the image signal based on the image signal and the synthesized signal that has been synthesized.

A second visual processing method can be achieved for example by causing a computer 4612 to execute an effect adjustment step of performing processing for setting the effect of visual processing according to an effect adjustment signal, a visual processing step of performing visual processing on an image signal that has been input, a surrounding image information extraction step of extracting the surrounding image information of the image signal that has been input, and an effect adjustment signal generation step of outputting an effect adjustment signal for setting the effect of visual processing. The computer 4612 in the visual processing step is made to visually process the image signal based on the image signal and the surrounding image information, and in the effect adjustment step is made to set the effect of visual processing according to the effect adjustment signal.

A third visual processing method can be achieved for example by causing a computer 4612 to execute the second visual processing method, and also, in the effect adjustment signal generation step, to detect flat regions that are adjacent to edge regions from the image signal and output an effect adjustment signal.

A fourth visual processing method can be achieved for example by causing a computer 4612 to execute an effect adjustment step of performing processing for setting the effect of visual processing according to an effect adjustment signal, a visual processing step of performing visual processing on an image signal that has been input, a surrounding image information extraction step of extracting the surrounding image information of the image signal that has been input, and a special image detection step of detecting special images that have a statistical bias from the image signal and then outputting an effect adjustment signal based on the degree of the statistical bias. Further, the computer 4612 in the visual processing step is made to visually process the image signal based on the image signal and the surrounding image information, and in the effect adjustment step is made to set the effect of visual processing according to the effect adjustment signal.

Eleventh Embodiment

An example of the application of the visual processing device, as well as a system using the same according to a second example of the present invention are described with reference to FIGS. 42 to 46.

Figure 42:
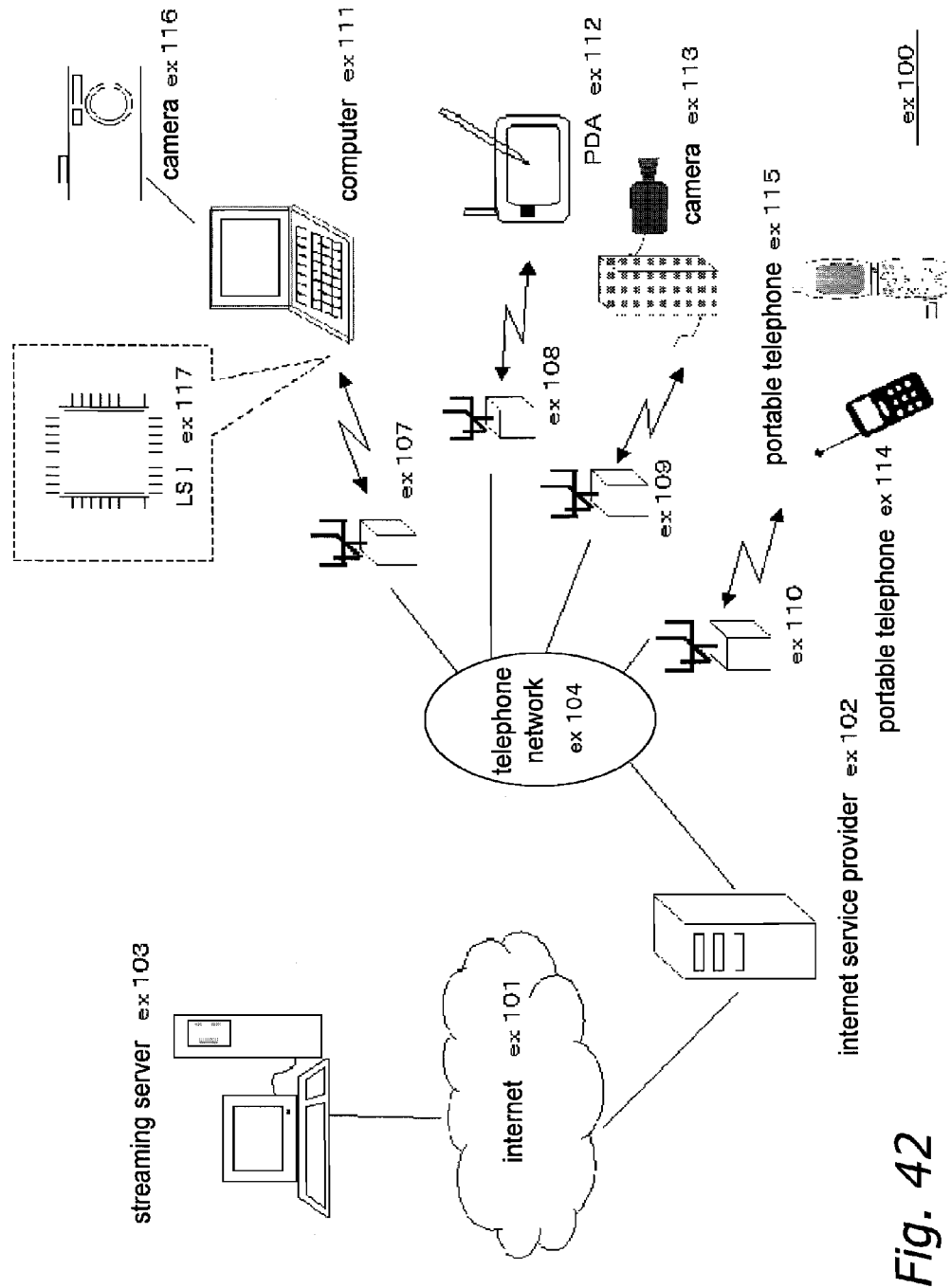
FIG. 42 is a diagram of the overall configuration of the content supply system according to the second embodiment of the invention.

FIG. 42 is a block diagram showing an overall structure of a content providing system ex100 that achieves a content delivering service. An area where a communication service is provided is divided into cells of a desired size, and base stations ex107-ex110 that are fixed radio stations are provided in the cells.

This content providing system ex100 includes a computer ex111, a personal digital assistant (PDA) ex112, a camera ex113, a cellular phone ex114, a cellular phone with camera ex115 and other equipment that are connected to the Internet ex101 for example via an internet service provider ex102, a telephone network ex104 and base stations ex107-ex110.

However, the content providing system ex100 can adopt any combination for connection without being limited to the combination shown in FIG. 42. In addition, each of the devices can be connected directly to the telephone network ex104 without the base stations ex107-ex110 that are fixed radio stations.

The camera ex113 is a device such as a digital video camera that can obtain a moving image. In addition, the cellular phone may be any type of PDC (Personal Digital Communications) method, CDMA (Code Division Multiple Access) method, W-CDMA (Wideband-Code Division Multiple Access) method, or GSM (Global System for Mobile Communications) method, or a cellular phone of PHS (Personal Handyphone System).

In addition, the streaming server ex103 is connected to the camera ex113 via the base station ex109 and the telephone network ex104, so that live delivery can be performed on the basis of coded data transmitted by a user of the camera ex113. The coding process of the obtained data may be performed by the camera ex113 or by a server for transmitting data. In addition, the moving image data obtained by the camera ex116 may be transmitted to the streaming server ex103 via the computer ex111. The camera ex116 is a device that can take a still image like a digital camera and a moving image. In this case, coding of the moving image data may be performed by the camera ex116 or by the computer ex111. In addition, the coding process may be performed by an LSI ex117 in the computer ex111 or the camera ex116. Note that it is possible to incorporate software for coding and decoding images into a storage medium (a CD-ROM, a flexible disk, a hard disk or the like) that is a recording medium readable by the computer ex111. Furthermore, the cellular phone with camera ex115 may transmit the moving image data. In this case, the moving image data is coded by the LSI in the cellular phone ex115.

In this content providing system ex100, content (for example, a moving image of a music concert) that the user is recording with the camera ex113 or the camera ex116 are coded as shown in the above-described embodiments and transmitted to the streaming server ex103, while the streaming server ex103 delivers a stream of the content data to a client who made a request. The client may be the computer ex111, the PDA ex112, the camera ex113, the cellular phone ex114 or the like that can decode the coded data. Thus, in the content providing system ex100, the client can receive and reproduce the coded data. The system can achieve personal broadcasting when the client receives, decodes and reproduces the stream in real time.

To encode or decode the content, the visual processing devices may be used. For example, the computer ex111, the PDA ex112, the camera ex113, the cellular phone ex114 or the like may be provided with the visual processing devices, and execute the visual processing methods or the visual processing programs.

In addition, the streaming server ex103 may provide the two-dimensional gain data (profile) to the visual processing device via the Internet ex101. Furthermore, there may be a plurality of streaming servers ex103, and each of them may provide different two-dimensional gain data. Further, the streaming sever ex103 may be for creating the two-dimensional gain data. When the visual processing device can thus obtain the two-dimensional gain data via the Internet ex101, the visual processing device does not have to store in advance the two-dimensional gain data used for the visual processing, and the memory capacity of the visual processing device can be reduced. In addition, because the two-dimensional gain data can be obtained from a plurality of servers connected via the Internet ex101, different visual processings can be achieved.

An example regarding a cellular phone will now be described.

Figure 43:
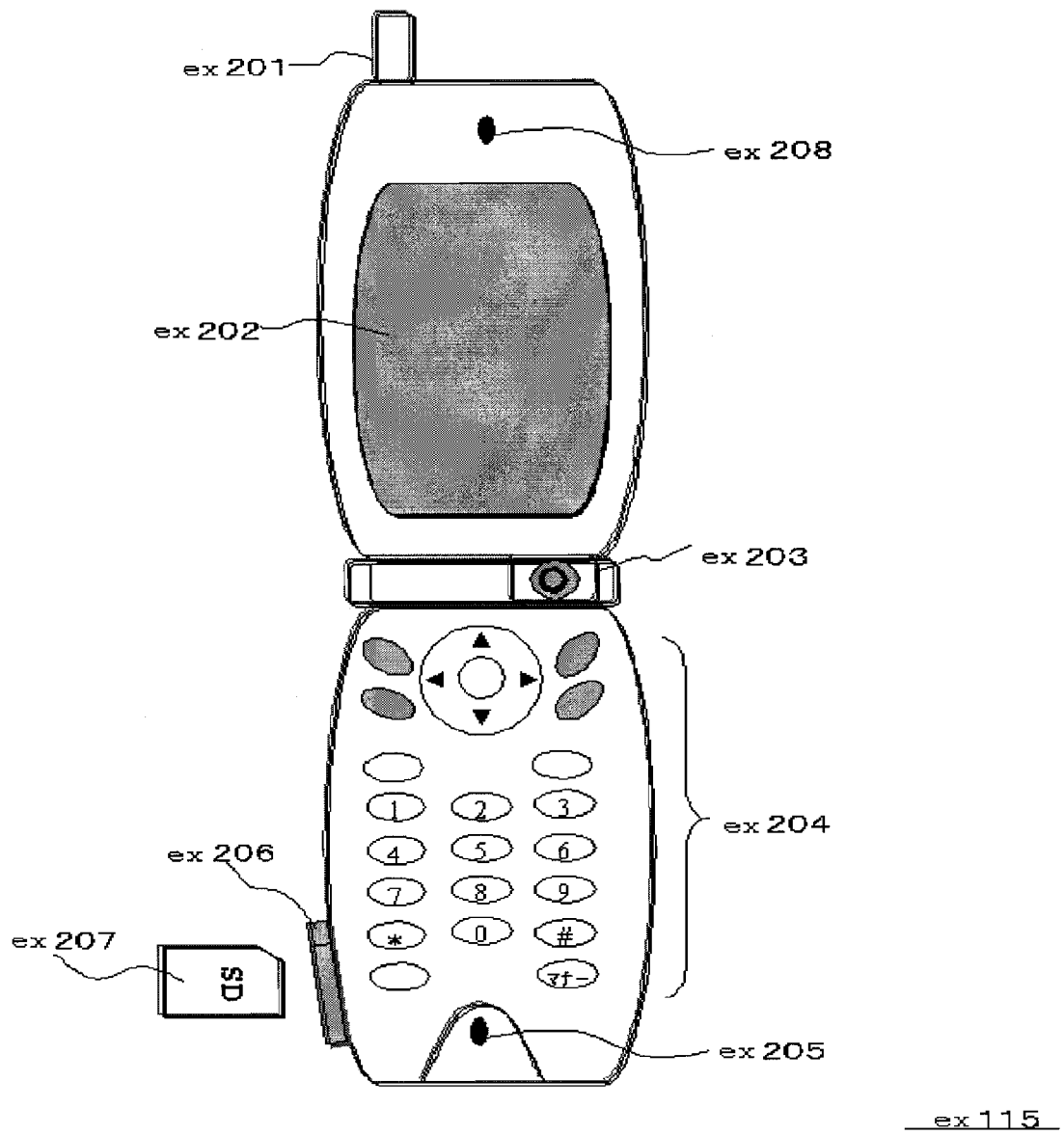
FIG. 43 is a front view of a portable telephone that is provided with the visual processing device according to the second embodiment.

FIG. 43 shows the cellular phone ex115 that utilizes the visual processing device 1 of the present invention. The cellular phone ex115 includes an antenna ex201 for transmitting and receiving radio waves with the base station ex110, a camera portion ex203 such as a CCD camera that can take a still image, a display portion ex202 such as a liquid crystal display for displaying images obtained by the camera portion ex203 or images received by the antenna ex201 after the image data are decoded, a main body portion including a group of operating keys ex204, a sound output portion ex208 such as a speaker for producing sounds, a sound input portion ex205 such as a microphone for receiving sounds, a recording medium ex207 for storing coded data or decoded data such as data of taken moving images or still images, data of received e-mails, moving images or still images, and a slot portion ex206 that enables the recording medium ex207 to be attached to the cellular phone ex115. The recording medium ex207 such as an SD card includes a plastic case housing a flash memory element that is one type of EEPROM (Electrically Erasable and Programmable Read Only Memory) non-volatile memory that is electronically rewritable and erasable.

Furthermore, the cellular phone ex115 will be described with reference to FIG. 44. The cellular phone ex115 includes a main controller portion ex311 for controlling each portion of the main body portion having the display portion ex202 and the operating keys ex204, a power source circuit portion ex310, an operational input controller portion ex304, an image coding portion ex312, a camera interface portion ex303, an LCD (Liquid Crystal Display) controller portion ex302, an image decoding portion ex309, a multiplex separation portion ex308, a recording and reproduction portion ex307, a modem circuit portion ex306 and a sound processing portion ex305, which are connected to each other via a synchronizing bus ex313.

When the user turns on a clear and power key, the power source circuit portion ex310 supplies power from a battery pack to each portion so that the digital cellular phone with camera ex115 is activated.

The cellular phone ex115 converts a sound signal collected by the sound input portion ex205 during a sound communication mode into digital sound data by the sound processing portion ex305 under control of the main controller portion ex311 that includes a CPU, a ROM and a RAM. The digital sound data are processed by the modem circuit portion ex306 as a spectrum spreading process and are processed by the transmission and reception circuit portion ex301 as a digital to analog conversion process and a frequency conversion process. After that, the data are transmitted via the antenna ex201. In addition, the cellular phone ex115 amplifies a signal that is received by the antenna ex201 during the sound communication mode and performs the frequency conversion process and an analog to digital conversion process on the data, which is processed by the modem circuit portion ex306 as a spectrum inverse spreading process and is converted into a analog sound signal by the sound processing portion ex305. After that, the analog sound signal is delivered by the sound output portion ex208.

Furthermore, when transmitting electronic mail during a data communication mode, text data of the electronic mail are entered by using the operating keys ex204 of the main body portion and are given to the main controller portion ex311 via the operational input controller portion ex304. The main controller portion ex311 performs the spectrum spreading process on the text data by the modem circuit portion ex306 and performs the digital to analog conversion process and the frequency conversion process by the transmission and reception circuit portion ex301. After that, the data are transmitted to the base station ex110 via the antenna ex201.

When transmitting image data during the data communication mode, the image data obtained by the camera portion ex203 are supplied to the image coding portion ex312 via the camera interface portion ex303. In addition, if the image data are not transmitted, it is possible to display the image data obtained by the camera portion ex203 directly by the display portion ex202 via the camera interface portion ex303 and an LCD controller portion ex302.

The image coding portion ex312 converts the image data supplied from the camera portion ex203 into the coded image data by compressing and coding the data, and the coded image data are supplied to the multiplex separation portion ex308. In addition, the cellular phone ex115 collects sounds by the sound input portion ex205 while the camera portion ex203 is taking the image, and the digital sound data is supplied from the sound processing portion ex305 to the multiplex separation portion ex308.

The multiplex separation portion ex308 performs multiplexing of the coded image data supplied from the image coding portion ex312 and the sound data supplied from the sound processing portion ex305 by a predetermined method. Multiplexed data obtained as a result are processed by the modem circuit portion ex306 as a spectrum spreading process and are processed by the transmission and reception circuit portion ex301 as a digital to analog conversion process and a frequency conversion process. After that, the data are transmitted via the antenna ex201.

When receiving moving image file data linked to a web page during the data communication mode, a signal received from the base station ex110 via the antenna ex201 is processed by the modem circuit portion ex306 as a spectrum inverse spreading process. Multiplexed data obtained as a result are supplied to the multiplex separation portion ex308.

In addition, in order to decode multiplexed data received via the antenna ex201, the multiplex separation portion ex308 separates a coded bit stream of image data in the multiplexed data from a coded bit stream of sound data. Then, the multiplex separation portion ex308 supplies the coded image data to the image decoding portion ex309 via the synchronizing bus ex313 and supplies the sound data to the sound processing portion ex305.

Next, the image decoding portion ex309 generates reproduction moving image data by decoding the coded bit stream of the image data and supplies the data to the display portion ex202 via the LCD controller portion ex302. Thus, the moving image data included in a moving image file that is linked to a home page can be displayed. In this case, the sound processing portion ex305 converts the sound data into an analog sound signal, which is supplied to the sound output portion ex208. Thus, sound data included in the moving image file that is linked to a home page can be reproduced.

Note that the image decoding portion ex309 may be provided with the visual processing devices shown in the above-described embodiments.

Figure 45:
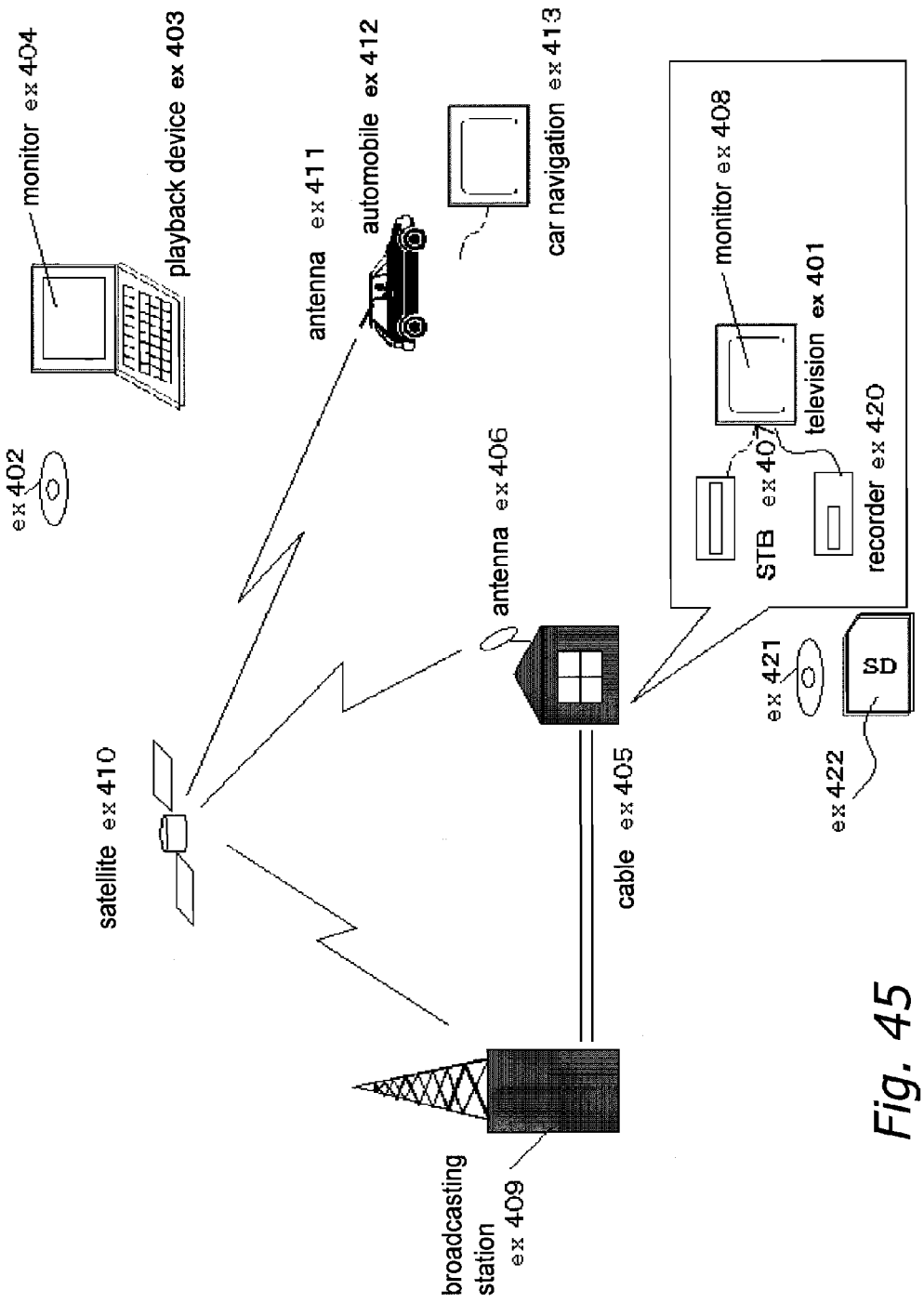
FIG. 45 is an explanatory diagram of the overall configuration of the digital broadcast system according to the second embodiment.

Note that the present invention is not limited to the example of the system described above. Digital broadcasting by satellite or terrestrial signals has been a recent topic of discussion. As shown in FIG. 45, the visual processing devices of the present invention can be incorporated into the digital broadcasting system, too.

More specifically, in a broadcast station ex409, a coded bit stream of image information is sent to a communication or a broadcasting satellite ex410 via a radio wave. The broadcasting satellite ex410 that received the coded bit stream of image information sends radio waves for broadcasting. These radio waves are received by an antenna ex406 of a house equipped with a satellite broadcasting reception facility, and a device such as a television set (a receiver) ex401 or a set top box (STB) ex407 decodes the coded bit stream and reproduces the same. In addition, the television set (the receiver) ex401 or the set top box (STB) ex407 may be provided with the visual processing device shown in the above-described embodiments, use the visual processing method shown in the above-described embodiments or execute the visual processing program shown in the above-described embodiments. In addition, a reproduction device ex403 for reading and decoding a coded bit stream that is recorded on a storage medium ex402 such as a CD or a DVD that is a recording medium may be equipped with the visual processing devices, the visual processing methods, and the visual processing programs shown in the above-described embodiments. In this case, the reproduced image signal and text track are displayed on a monitor ex404. In addition, it is possible to mount the visual processing devices, the visual processing methods, and the visual processing programs shown in the above-described embodiments, in a set top box ex407 that is connected to a cable ex405 for a cable television or the antenna ex406 for a satellite or surface wave broadcasting, so that the image can be reproduced on a monitor ex408 of the television set. In this case, it is possible to incorporate the visual processing devices shown in the above-described embodiments not into the set top box but into the television set. In addition, it is possible that a car ex412 equipped with an antenna ex411 receives a signal from the broadcasting satellite ex410 or the base station ex107 and reproduces the moving image on a display of a navigation system ex413 in the car ex412.

Furthermore, it is possible to encode the image signal and record the encoded image signal in a recording medium. As a specific example, there is a recorder ex420 such as a DVD recorder for recording image signals on a DVD disk ex421 or a disk recorder for recording image signals on a hard disk. Furthermore, it is possible to record on an SD card ex422. In addition, in case that the recorder ex420 includes the visual processing devices of the present invention, it is possible to reproduce image signals recorded on a DVD disk ex421 or a SD card ex422 via the image signal processing device, so as to display on the monitor ex408.

Figure 44:
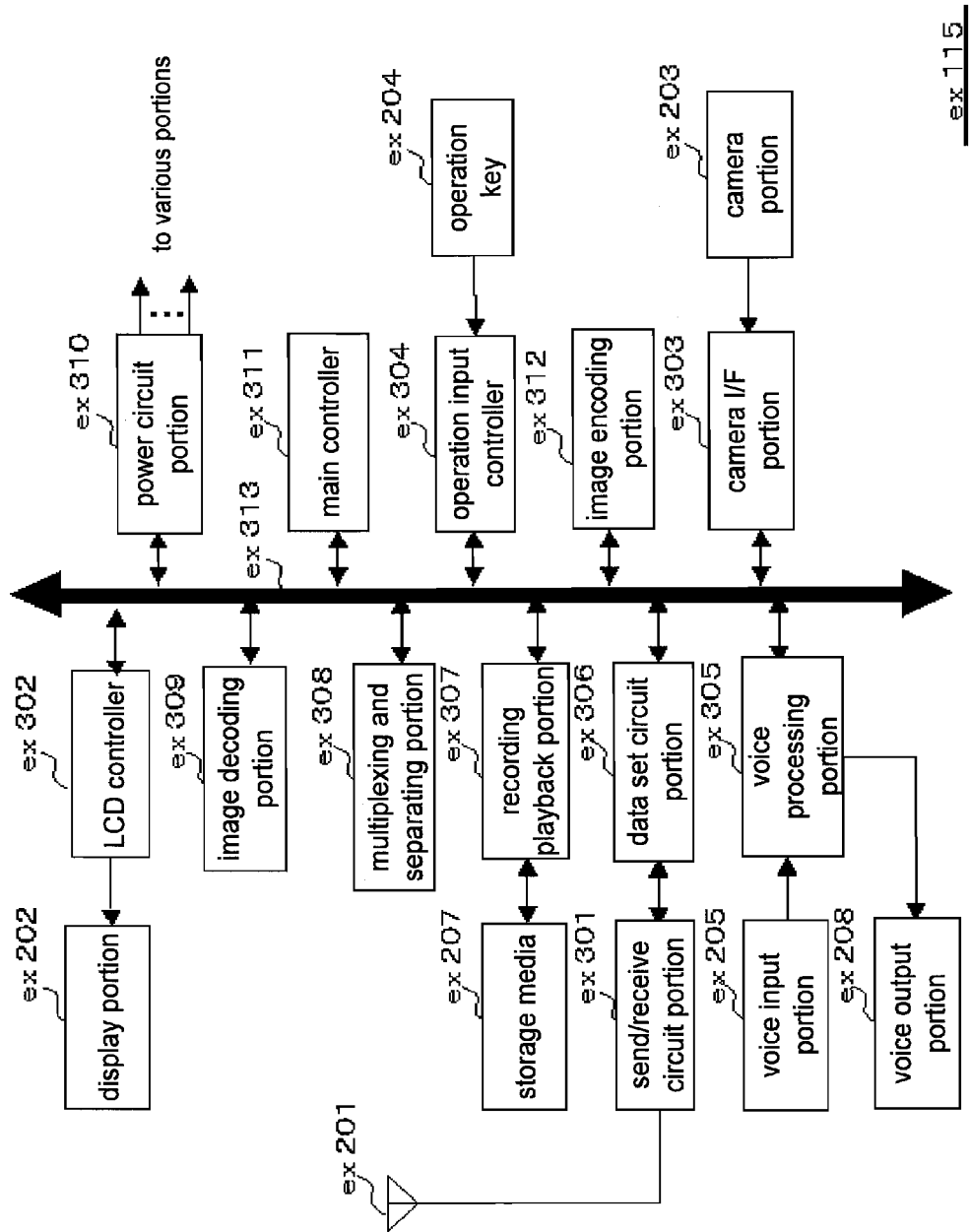
FIG. 44 is a block diagram for describing the overall configuration of the portable telephone according to the second embodiment.

Note that in the structure of the navigation system ex413 shown in FIG. 44, the camera portion ex203, the camera interface portion ex303 and the image coding portion ex312 can be omitted. This can be also applied to the computer ex111 and the television set (the receiver) ex401.

In addition, the terminal device such as the cellular phone ex114 may include three types of assemblies. A first type is a transmission and reception terminal having both the coder and the decoder, a second type is a transmission terminal having only a coder and a third type is a reception terminal having only a decoder.

It should be noted that the specific configuration of the invention is not limited to the foregoing embodiments, and various changes and modifications are possible in a range that does not depart from the gist of the invention.

INDUSTRIAL APPLICABILITY

With the visual processing device, display device, visual processing method, program, and integrated circuit according to the invention, it is possible to inhibit artifacts even if an image that has sharp edge regions or a special image has been input, and with a simple configuration it is possible to change the strength of the visual processing of the image in real-time, and thus these can be employed in display devices such as color television receivers, portable devices, information processing devices, digital still cameras, and game machines, and in output devices such as projectors and printers.

The invention claimed is:

1. A visual processing device for performing visual processing on an input image signal, the visual processing device comprising:
    a spatial processing portion operable to output a processed signal generated by reducing spatial high frequency components of pixels surrounding a target pixel in the input image signal;
    an effect adjustment portion operable to output a correction signal obtained by correcting the processed signal, according to an effect adjustment signal for setting an effect of the visual processing; and
    a visual processing portion operable to (i) receive the correction signal and the input image signal, (ii) perform the visual processing on the input image signal, and (iii) output an output signal as a result of the visual processing, the visual processing being performed using the input image signal and the correction signal output by the effect adjustment portion,
    wherein the visual processing portion performs the visual processing using tone conversion characteristics, such that, when a value of the input image signal is a predetermined value, a corresponding value of the output signal monotonically decreases with respect to a value of the correction signal obtained by correcting the processed signal that is generated by reducing the spatial high frequency components of the pixels surrounding the target pixel in the input image signal.

2. A visual processing method for performing visual processing on an input image signal, the visual processing method comprising:
    a spatial processing step of outputting a processed signal generated by reducing spatial high frequency components of pixels surrounding a target pixel in input image signal;
    an effect adjustment step of outputting a correction signal obtained by correcting the processed signal, according to an effect adjustment signal for setting an effect of the visual processing; and
    a visual processing step of (i) receiving the correction signal and the input image signal, (ii) performing the visual processing on the input image signal, and (iii) outputting an output signal as a result of the visual processing, the visual processing being performed using the input image signal and the correction signal output by the effect adjustment step,
    wherein the visual processing step includes performing the visual processing using tone conversion characteristics, such that, when a value of the input image signal is a predetermined value, a corresponding value of the output signal monotonically decreases with respect to a value of the correction signal obtained by correcting the processed signal that is generated by reducing the spatial high frequency components of the pixels surrounding the target pixel in the input image signal.

* * * * *